United States Patent [19]

Suzaki et al.

[11] 4,143,951
[45] Mar. 13, 1979

[54] CINE-PROJECTOR

[75] Inventors: Kuniyoshi Suzaki, Tokyo; Akira Ashida, Yokohama; Takashi Itani, Yokohama; Tateo Yamada, Yokohama; Masaya Maeda, Kawasaki; Kiyoshi Takahashi, Kunitachi; Hiroyuki Takimoto, Tokyo, all of Japan

[73] Assignee: Canon Kabushiki Kaisha, Tokyo, Japan

[21] Appl. No.: 752,998

[22] Filed: Dec. 21, 1976

[30] Foreign Application Priority Data

Dec. 27, 1975 [JP] Japan ................. 50-156674
Dec. 27, 1975 [JP] Japan ................. 50-156675
Dec. 27, 1975 [JP] Japan ................. 50-156676
Jan. 16, 1976 [JP] Japan ................. 51-3884

[51] Int. Cl.² ............................................ G03B 21/38
[52] U.S. Cl. .............................. 352/169; 352/124; 242/205
[58] Field of Search ............... 352/124, 166, 173, 169; 242/201, 205

[56] References Cited

U.S. PATENT DOCUMENTS

| Re. 27,229 | 11/1971 | Mitchell et al. ............ 352/124 |
| 3,764,203 | 10/1973 | Schwartz et al. ............ 352/124 |
| 3,815,983 | 6/1974 | Burnham et al. ............ 352/124 |
| 3,888,573 | 6/1975 | Easterly ............ 352/124 |
| 3,952,969 | 4/1976 | Woodier ............ 352/124 |
| 4,018,518 | 4/1977 | Wright ............ 352/124 |
| 4,033,680 | 7/1977 | Pasturczak ............ 352/124 |

Primary Examiner—Monroe H. Hayes
Attorney, Agent, or Firm—Toren, McGeady and Stanger

[57] ABSTRACT

The present invention relates to a cine-projector so designed as to carry out the motion picture projection, the still picture projection, the quick film feeding as well as winding up by simultaneously controling the first clutch mechanism for selectively interrupting the engagement of the driving ower transmission mechanism with the feeding shaft rotated by means of the driving power of a motor rotating along a single direction through the driving power transmission mechanism by means of the translation mechanism to be translated at least into three positions in functional engagement with the operation mode change over mechanism for changing over the operation mode of the cine-projector, the second clutch mechanism for selectively interrupting the engagement of the driving power transmission mechanism with the winding up shaft rotated along the inversed direction as that of the above mentioned feeding shaft by means of the driving power of the above mentioned motor through the driving power transmission mechanism, the first control mechanism for controlling the efficiency of the mechanism for intermittently feeding the film at the projection part and the second control mechanism for controlling the binding mechanism for semi-compulsorily binding the film at the projecton part.

17 Claims, 41 Drawing Figures (a)

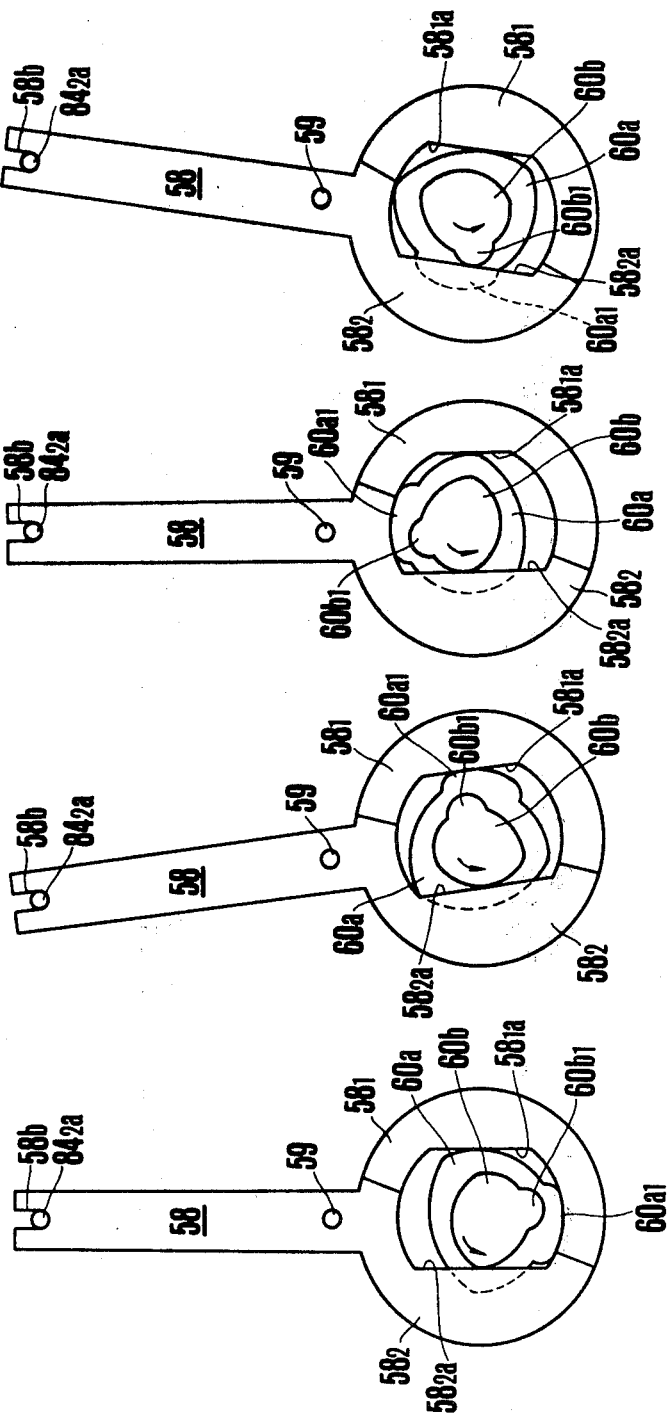

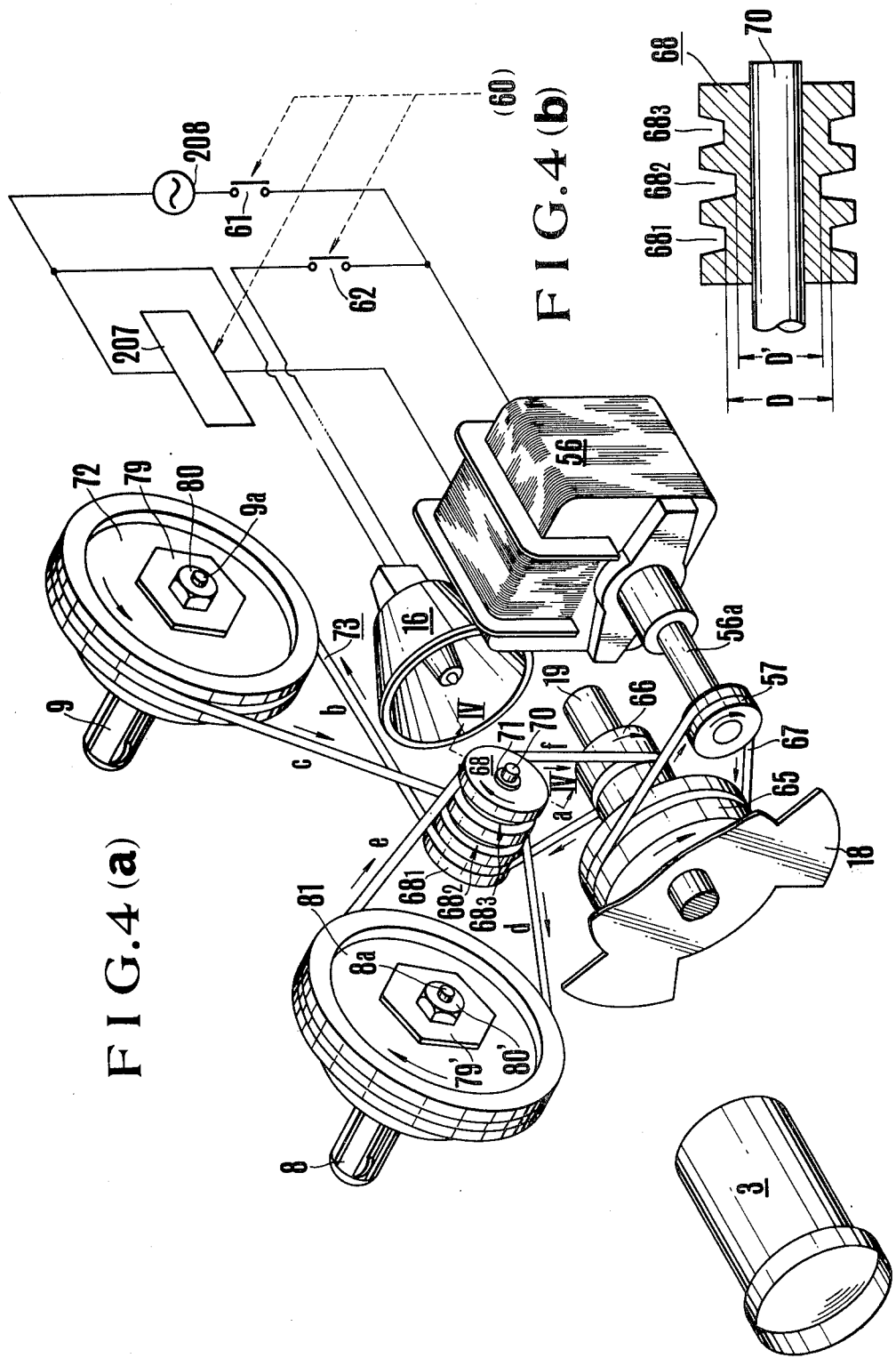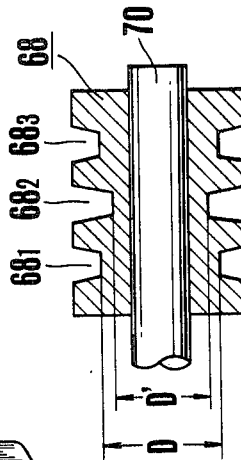

FIG.6

FIG.7
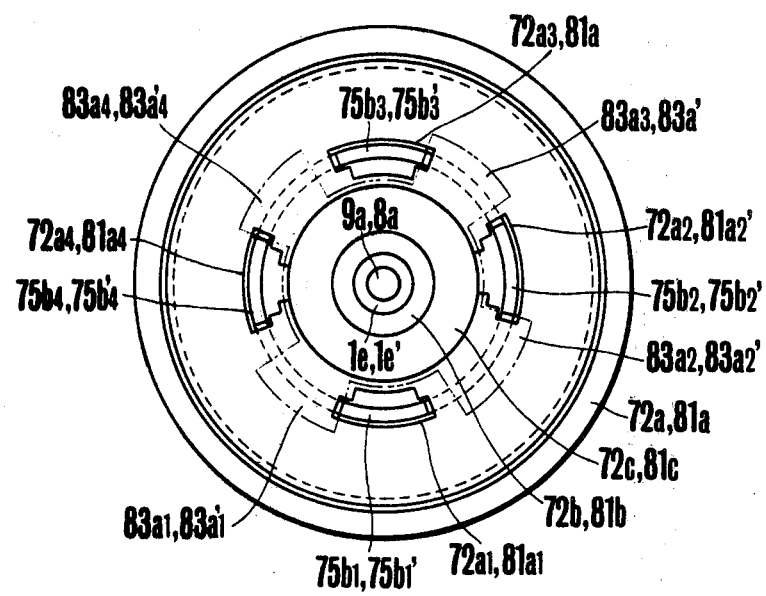
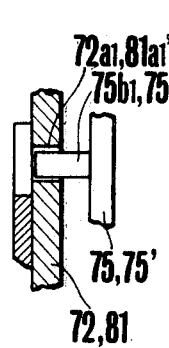
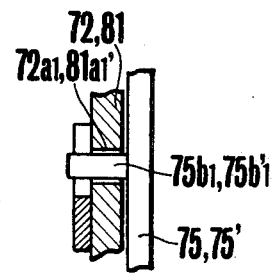

FIG.8
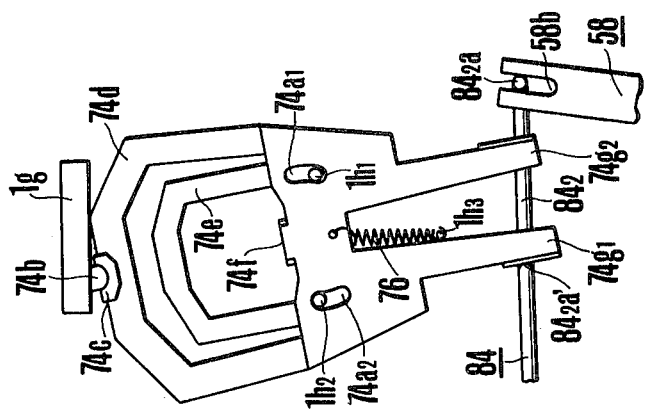
(a)
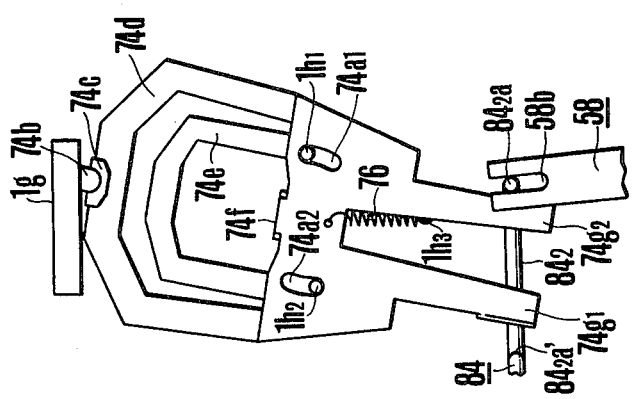
(b)
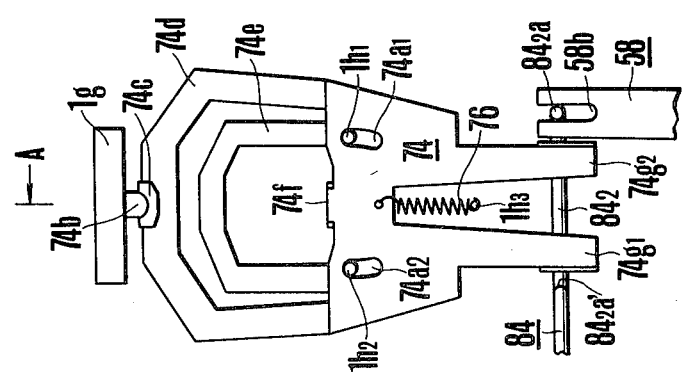
(c)

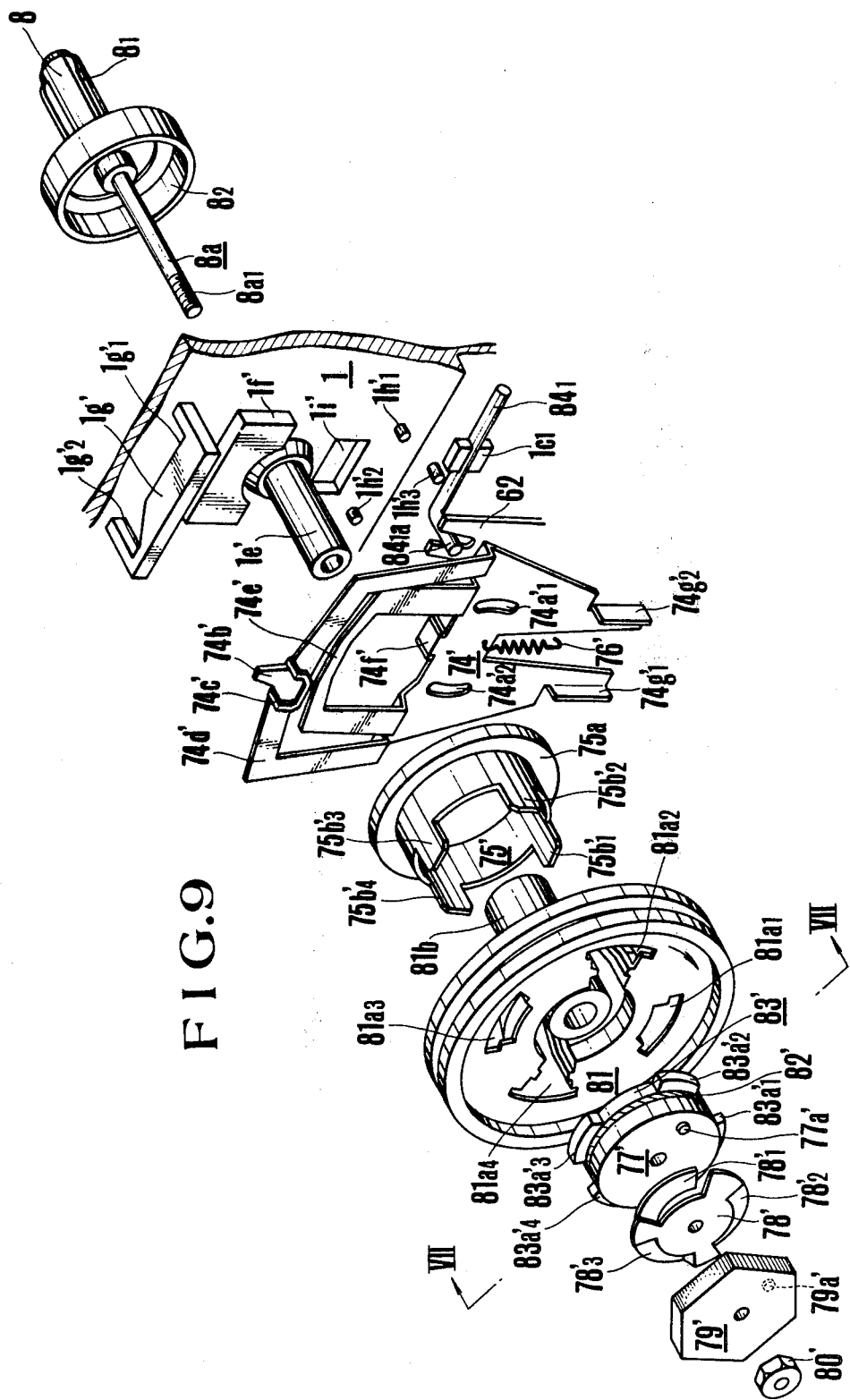

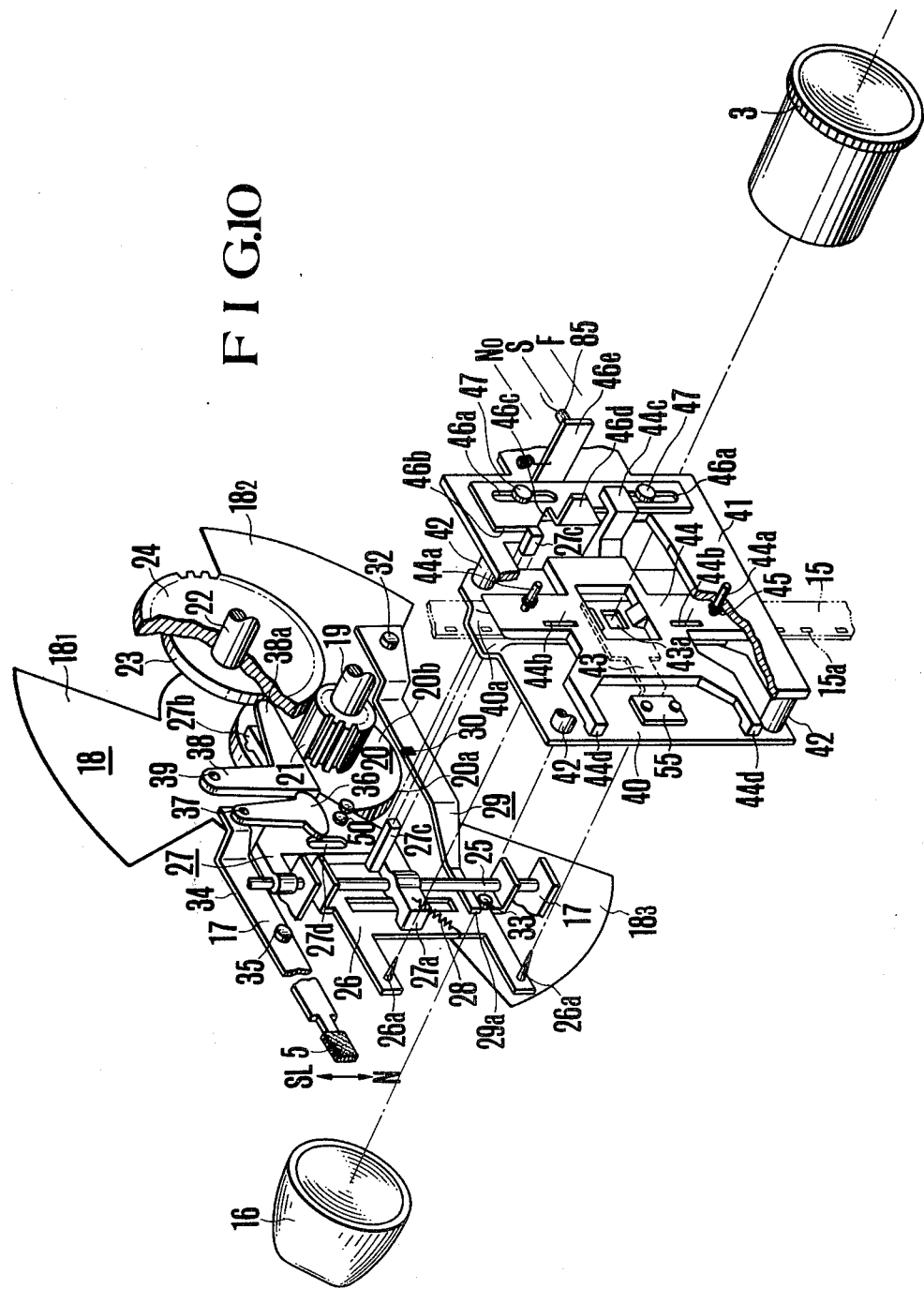

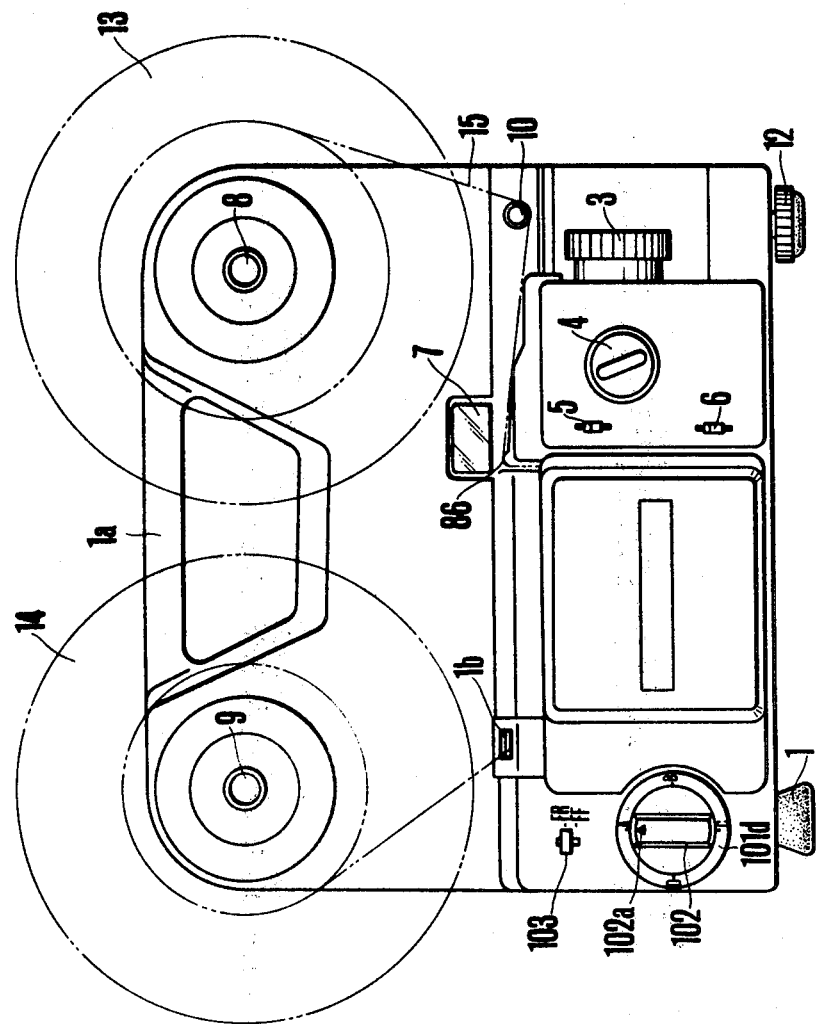

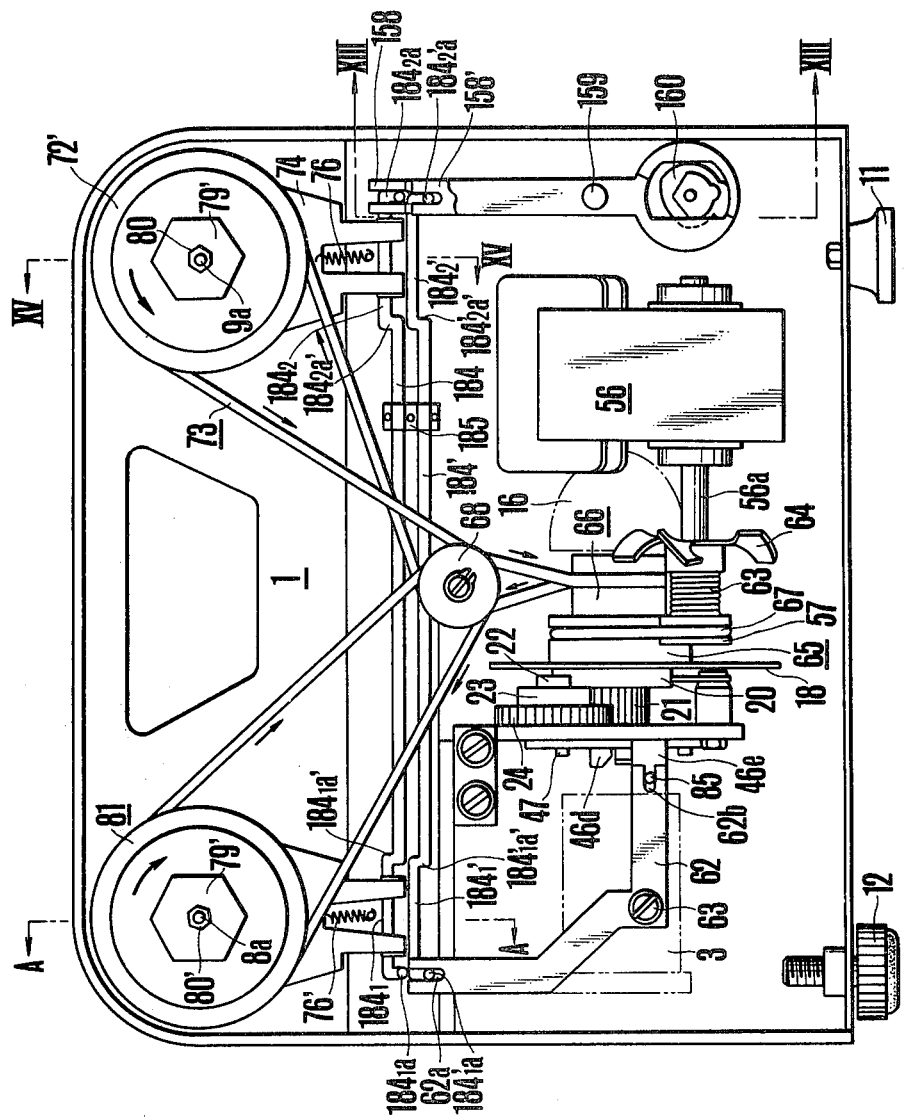

FIG.13(b) FIG.13(c) FIG.13(d)
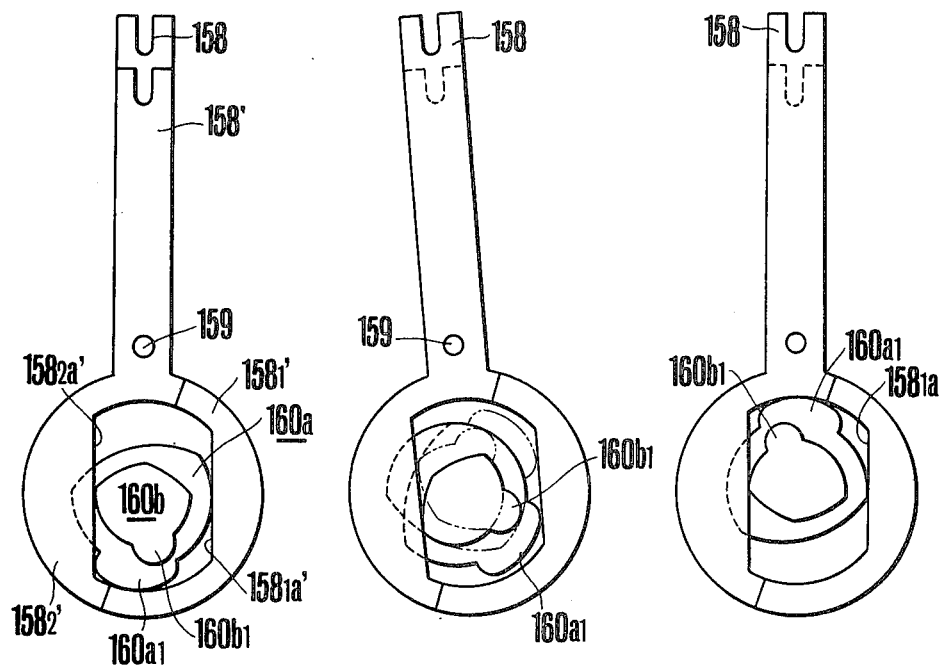
FIG.13(e) FIG.13(f)
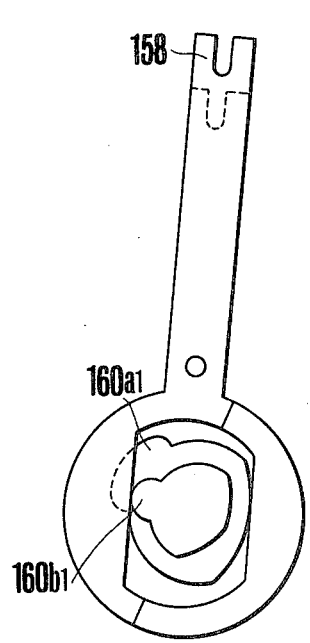
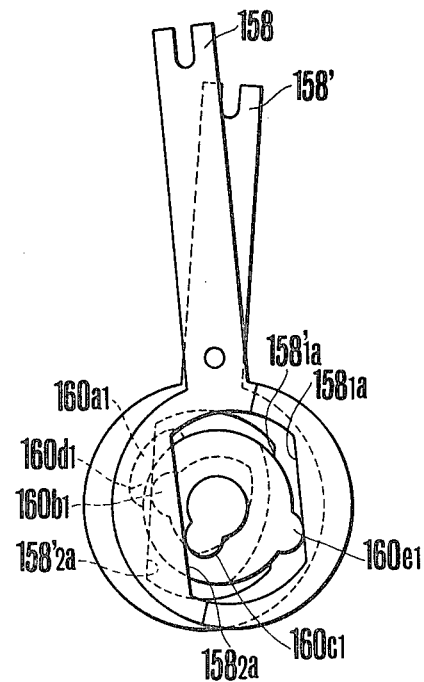

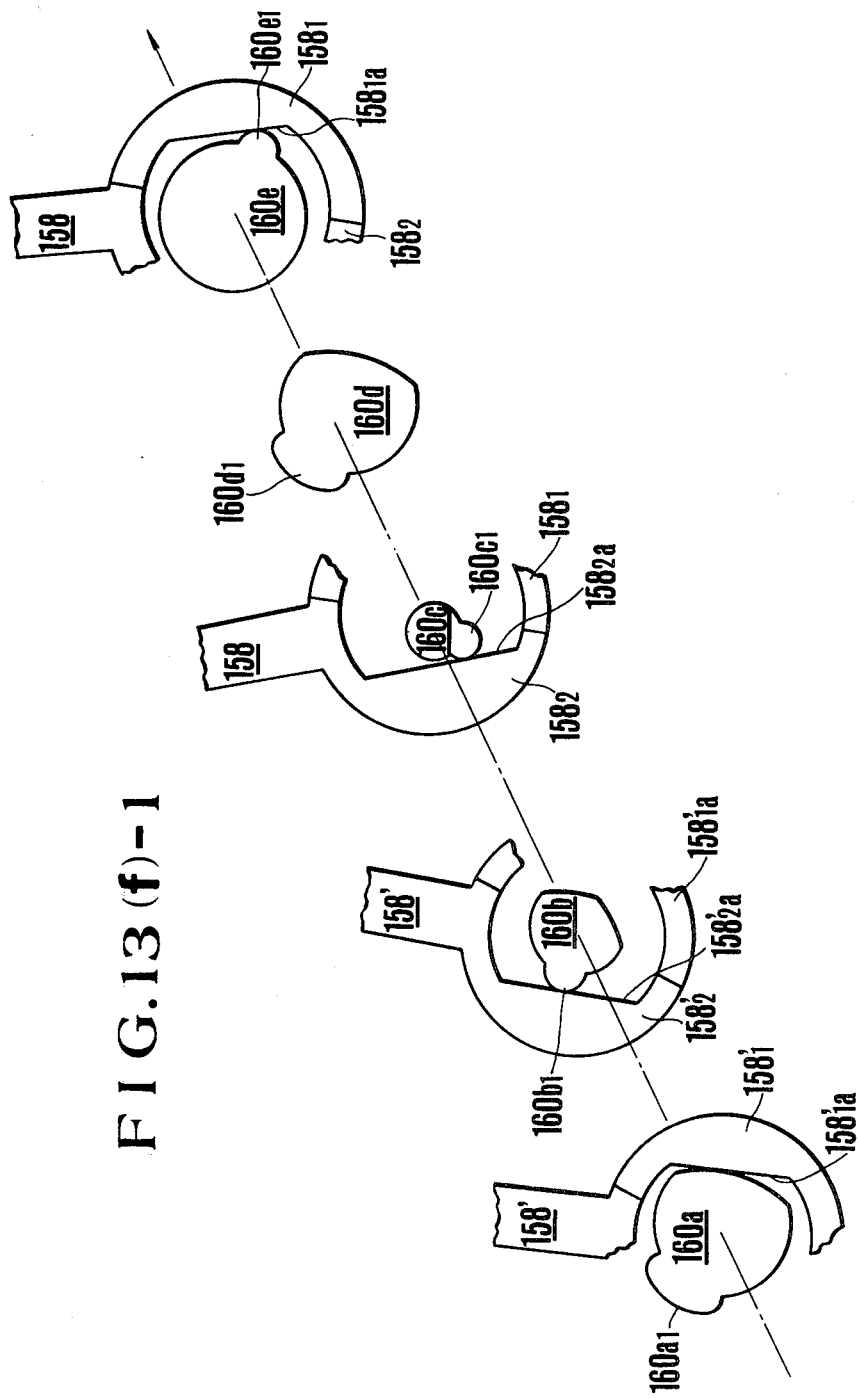

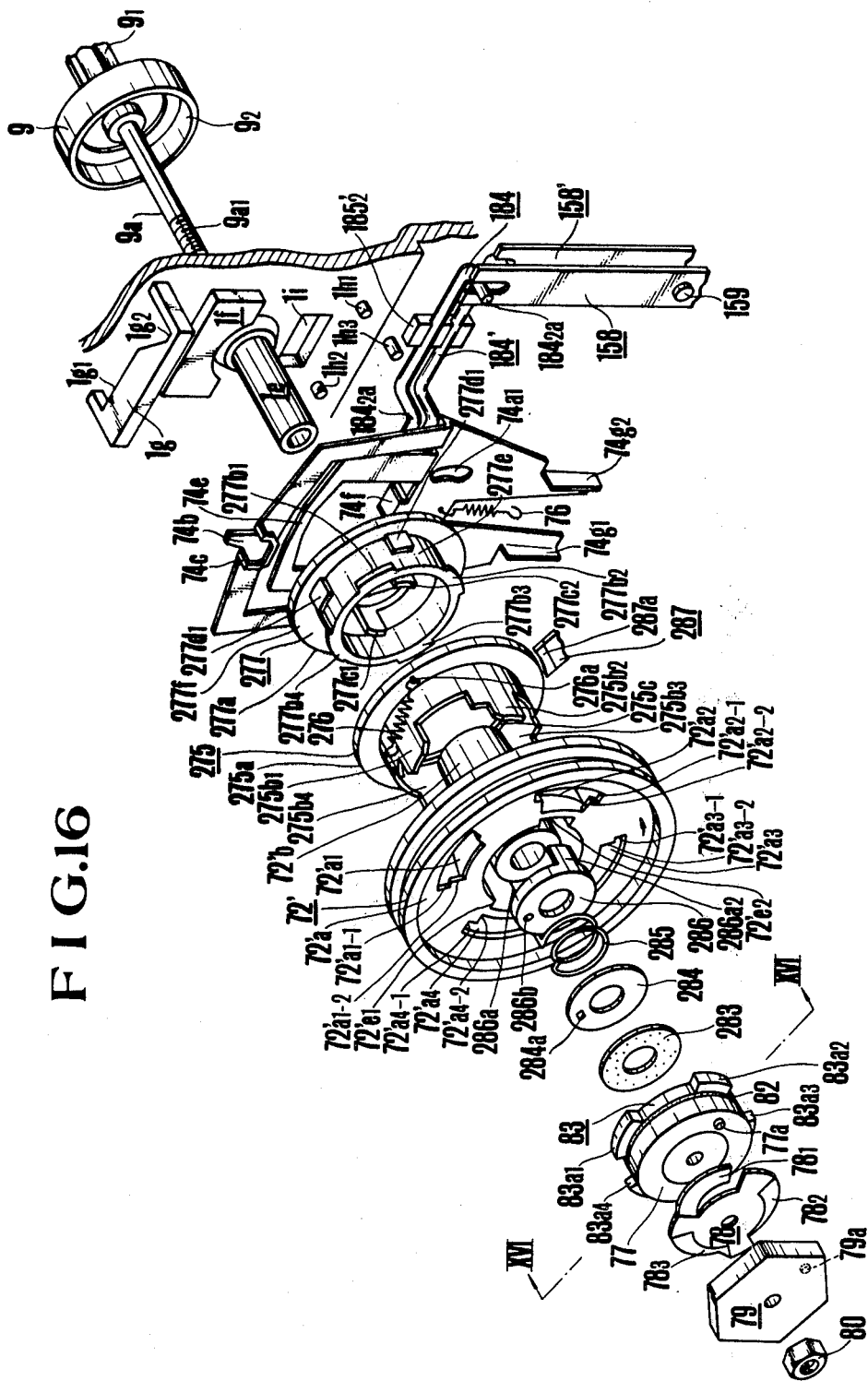

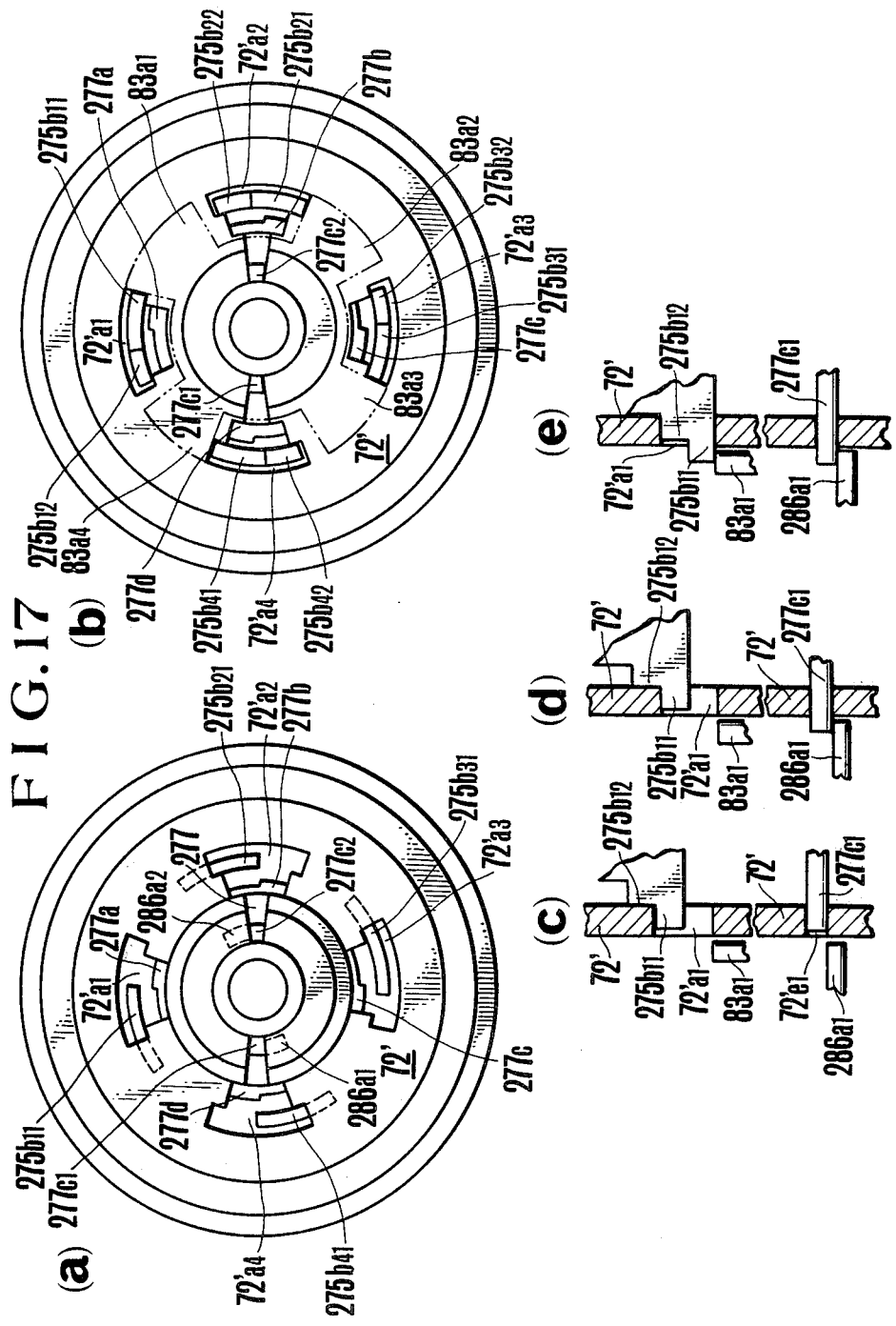

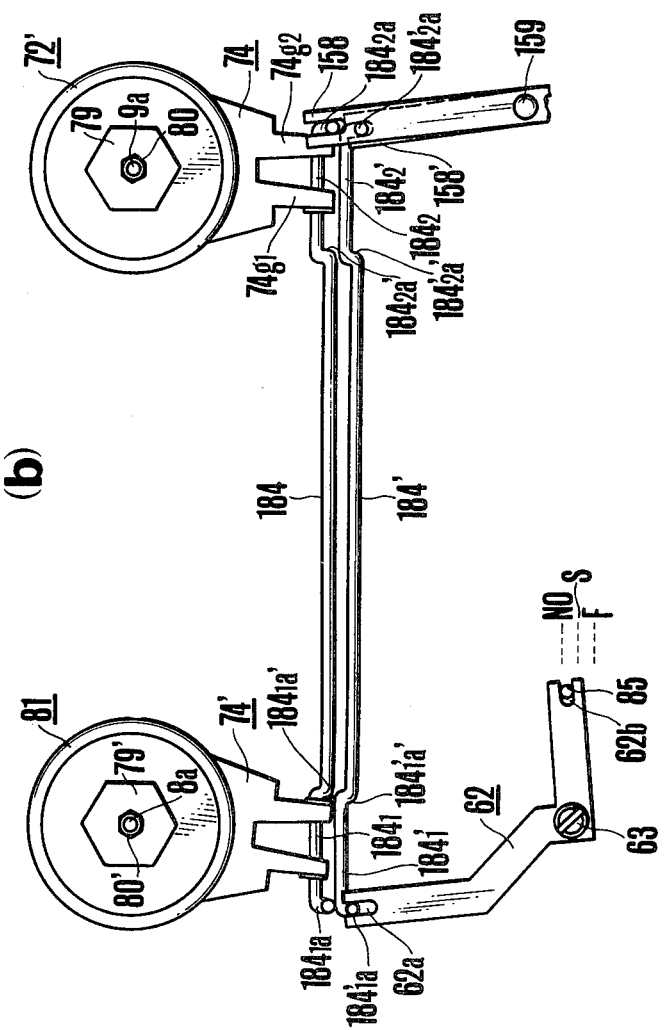

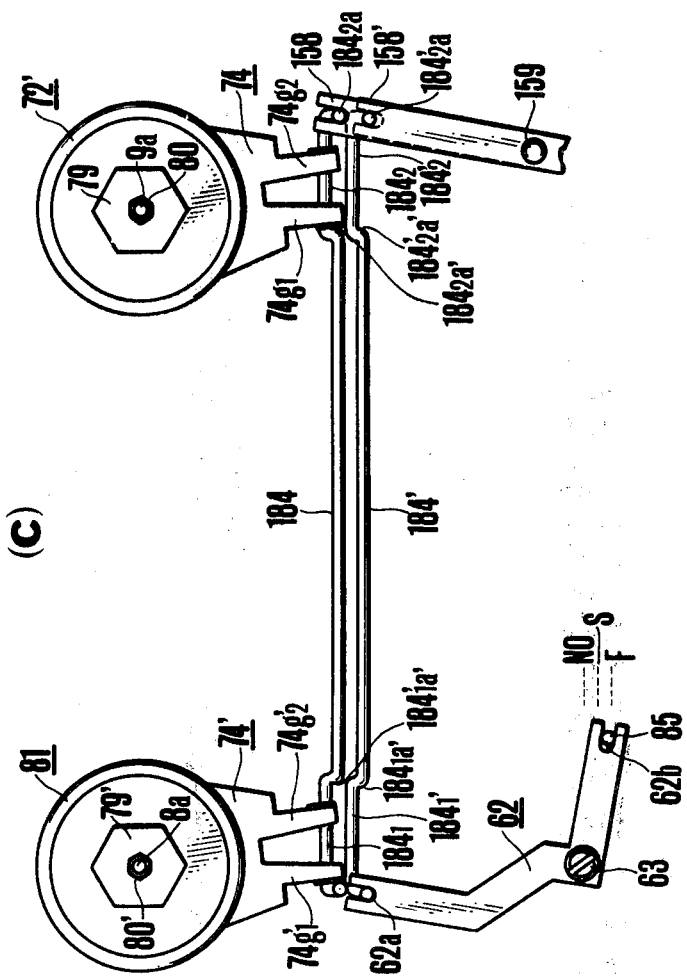

CINE-PROJECTOR

BACKGROUND OF THE INVENTION

1. Field of the Invention

The present invention relates to a cine-projector.

2. Description of the Prior Art

Among the conventional cine-projectors, for example, the motion picture projectors, there are some in which the motion picture projection (normal projection) by which the film is fed at the normal speed, the motion picture projection (slow motion projection) by which the film is fed at the lower speed than the normal speed, the still picture projection and the quick film winding back as well as feeding are made possible, whereby the projectors presenting such efficiencies are complicated in the construction while the assembling, the adjustment and the handling are remarkably difficult, which is inconvenient. Further there are several driving mechanisms for the conventional projectors. For example, in case the feeding shaft and the winding up shaft are independently driven by one motor, each one belt is provided between the driving side pulley and the driven side pulley provided on the feeding shaft respectively between the driving side pulley and the driven side pulley provided on the winding up shaft or a belt is provided between the driving side pulley and the above mentioned two driven side pulleys in such a manner that these three pulleys make the apexes of a triangle while the belt makes the sides of the triangle, whereby the two driven side pulleys are rotated by the driving power from the driving side pulley. However, when in case of the former system the distances between the driving side pulley and the respective driven side pulleys are different from each other the elongations taking place in the belts differ so that there takes place errors in the running speed due to the slips between the belts and the pulleys while due to the increase of the number of the parts the undesired increase of the number of the assembling processes as well as the undesirable problem for the control of the parts are unavoidable. Further, when in case of the latter system the loads on the driven side pulleys are increased or the driving speed is increased, the difference between the tensions of the belts this side and that side of the driven side pulley is clearly increased in such a manner that the elongation is concentrated at the belt portion with small tension so as to cause a large looseness at this portion in such a manner that the so called vibration is apt to take place or the elongation of the whole belt is further increased whereby there takes place a fear that a smooth driving of the driven side pulleys could not be obtained.

SUMMARY OF THE INVENTION

In view of the above mentioned problems of the conventional projectors, the first purpose of the present invention is to offer a quite novel projector for which the assembling, the adjustment as well as the handling are remarkably simplified.

The second purpose of the present invention is to offer a projector capable of the motion picture projection including the normal projection for which the film is fed at the normal speed and the slow motion projector for which the film is fed at a higher speed than the normal speed, the still picture projection, and the film feeding as well as the winding back at a higher speed than the normal speed for the above mentioned normal projection.

The third purpose of the present invention is to offer a projector capable of the motion picture projection, the still picture projection and the quick film feeding and winding back by simultaneously controling the first clutch mechanism for selectively interrupting the engagement of the driving power transmission mechanism with the feeding shaft rotated by means of the driving power of a motor rotating along a single direction through the driving power transmission mechanism by means of the translation mechanism to be translated at least into three positions in functional engagement with the operation mode change over mechanism for changing over the operation mode of the projector, the first control mechanism for controling the intermittently feeding mechanism for intermittently feeding the film at the projecting part and the second control mechanism for controling the binding mechanism for semi-compulsorily binding the film at the projecting part when the above mentioned intermittently feeding mechanism does not feed the film.

The fourth purpose of the present invention is to offer the projector capable of the standing still, the motion picture projection, the still picture projection, and the quick film feeding as well as winding back by operating a cam on which a plural number of the cam parts are formed.

The fifth purpose of the present invention is to offer a projector provided with the power transmission mechanism remarkably simple in composition and capable of balancing the tension of the belt part provided between the pulleys and keeping the elongation of the belt as well as the partial looseness when the driven side pulley serving to rotate the feeding shaft with a driving side pulley by means of a belt and the driven side pulley serving to rotate the winding up shaft are rotated.

Further other purposes of the present invention will be disclosed out of the explanations to be made below in detail in accordance with the accompanying drawings.

BRIEF DESCRIPTION OF THE DRAWINGS

FIG. 3 to FIG. 10 show various components shown in FIG. 1 and FIG. 2 in detail, whereby;

FIG. 3 shows the mechanism for controling the movement of the slide bar 84, the main switch 61, the lamp switch 162 and frequency modulator 207 and its control states, whereby;

FIG. 3(a) shows a section along the line III—III of FIG. 2.

FIG. 3(b) shows the state in which the finger 2a of the nob 2 is set at the mark "A" on the cine-projector body, whereby the cine-projector stands still.

FIG. 3(c) shows the state in which the finger 2a is set at the mark "B" whereby the cine-projector projects pictures in motion.

FIG. 3(d) shows the state in which the finger 2a is set at the mark "C", whereby the cine-projector projects a picture but not in motion.

FIG. 3(e) shows the state in which the finger 2a is set at the mark "D", whereby the cine-projector winds back the film quickly.

In the above drawings the relations between the mode change over cam 60 and the swing lever 58 as well as the then states of the swing lever 58 are respectively shown.

Figure 2:
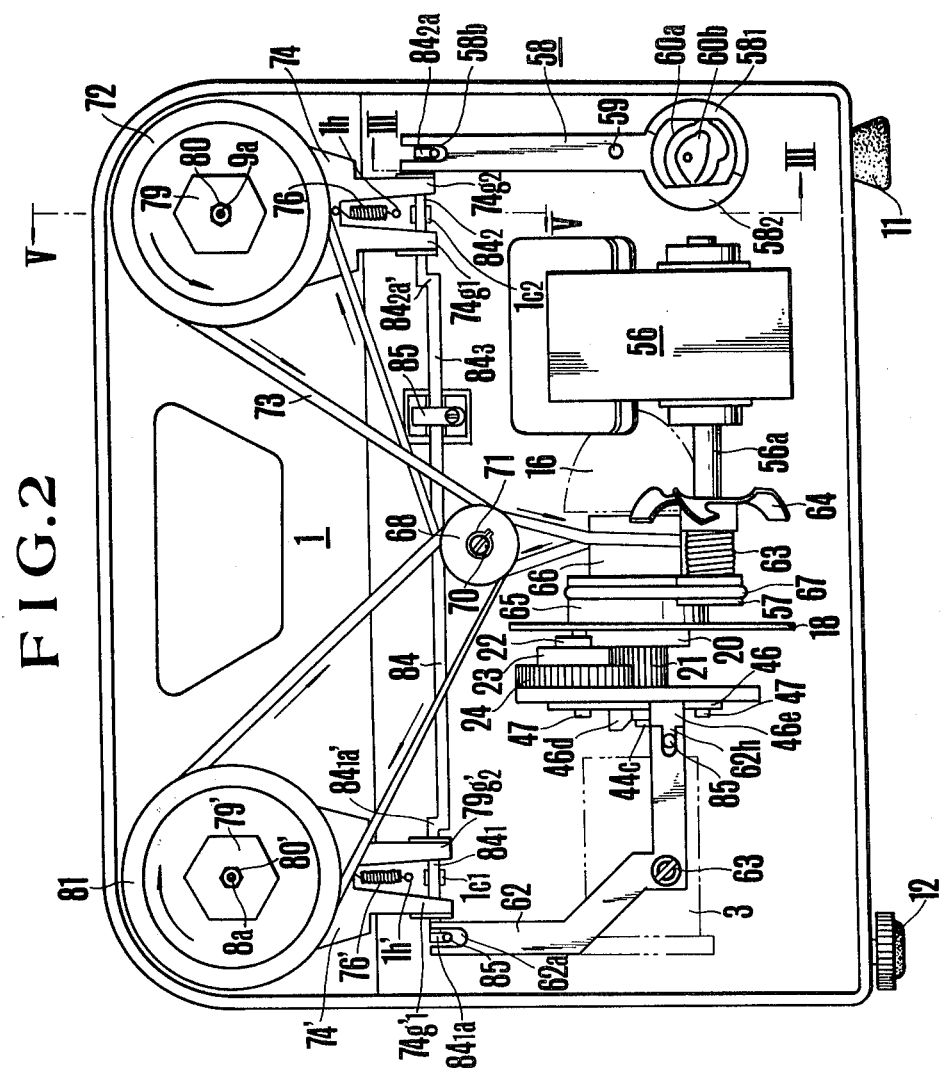
FIG. 2 shows the back of the cine-projector shown in FIG. 1 in elevation.

FIG. 4 shows in detail the driving power transmission mechanism shown in FIG. 2, whereby;

FIG. 4(a) shows the circuit for controling the driving of the cine-projector in accordance with the present invention, the driving power transmission mechanism and its surrounding mechanisms in perspective view.

FIG. 4(b) shows the section of the pulley 63 shown in FIG. 4(a) along the line IV—IV.

Figure 1:
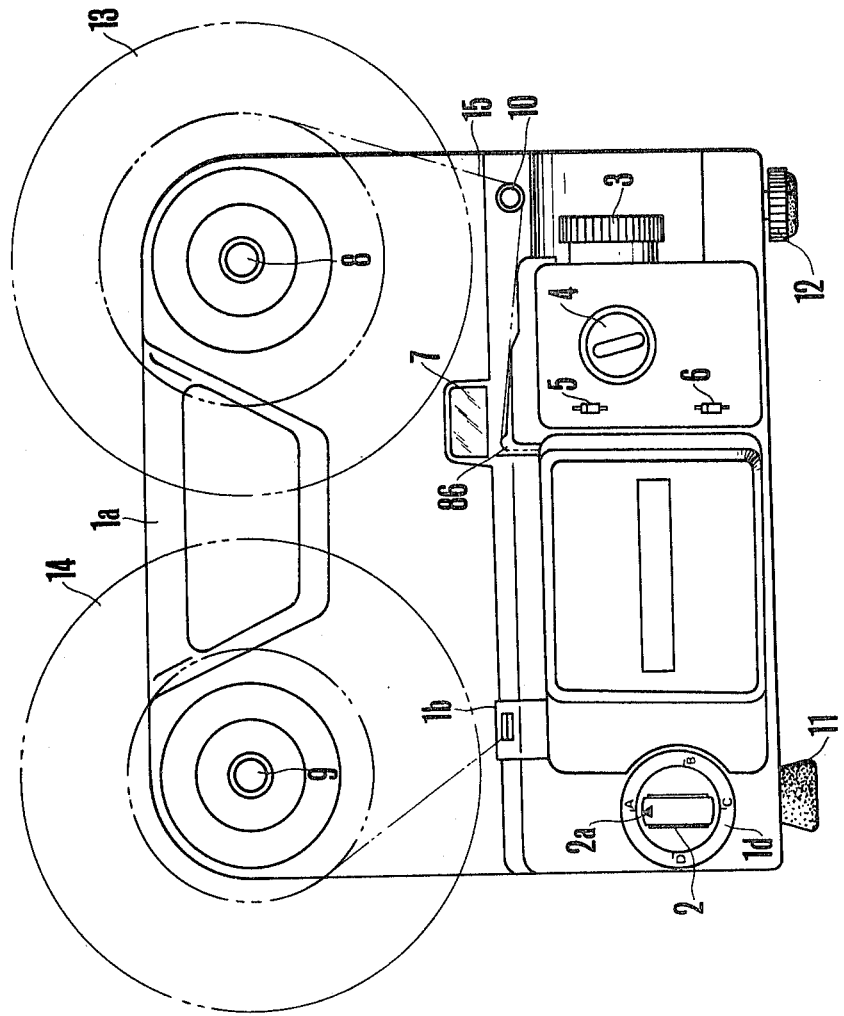
FIG. 1 shows the first embodiment of the cine-projector in accordance with the present invention in elevation.
Figure 5:
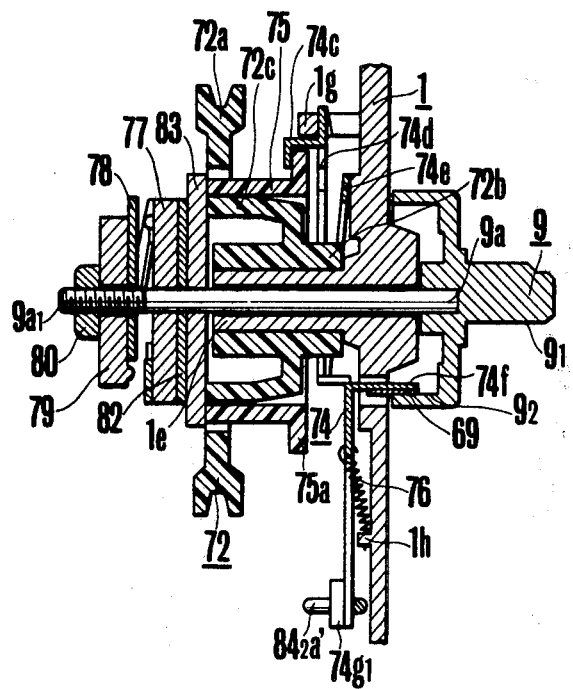
Figure 6:
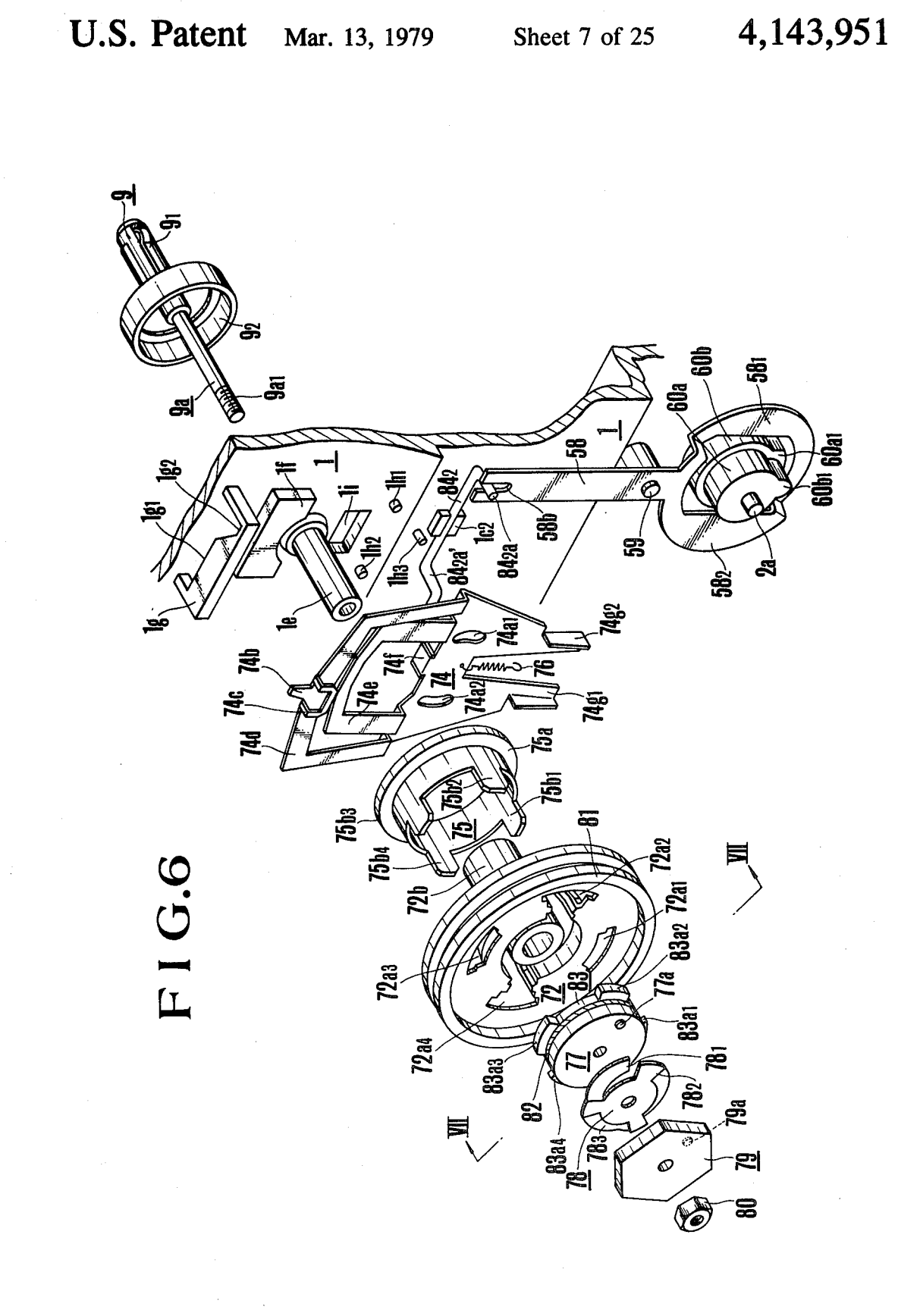

FIG. 5 and FIG. 6 respectively show the clutch mechanism for connecting respectively interrupting the transmission of the driving power from the motor 56 to the winding up shaft 9 of the cine-projector shown in FIG. 1 and FIG. 2, whereby;

FIG. 5 shows the section along the line V—V of FIG. 2, while

FIG. 6 shows the components shown in FIG. 5 taken apart in perspective view.

Figure 14:
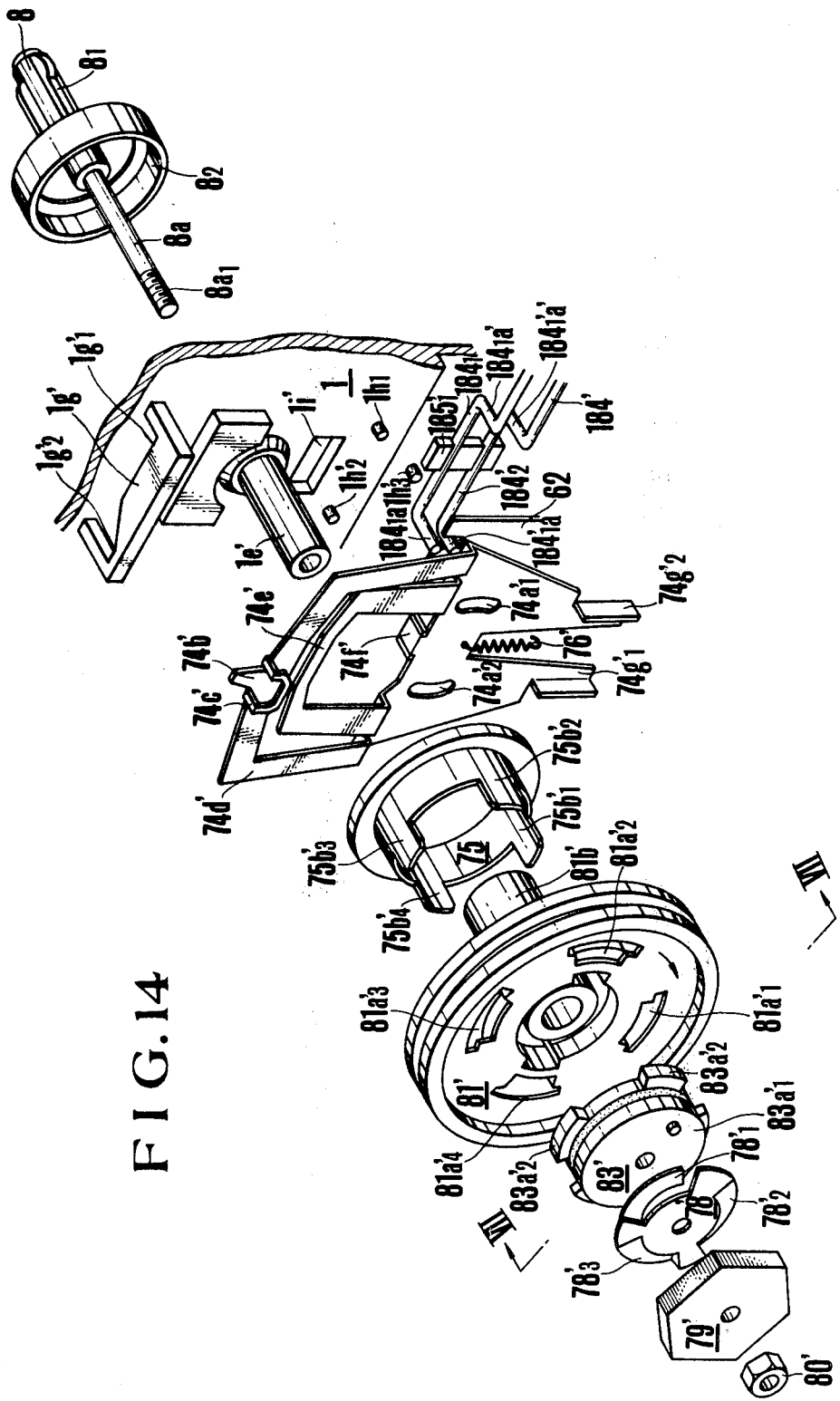

FIG. 7 shows the relation between the reel pulleys 72 and 81 and the clutch claw members 75 and 75' shown in FIGS. 5, 6, 9 and 14, whereby;

FIG. 7(a) shows a section along the line VII—VII of FIGS. 6, 9 and 14, while

FIG. 7(b) and (c) respectively show the relation between the clutch claw member and the clutch claw receiving member, whereby the finger 2a, 102a of the nob 2, 102 is respectively set at the mark "A", "B", "C" and "D" of the cine-projector body 1.

FIG. 8 shows the relation between the operation plate 74 and the slide bar 84, the swing lever 58 in the clutch mechanism of the winding up shaft, whereby;

FIG. 8(a) shows the state in which the finger 2a of the nob is set at the mark "A" of the cine-projector body 1, whereby the cine-projector stands still and the state in which the finger 2a is set at the mark "C" whereby the cine-projector projects a picture but not in motion, while FIG. 8(b) shows the state in which the finger 2a is set at the mark "B", whereby the cine-projector projects pictures in motion and FIG. 8(c) shows the state in which the finger 2a is set at the mark "D" whereby the cine-projector winds back the film quickly.

In the above drawings the positions which the operation plate 74, the slide bar 82 and the swing lever 58 assume, are respectively shown.

FIG. 9 shows the clutch mechanism for connecting and interrupting the transmission of the driving power from the motor 56 to the feed shaft 8 of the cine-projector shown in FIGS. 1 and 2 and its surrounding components in perspective view.

FIG. 10 shows the projecting part of the cine-projector shown in FIGS. 1, 2, 11 and 12 partially taken apart in perspective view.

FIG. 11 shows the second embodiment of the cine-projector in accordance with the present invention in elevation.

FIG. 12 shows the back of the cine-projector shown in FIG. 11 in elevation, whereby the back cover is taken off.

Figure 13A:
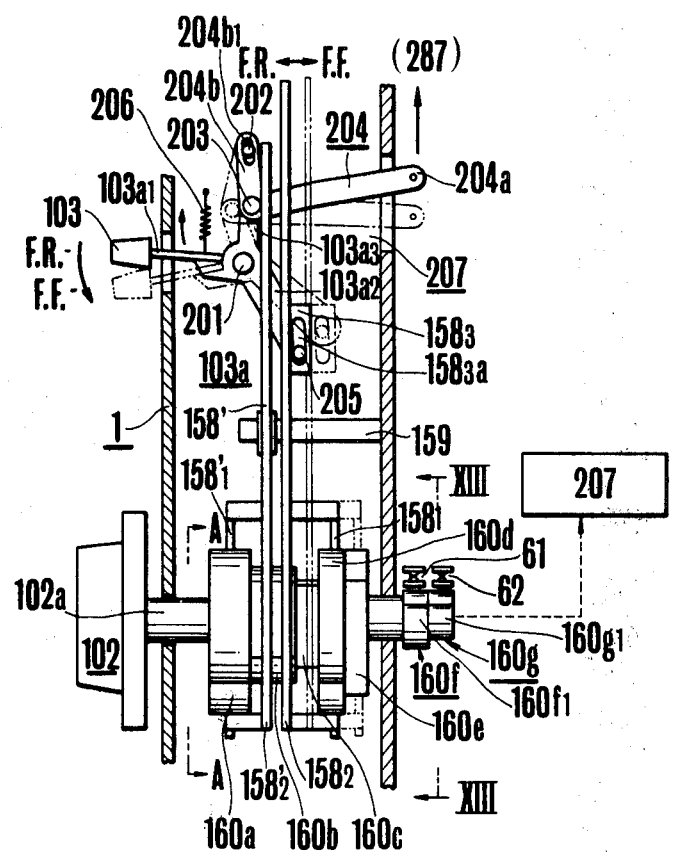

FIG. 13 to FIG. 18 respectively show various components shown in FIG. 11 and FIG. 12 in detail, whereby;

FIG. 13 shows the movements of the first slide bar 184 and the second slide bar 184', the mechanism for controling the main switch 61, the lamp switch 62 and the frequency modulator 207 and its control state, whereby;

FIG. 13(a) shows the section along the line XIII—XIII of FIG. 12, while

FIG. 13(b) shows the state in which the finger 102a of the nob 102 is set at the mark "A" of the cine-projector body 1, whereby the cine-projector stands still.

FIG. 13(c) shows the state in which the finger 102a is set at the mark "B", whereby the cine-projector projects pictures in motion.

FIG. 13(d) shows the state in which the finger 102a is set at the mark "C", whereby the cine-projector projects a picture but not in motion.

Figures 1, 13E:
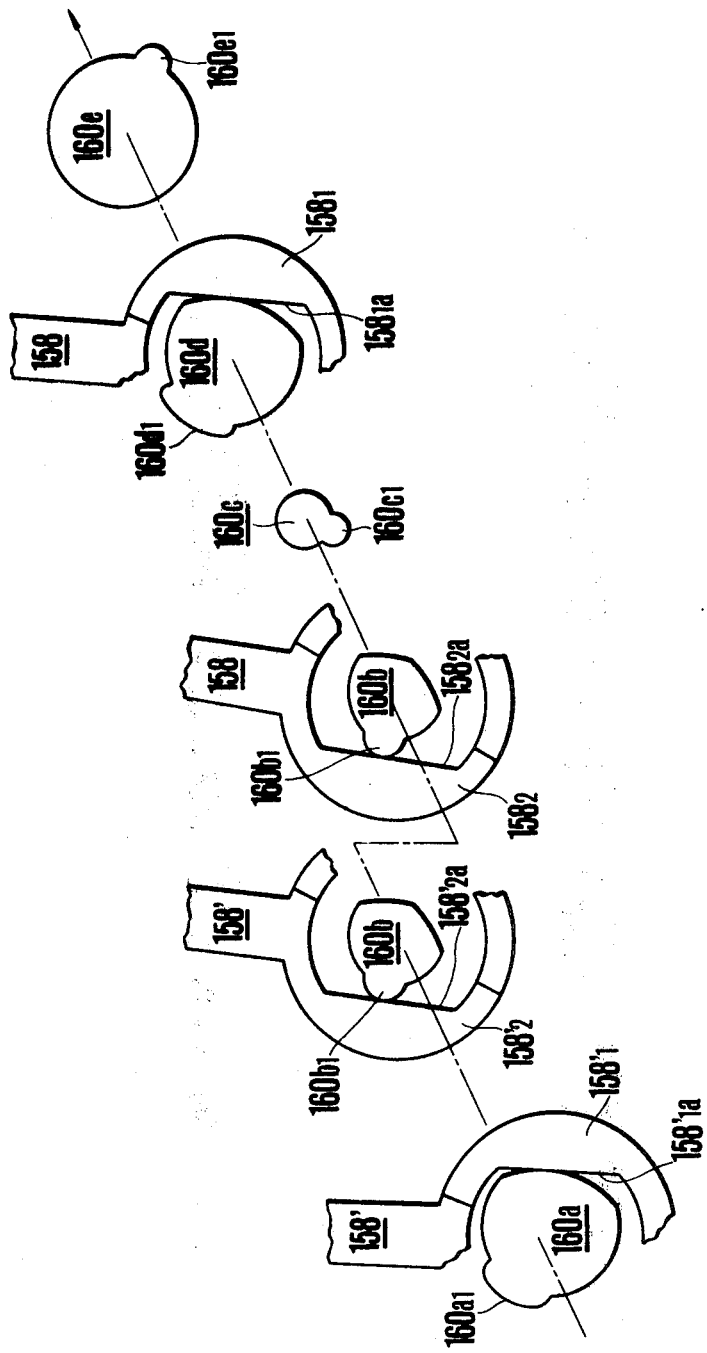

FIG. 13(e) shows the state in which the finger 102a is set at the mark "D", while the nob 103 is set at the mark "F.R." of the cine-projector body 1, whereby the cine-projector winds back the film quickly, and FIG. 13(f) shows the state in which the finger 102a is set at the mark "D" while the nob 103 is set at the mark "F.F" of the cine-projector body 1, whereby the cine-projector winds back the film quickly. In the above drawings, the relations between the mode change over cam 160, the first swing lever 158 and the second swing lever 158' as well as the states which the first swing lever 158 and the second swing lever 158' assume, are respectively shown. Further, FIG. 13(e)-1 and (f)-1 respectively show the state shown in FIG. 13(e) and the state shown in FIG. 13(f), whereby the follower of each lever and each cam part of the mode change over cam are shown separated from each other.

FIG. 14 shows the clutch mechanism for connecting and interrupting the transmission of the driving power from the motor 56 to the feeding shaft of the cine-projector shown in FIGS. 11 and 12 and its surrounding component in perspective view.

Figure 15:
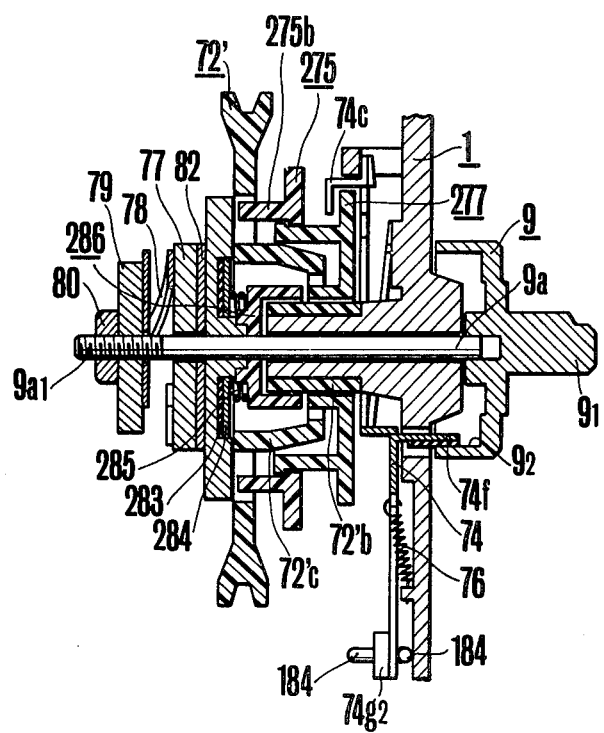

FIGS. 15 and 16 respectively show the clutch mechanism for connecting and interrupting the transmission of the driving power from the motor 56 to the winding up shaft of the cine-projector shown in FIGS. 11 and 12 and its surrounding components, whereby;

FIG. 15 shows the section along the line XV—XV of FIG. 12, while

FIG. 16 shows various components shown in FIG. 15, taken apart in perspective view.

FIG. 17 shows the relation between the reel pulley 72', the first clutch claw member 277, the second clutch claw member 275 and the second clutch claw receiving member, whereby, FIG. 17(a) and (b) respectively show the section along the line XVI—XVI of FIG. 16, while, FIG. 17(c)-(e) respectively show the relation between the first clutch claw member 277 and the first clutch claw receiving member as well as the relation between the second clutch claw member 275 and the second clutch claw receiving member 83 in accordance with the position set at by the finger 102a of the nob 102 and by the nob 103.

Figure 18A:
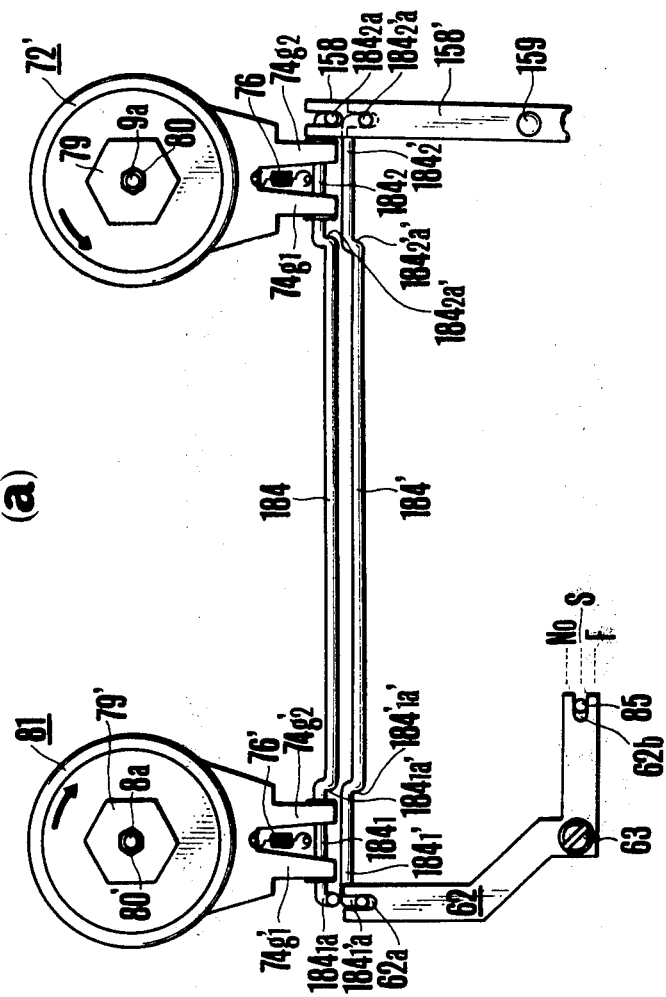
Figure 18:
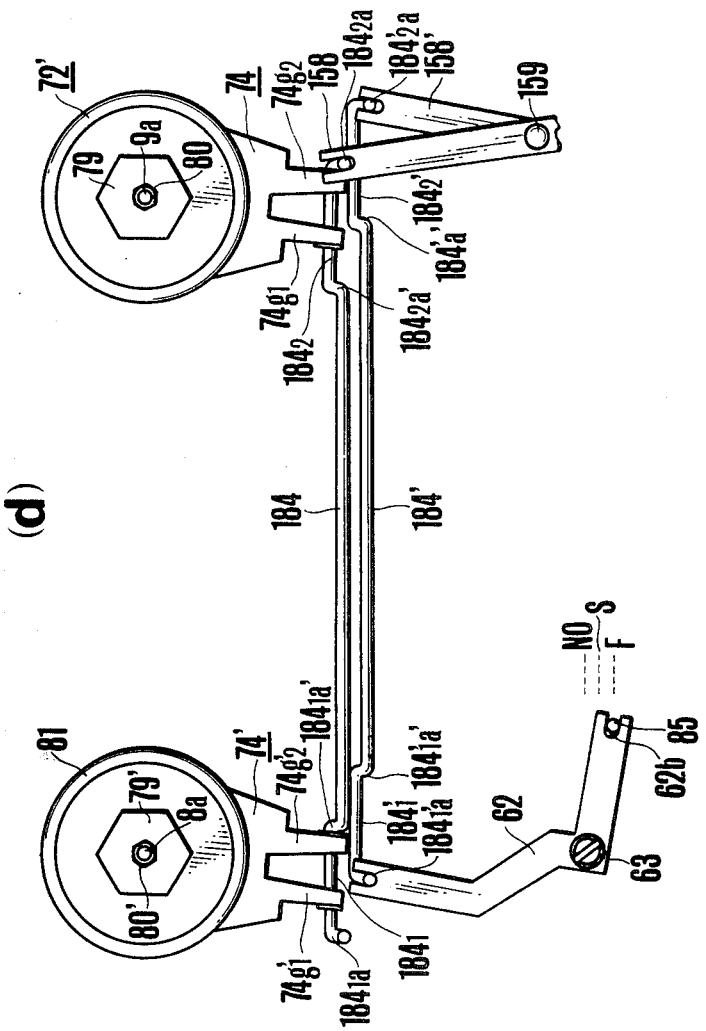

FIG. 18 shows the relation between the operation plates 74, 74', the first and the second swing lever 158, 158', the first and the second slide bar 184, 184' and the bell crank 62, whereby;

FIG. 18(a) shows the state in which the finger 102a of the nob 102 is set at the mark "A" or "C" of the index 101d of the cine-projector 1, whereby the cine-projector stands still or projects a picture but out of motion, while, FIG. 18(b) shows the state in which the finger 102a is set at the mark "B", whereby the cine-projector projects pictures in motion.

FIG. 18(c) shows the state in which the finger 102a is set at the mark "D" while the nob 103 is set at the mark "F.R." of the cine-projector 1, whereby the cine-projector winds back the film quickly.

FIG. 18(d) shows the state in which the finger 102a is set at the mark "D" while the nob 103 is set at the mark "F.F." whereby the cine-projector winds back the film quickly. In the above drawings, the positions which the operation plates 74, 74', the first and the second swing lever 158, 158', the first and the second slide bar 184, 184' and the bell crank assume, are shown.

DESCRIPTION OF THE PREFERRED EMBODIMENTS

Below several embodiments of the cine-projector in accordance with the present invention will be explained in detail in accordance with the accompanying drawings.

FIG. 1 shows the first embodiment of the cine-projector in accordance with the present invention in elevation, whereby 1 is the main body of the cine-projector, 1a the hand grip formed on the main body 1 for transporting the cine-projector and 1b the film outlet provided on the main body 1. 2 is the rotary nob for controlling the main switch, the motion picture projection, the still picture projection and the quick film winding back, so designed that by setting the finger 2a provided on the nob 2 at the mark on the index 1d provided on the main body 1, the opening and the closing of the main switch, the motion picture projection mode, the still picture projection mode or the quick film winding back mode can be changed over. 3 is the lens barrel holding the projection lens, being provided on the main body 1. 4 is the focusing nob rotatably provided on the main body 1, being so designed that by rotating the nob 4 the lens barrel 3 is moved forwards and backwards so as to adjust the focusing, whereby the conventional means is adopted in this mechanism. 5 is the nob for slow motion operation, while 6 is the nob for framing, whereby these nobs will be explained later. 7 is the pilot display window, 8 the feeding shaft on which the film feeding reel 13 is mounted, 9 the winding up shaft on which the film winding up reel 14 is mounted, 10 the film guide roller rotatably provided on the main body 1 and 86 the film damper whose one end is fixed on the main body 1. 11 is the support foot fixed on the bottom surface of the main body 1, while 12 is also the support foot screwed into the bottom surface of the main body 1. The length of the foot 11 can not be adjusted while that of the foot 12 can optionally be adjusted, by adjusting the amount screwed into the main body 1.

In case of the cine-projection, the feed reel 13 on which the film 15 to be projected is wound up is mounted on the feeding shaft 8, while the end of the film 15 is drawn out of the feed reel 13 and introduced into the main body 1 via the film guide roller 10 and the film damper 86. After having passed through the projection part (shown in FIG. 9 particularly in detail), the film introduced into the main body 1 is thrown out of the film outlet 1b so as to be wound up on the winding up reel 14 mounted on the winding up shaft 9.

FIG. 2 shows the cine-projector shown in FIG. 1 in elevation, whereby the back cover is taken off so as to disclose the disposition of the important components arranged inside of the cine-projector. The components in FIG. 2 are shown further in detail in FIGS. 3 to 10.

In consequence, the components to be explained below in accordance with FIGS. 3 to 10 will be understood more easily when the whole composition of the cine-projector shown in FIGS. 1 and 2 is referred to.

In FIG. 2, 84 is the slide bar being provided on the main body 1 by means of the slide bar holding members $1c_1$ and $1c_2$ of the main body 1 and the slide bar holding member 85 fixed on the main body 1 so as to be slidable along the lengswise direction. The both ends $84_1$ and $84_2$ of the slide bar 84 are nearly of C-shape, being somewhat twisted towards the other part $84_3$ of the slide bar 84. 62 is the bell crank rotatably pivoted by means of the pin 63 provided on the main body 1, whereby at both ends of the bell crank 62 the U-shaped notches 62a and 62b are respective formed in such a manner that the notch 62a is normally engaged with the folded part $84_1a$ of the slide bar 84. In consequence the bell crank 62 is rotated along the counter-clockwise direction around the pin 63 in functional engagement of the slide bar 84 which is moved horizontally to the left in FIG. 2, while the bell crank 62 is rotated along the clockwise direction around the pin 63 in functional engagement of the slide bar 84 which is moved horizontally in the right in FIG. 2. Hereby FIG. 2 shows the state in which the slide bar 84 assumes the central position while the bell crank 62 is also provided at the central position.

Below the mechanism for controlling the horizontal movement of the slide bar 84 will be explained in detail in accordance with FIGS. 2 and 3.

Figure 3:
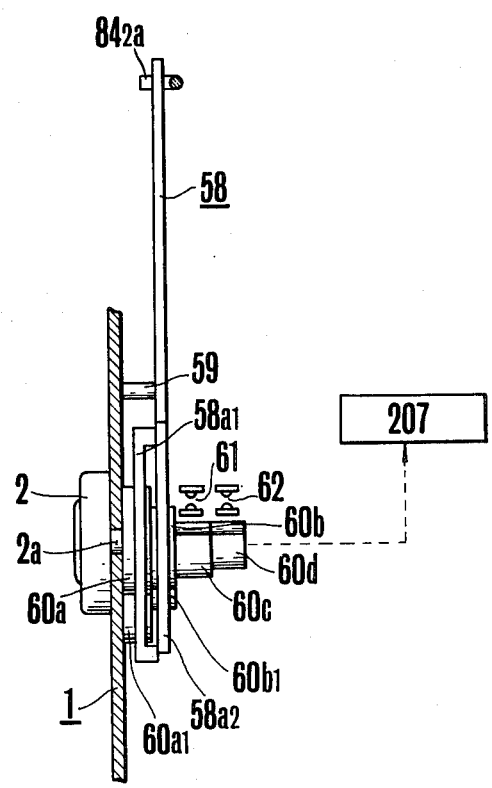

FIG. 3 shows the mechanism for controling the horizontal movement of the slide bar 84, the main switch 61 and lamp control switch 162 and the control states, whereby FIG. 3(a) shows the section along the line III—III of FIG. 2, while FIG. 3(b)–(f) respectively show a control state.

60 is the mode change over cam fixed on the rotary shaft 2a rotatably pivoted on the main body 1, consisting of the first cam memer 60a, the second cam member 60b, the third cam member 60c and the fourth cam member 60d. 58 is the swing lever rotatably pivoted by the pin provided on the main body 1. At the one end of the swing lever 58 a U-shaped notch 58b is formed in which the folded part $84_2a$ of the slide bar 84 is engaged, while at the other end the follower including the asymmetrical follower members $58_1$ and $58_2$ in slidable contact with the circumference of the mode change over cam 60 is provided. Hereby the right follower member $58_1$ is in slidable contact with the first cam member 60a of the mode change over cam 60, while the left follower member $58_2$ is in slidable contact with the second cam member 60b.

When the mode change over cam 60 is rotated by operating the nob 2 so as to bring the projection 60a of the first cam member 60a into contact with the follower surface $58_1a$ of the right follower $58_1$, the swing lever 58 is moved along the counter-clockwise direction around the pin 59 provided on the main body 1 as is shown in FIG. 3(c), while when the projection 60b of the second cam member 60b is brought into contact with the follower surface $58_2a$ of the left follower $58_2$ the swing lever 58 is moved along the counter-clockwise direction around the pin 59 as is shown in FIG. 3(e). 61 is the main switch controled by means of the third cam member 60c of the mode change over cam 60, while 162 is the lamp switch controled by the fourth cam member 60d of the mode change over cam 60.

The relations between the mode change over cam 60, the swing lever 58, the main switch 61 and the lamp switch 162 are as is shown in the following table, by operating the nob 2 in such a manner that the finger 2a provided on the nob 2 is set at the mark A (opening and closing of the main switch), B (motion picture projection mode), C (still picture projection mode) or D (quick film winding back mode) of the index 1d provided on the main body 1.

the left follower $58_2$ in such a manner that the swing lever 58 is arranged at the neutral position as is shown in FIG. 3(b). Further in this state the main switch 61 controled by means of the third cam member 60c and the lamp switch 162 controled by means of the fourth cam member 60d are in the opened state while the slide bar 84 is arranged in the neutral position (FIG. 2) by means of the swing lever 58.

When then the finger 2a of the nob 2 is set at the mark

Table 1

| Position of finger 2a of nob 2 on index 1d | I | | | State of main switch 61 | State of lamp switch 162 | Corresponding drawing |
|---|---|---|---|---|---|---|
| | II | III | IV | | | |
| OFF [A] | out of contact | out of contact | neutral position | OPEN | OPEN | FIG. 3(b) |
| Motion picture projection [B] | in contact | out of contact | position moved along the counter-clockwise direction | CLOSE | CLOSE | FIG. 3(c) |
| Projection standing still [C] | out of contact | out of contact | neutral position | CLOSE | CLOSE | FIG. 3(d) |
| Quick film winding back [D] | out of contact | in contact | position moved along the clockwise direction | OPEN | OPEN | FIG. 3(e) |
| OFF [A] | out of contact | out of contact | neutral position | OPEN | OPEN | FIG. 3(b) |

Hereby the words to be inserted in a - d, E - M in the above table 1 are as follows:

I: Relation between the first cam 60a respectively the second cam 60b of the mode change over cam 60 and the swing lever 58 and the position which the swing lever 58 assumes.

II: Relation between the follower surface $58_1a$ of the right follower $58_1$ and the projection $60a_1$ of the first cam member 60a.

III: Relation between the follower surface $58_2a$ of the left follower $58_2$ and the projection $60b_1$ of the second cam member 60b.

IV: Position which the swing lever 58 assumes.

Namely, when the finger 2a of the grip 2 of the present embodiment of the cine-projector is set at the mark "A" [OFF] of the index 1d of the main body, the projection $60a_1$ of the first cam 60a of the mode change over cam 60 assumes a position at which the projection $60a_1$ is not in contact with the follower surface $58_1a$ of the right follower $58_1$ and the projection $60b_1$ of the second cam 60b assumes a position at which the projection $60b_1$ is not in contact with the follower surface $58_2a$ of "B" (motion picture projection) of the index 1d on the main body 1, the projection 60a of the first cam 60a of the mode change over cam 60 assumes a position at which the projection $60a_1$ is in contact with the follower surface $58_1a$ while the projection $60b_1$ of the second cam 60b assumes a position at which the projection $60b_1$ is not in contact with the follower surface $58_2a$ in such a manner that the swing lever 58 is rotated around the pin 59 as is shown in FIG. 3(c) so as to assume a counter-clockwise position. Further in this state the main switch 61 and the lamp switch 162 are the closed state, being controled by means of the third cam 60c and the fourth cam 60d while the slide bar 84 is arranged at the position moved to the left in FIG. 2 by means of the swing lever 58.

When then the finger 2a of the nob 2 is set at the mark "C" (still picture projection) of the index 1d on the main body 1, the projection $60a_1$ of the first cam 60a of the mode change over cam 60 assumes a position at which the projection $60a_1$ is not in contact with the follower surface $58_1a$ of the right follower $58_1$ and the projection $60b_1$ of the second cam $60b$ assumes a position at which the projection $60b_1$ is not in contact with the follower surface $58_2a$ of the left follower 58 is such a manner that the swing lever 58 is arranged at the neutral position as is shown in FIG. 3(c). Further in this state the main switch 61 and the lamp switch 162 are brought into the closed state, being controled by means of the third cam 60c and the fourth cam 60d, while the slide bar 84 is arranged at the neutral position by means of the swing lever 58.

When then the finger 2a of the nob 2 is set at the mark "D" (quick film winding back) of the index 1d on the main body 1, the projection $60a_1$ of the first cam 60a of the mode change over cam 60 assumes a position at which the projection $60a_1$ is not in contact with the follower surface $58_1a$ of the right follower $58_1$ while the projection $60b_1$ of the second cam 60b assumes a position at which the projection $60b_1$ is in contact with the follower surface $58_2a$ of the left follower $58_2$ in such a manner that the swing lever 58 is rotated around the pin 59 as is shown in FIG. 3(d) so as to be arranged along the clockwise direction. Further in this state the main switch 61 is brought into the closed state, being controled by means of the third cam 60c, while the lamp switch 162 is brought into the opened state, being controled by means of the fourth cam 60d whereby the slide bar 84 is arranged at the position moved to the right in FIG. 2 by means of the swing lever 58.

Hereby the finger 2a of the nob 2 can be set at the above mentioned marks of the index 1d on the main body 1 simply by rotating the nob 2, whereby the nob 2 can be rotated either forwards or backwards.

FIG. 4 shows the driving power transmission mechanism shown in FIG. 2 and its surrounding mechanisms together with the electrical circuit of the cine-projector in accordance with the present invention in perspective view. In FIG. 2 and FIG. 4, 16 is the cine-projection lamp held by means of the not shown lamp holder fixed on the main body 1, whereby the lamp is controled by means of the afore mentioned lamp switch 62. 56 is the induction motor fixed on the main body 1, being so designed that when the finger 2a of the nob 2 is set at the mark "D" the motor 56 rotates at the higher speed by means of the frequency modulator 56a in functional engagement with the afore mentioned cam 60 than when the finger 2a of the nob 2 is set at other mark "B" or "C". 56a is the shaft of the motor 56. 57 is the pulley provided on the motor shaft 56a, whereby the motor shaft is rotatable against the motor shaft 56a but not slidable along the axial direction. 64 is the motor cooling fan fixed on the motor shaft 56a, although not shown in FIG. 4. 63 is the compression spring provided between the pulley 57 and the cooling fan 64 on the motor shaft 56a, whereby the one end of the compression spring is engaged with the pulley 57 while the other end is engaged with the cooling fan 64 so as to constitute the coil clutch mechanism. 19 is the shutter shaft rotatably pivoted on the main body 1, whereby the shutter blade 18 is fixed on the shutter shaft 19. 65 is the intermediary reduction pulley fixed on the shutter shaft 19, whereby the driving power transmission belt 26 is provided between the intermediary pulley 65 and the above mentioned output pulley 57. 66 is the driving side pulley fixed on the shutter shaft 19, while 68 is the pulley rotatably provided on the shaft 70 fixed on the main body 1, whereby three grooves $68_1$, $68_2$ and $68_3$ are provided around the pulley (FIG. 4(a) (b). 81 is the feeding side reel pulley rotatably provided on the main body 1, while 72 is the winding up side pulley rotatably provided on the main body 1. 73 is a belt provided between the pulleys 66, 68, 81 and 72, so designed as to run along the course shown a → b → c → d → e → f → a, namely in such a manner that the belt 73 passes through the pulley 68 without fail before passing through the pulleys 66, 81 and 72. Namely the belt 73 leaves the driving side pulley 66, reaches the winding up pulley 72 via the groove $68_1$ of the pulley 68, then reaches the feeding side reel pulley 81 via the groove $68_2$ of the pulley 88 and then returns to the driving side pulley 66 via the groove $68_3$ of the pulley 68 (FIG. 4(a)). As is shown in detail in FIG. 4(b), in case of the grooves $68_1$, $68_2$ and $68_3$ provided on the pulley 68, D' of the groove $68_2$ with which the belt part d is in contact is formed a little smaller than D of other grooves $68_1$ and $68_2$.

The driving power transmission mechanism shown in FIG. 4 is one of the mechanisms characterizing the cine-projector in accordance with the present invention.

Namely, the driving power transmission mechanism shown in FIG. 4, of the cine-projector in accordance with the present invention is so designed that a pulley 68 as an idler is provided between the feeding side reel pulley 81, the winding up side reel pulley 72 and the driving pulley 66, whereby the afore mentioned belt 73 is provided between the pulleys 66, 72 and 81 via this pulley 68. Thus, when the shutter shaft 19 is rotated by means of the driving power of the motor 56 via the motor shaft 56, the pulley 57, the belt 67 and the pulley 65 so as to rotate the driving side pulley 66 along the direction of the arrow in FIG. 4(a), the belt 73 runs along the direction of the arrow in FIG. 4(a) between the pulleys 66, 72 and 81 while the pulley 68 rotates along the direction of the arrow in FIG. 4(a) so as to drive the pulleys 72 and 81 along the direction of the arrow in FIG. 4(a). Hereby the belt 73 passes through the pulley 68 without fail between the pulleys (66 → 72, 72 → 81, 81 → 66), so that is is possible to shorten the length of the belt portions positioned between the pulleys 66, 72, 81 and 68 as shown by a, b, c, d, e and f in FIG. 4(a), namely the length of the belt portions which are not in contact with either of the pulleys 66, 72, 81 and 68, whereby further although in a subsidary way the pulley 68 acts as a driving shaft for the belt portions shown by a - b, and c - d in such a manner that even when the load on the feeding shaft 8 in functional engagement with the pulley and that on the winding up shaft 9 in functional engagement with the pulley 72 fluctuate or even when the driving speed is raised the differences between the tensions of the belt portions running between the pulleys 66, 72 and 81 are distributed and comparatively balanced with each other while further the influence of the load fluctuation can be checked in such a manner that the loosening of the belt portion running between the pulleys and the elongation of the whole belt can be kept as small as possible while the vibration of the running belt portions can be eliminated whereby a stabilized and smooth rotation can be obtained for the pulleys 72 and 81. Further in case of the driving power transmission mechanism shown in FIG. 4, of the cine-projector in accordance with the present invention, the diameter of the groove $68_2$ is choosen a little smaller than that of other grooves $68_1$ and $68_3$. The purpose is to keep the loosening of the portion d of the above mentioned belt 73 as small as possible even if after a long term of the utilization the belt 73 is somewhat elongated, by differing the diameter of the groove $68_2$ of the pulley 68 with which the belt portion d which must be free from elongation is in contact from that of the grooves $68_1$ and $68_2$ with which other belt portions are in contact. Namely the circumferential speed of the belt portion (c - d) in contact with the groove $68_2$ of the pulley 68 is lower than that of the portion (e - f) in contact with the groove $68_3$ by the amount corresponding to the difference (D - D') of the diameters D, D' of the grooves $68_2$, $68_3$ in such a manner that the running speed of the belt at d differs from that at e, so that the tension of the portion at d is increased so as to avoid a large elongation in the belt portion d.

Hereby the pulleys 57, 65, 66, 68, 72 and 81 consist of plastic material, whereby the pulleys 65 and 66 are formed as one body.

FIGS. 5 and 6 show the clutch mechanism at the winding up shaft portion for connecting and interrupting the transmission of the driving power from the motor 56 to the winding up shaft 9 of the cine-projector shown in FIG. 1 and FIG. 2, and its surrounding members, whereby FIG. 5 shows a section along the line V — V of FIG. 2 while FIG. 6 shows the members shown in FIG. 5 taken apart together with their surrounding members in perspective view.

In FIGS. 5 and 6, 9 is the winding up shaft shown in FIGS. 1 and 4, consisting of the mount portion $9_1$ on which the winding up reel 14 is mounted and of the cylindrical portion $9_2$. Further on the winding up shaft 9 a bar 9a at whose one end a screw portion $9a_1$ is provided, while the bar 9a is rotatably pivoted by means of a cylindrical bearing 1e formed at a part of the main body 1. $1h_1$, $1h_2$ and $1h_3$ are the pins provided on the main body 1, 1f the projection projecting from the main body 1 and 1i the brake window provided at a part of the main body 1. 1g is the C-shaped reel clutch change over cam part projecting from the main body 1, whereby the cam part 1g consists of the first cam surface $1g_1$ and the second cam surface $1g_2$ deeper than the first cam part $1g_1$.

74 is the reel clutch operation plate. This reel clutch operation plate 74 consists of a long circular guide boring $74a_1$ in which the pin $1h_1$ engages, a long circular guide boring $74a_2$ in which the pin $1h_2$ engages, the cam follower portion 74b, in slidable contact with the cam surfaces $1g_1$, $1g_2$ of the reel clutch change over cam part 1g of the main body 1, the clutch claw member holding part 74c, the first spring part 74d, the second spring part 74e, the brake part 74f extending to the side of the main body 1 and two feet $74g_1$ and $74g_2$. The afore mentioned first spring part 74d serves to bring the cam follower 74b normally in contact with the cam surfaces $1g_1$ and $1g_2$ of the reel clutch change over cam part 1g, while the second spring part 74e serves to balance the force exercised on the first spring part 74d from the cam surfaces $1g_1$ and $1g_2$ of the cam part 1g ith the force of the first spring part 74d and to stabilize the rotation of the long guide borings $74a_1$ and $74a_2$ of the reel clutch operation plate 74 along the pins $1h_1$ and $1h_2$.

As is shown in FIG. 5 is the mounted state, the cam follower part 74h of the operation plate 74 is arranged in the change over cam part 1g, while the brake part 74f is arranged in the brake window 1i and the pins $1h_1$ and $1h_2$ are engaged respectively in the long borings $74a_1$ and $74a_2$. Further the second spring part 74c is in contact with the projection 1f and the cam follower part 74h is in contact with the cam surface of the change over cam part 1g, while the brake part 74f projects out of the main body 1 through the brake window 1i so as to extend into the inside of the cylindrical part 92 of the winding up shaft 9. On a part (the surface opposed to the internal wall of the above mentioned cylindrical part 92) of the brake part 74f the brake member 69 consisting of for example rubber with large friction coefficient. The feet $74g_1$ and $74g_2$ of the operation plate 74 are provided between the folded parts $84_2a$ and $84_2a'$ of the C-shaped slide bar 84. 76 is a tension spring whose one end is engaged with the operation plate 74 and whose other end is engaged with the pin $1h_3$ of the main body 1, serving to urge the operation plate 74 to return to the neutral position.

The operation of the above mentioned operation plate 74 is controled in various ways in accordance with the position relative to the slide bar 84 as follows.

(1) When the slide bar 84 is arranged in the neutral position as is shown in FIG. 2, the folded parts $84_2a$, $84_2a'$ of the slide bar 84 assume the position in which they are not in contact with either the foot $74g_1$ or the foot $74g_2$ of the operation plate, whereby the operation plate 74 is kept at the neutral position by means of the strength of the spring 76 as is shown in FIG. 8(a). In this state, the cam follower part 74b of the operation plate 74 is in contact with the cam surface $1g_1$ of the reel clutch change over cam part 1g. Namely, the operation plate 74 assumes a state rotated along the backward direction (along the direction along which the feet $74g_1$ and $74g_2$ of the operation plate 74 are more distant from the main body 1) around the borings $74a_1$ and $74a_2$ in which the pins $1h_1$ and $1h_2$ are respectively engaged, so that the brake part 74f is translated downwards in such a manner that the brake member 69 provided on the brake part 74f is pressed against the internal wall of the cylindrical part 92 of the winding up shaft so as to brake the rotation of the winding up shaft 9.

(2) When the slide bar 84 is arranged at a position translated to the left in FIG. 2, the folded part $84_2a$ of the slide bar 84 urges the foot $74g_2$ of the operation plate 74 to the left against the strength of the spring 76 working upon the operation plate 74 so as to keep the operation plate 74 in the state rotated along the clockwise direction as is shown in FIG. 8(b). When the operation plate 74 is rotated along the clockwise direction by means of the slide bar 84, the cam follower part 74b of the operation plate 74 slides over the cam surface $1g_1$ of the reel clutch change over cam part 1g so as to be arranged on the cam surface $1g_2$. The cam surface $1g_2$ is deeper than the cam surface $1g_1$ so that the operation plate 74 assumes the state rotated forwards, whereby the brake part 74f is translated upwards in such a manner that the engagement of the brake member 69 with the internal wall of the cylindrical part 92 of the winding up shaft 9 is released so as to allow the rotation of the winding up shaft 9.

(3) When the slide bar 84 is arranged at the position translated to the right in FIG. 2, the folded part $84_2a'$ of the slide bar 84 urges the foot $74g_1$ of the operation plate 74 to the right against the strength of the spring 76 working upon the operation plate 74 so as to keep the operation plate 74 at the position rotated along the counter-clockwise direction as is shown in FIG. 8(c). When the operation plate 74 is rotated along the counter-clockwise direction by means of the slide bar 84, the cam follower part 74b of the operation plate 74 slides over the cam surface $1g_1$ of the reel clutch change over cam part 1g so as to be arranged at the left end of the cam surface $1g_1$. Hereby the cam surface $1g_1$ consists of an even plane so that the operation plate 74 assumes the position rotated backwards in such a manner that the brake member 69 provided on the brake part 74f is pressed against the internal wall of the cylindrical part 92 of the winding up shaft 9 so as to brake the rotation of the winding up shaft 9.

The cylindrical part 72b formed at the center of the winding up side reel pulley 72 is rotatably adapted on the circumference of the cylindrical bearing part 1e formed on the main body 1. On the side surface of the pulley 72 borings $72a_1$, $72a_2$, $72a_3$ and $72a_4$ are formed at an equal interval from each other. Further on the one side surface of the pulley 72 opposite to the operation plate 74a cylindrical part 72c is formed so as to connect the cylindrical part 72b with the pulley part 72a. 75 is a ring-shaped clutch claw member slidably and rotatably provided on the circumference of the cylindrical part 72c of the winding up side reel pulley 72. At the one end of the clutch claw member 75 facing to the operation plate 74a flange part 75a is formed so as to project out of the circumference of the clutch claw member 75 while at the other end facing to the pulley 72 claw parts $75b_1$, $75b_2$, $75b_3$ and $75b_4$ are formed so as to project toward the pulley 72 at an interval corresponding to that in case of the borings $72a_1$, $72a_2$, $72a_3$ and $72a_4$ formed at the side surface of the pulley. Further the clutch claw member 75 is provided on the pulley 72 in such a manner that the claw parts $75b_1$, $75b_2$, $75b_3$ and $75b_4$ are adapted in the borings $72a_1$, $72a_2$, $72a_3$ and $72a_4$ of the pulley 72 as is shown in FIG. 7(a), while the clutch claw member holding part 74c of the operating plate 74 is engaged with the flange part 75a as is shown in FIG. 5 in detail. Further this clutch claw member 75 is slided to the right in FIG. 5 together with the operation plate 74 by means of the holding part 74c of the operation plate 74 engaged with the flange part 75a, when the operation plate is arranged at the neutral position shown in FIG. 8(a) or the operation plate 74 is inclined backwards in such a manner that the cam follower part 74b of the operation plate 74 is in contact with the same surface $1g_1$ of the reel clutch change over cam part 1g, whereby the tops of the claw parts $75b_1$, $75b_2$, $75b_3$ and $75b_4$ are withdrawn not so as to project from the side surface of the reel pulley 72 as is shown in FIG. 7(b) and further the operation plate 74 is arranged at the position moved along the clockwise direction at which the cam follower part 74b of the operation plate 74 is in contact with the cam surface $1g_2$ of the reel clutch change over cam part 1g as is shown FIG. 8(b), while when the operation plate 74 is inclined forwards, the tops of the claw parts $75b_1$, $75b_2$, $75b_3$ and $75b_4$ project largely from the side surface of the pulley 72, being pushed by means of the second spring part 74d of the operation plate 74 toward the pulley 74 as is shown in FIG. 7(c).

83 is a disc-shaped clutch claw receiving member rotatably provided on the bar 9a, whereby on the circumference of the clutch claw receiving member 83 claw receiving parts $83_1$, $83_2$, $83_3$ and $83_4$ are provided so as to project from the circumference at an interval corresponding to that in case of the borings $72a_1$, $72a_2$, $72a_3$, $72a_4$ formed on the side surface of the reel pulley 72. 82 is a disc shaped friction member consisting of for example rubber or cork with large friction coefficient, being provided on the bar 9a. 77 is a disc member provided on the bar 9a, whereby on the other surface of the disc member facing to the friction member 82 a pin 77a is provided so as to project from the surface. 78 is the clutch press spring member provided on the bar 9a, whereby on the spring member 78 three spring parts $78_1$, $78_2$ and $78_3$ are provided at an equal interval. Hereby the spring member 78 serves to normally press the clutch claw member 83, the friction member 82 and the disc member 77 against the pulley 72. 78 is the spring press plate secured on the screwed part $9a_1$ on the bar 9a, whereby on the side of the spring press plate 78 facing to the spring member 78 a boring 79a for receiving the pin 77a is provided at a position corresponding to that of the pin 77a on the above mentioned disc member 77. Hereby the spring press plate 79 and the disc member 77 are so arranged as to sandwitch the above mentioned clutch press spring member 78 between them, whereby the assembling is so carried out that the pin 77a of the disc member 77 is adapted into the boring 79a of the spring press plate 79 through the spring parts of the spring member 78. 80 is the nut in engagement with the screw part $9a_1$ of the bar 9a, whereby the nut 80 constitutes a double nut together with the spring press plate 79.

In other words, the nut 80, the spring press plate 79, the spring member 78 and the disc member are normally in a fixed engagement with the bar 9a while the friction member 82 and the clutch claw member 83 are not in a fixed engagement with the bar 9a, whereby by means of the frictional strength taking place between the friction member 82 and the disc member 77 and that taking place between the friction member 82 and the clutch claw member 83 when the disc member 77 presses the friction member 82 and the clutch claw receiving member 83 against the side surface of the pulley by means of the spring member 78, the friction member 82 and the clutch claw receiving member are in a semi-fixed engagement with the bar 9a. In consequence, if an extreme load is laid either on the clutch claw receiving member 83 or on the bar system (77, 78, 79, 80, 9a), the extreme load can be absorbed in the friction clutch mechanism (83, 82, 77). Further the contact surface of the clutch claw receiving member 83 and that of the pulley 72 are worked remarkably smooth in such a manner that both can slip over each other well.

The clutch mechanism of the winding up shaft part composed as mentioned above only rotate together with the clutch claw member 75 on the bearing part 1e of the main body 1 when the pulley 72 is rotated through the driving power transmission mechanism explained in accordance with FIG. 4 in case the tops of the claw parts $75b_1$, $75b_2$, $75b_3$ and $75b_4$ of the clutch claw member 75 are withdrawn beneath the side surface of the pulley 72 as is shown in FIG. 5 and 7(b), whereby the rotation is not transmitted to the shaft 9a and therefore the winding up shaft 9 is not rotated. When, as is shown in FIG. 7(c), the tops of the claw parts $75b_1$, $75b_2$, $75b_3$ and $75b_4$ of the clutch claw member 75 project largely from the side surface of the pulley 72, the claw parts $75b_1$, $75b_2$, $75b_3$ and $75b_4$ are engaged between the claw parts $83_1$, $83_2$, $83_3$ and $83_4$ of the clutch claw receiving member 83 (FIG. 7(a), whereby the clutch claw receiving member 83 is shown in line —..—), whereby the driving power is transmitted from the pulley 72 to the clutch claw receiving member 83. The driving power transmitted to the clutch claw receiving member 83 is further transmitted to the disc member 77 via the friction member 82 so as to rotate the winding up shaft 9 in cooperation with pulley 72.

FIG. 9 shows the clutch mechanism of the feeding shaft part for interrupting the power transmission from the motor 56 to the feeding shaft 8 of the cine-projector shown in FIG. 1 and 2 and it surrounding members in perspective view. The clutch mechanism of the feeding shaft part shown in FIG. 9 is composed almost in the same way as in case of the clutch mechanism of the winding up shaft part shown in FIG. 5 and 6. The only difference is that the position of the first cam surface $1g_1'$ and that of the second cam surface $1g'$ provided on the reel clutch change over cam part $1g'$ formed so as to project from the main body 1 in shape of C are inversed. Further the two feet $74g'_1$ and $74g'_2$ of the reel clutch operation plate 74' are arranged between the folded parts $84_1a$ and $84_1a'$ of the C-shape end $84_1$ of the slide bar 84. In the same way as in case of the winding up shaft 9 the feeding shaft 8 consists of the mount part $8_1$ on which the feed reel 13 is mounted and the cylindrical part $8_2$, while on the feeding shaft 8 a bar $8a$ on whose one end the screw part $8a_1$ is provided is arranged also in the same way. Thus the corresponding members of the clutch mechanism of the feeding shaft part to those of the clutch mechanism of the winding up shaft part shown in FIG. 5 and 6 are provided with same numerical figures with dash (').

The operation of the operation plate 74' in the clutch mechanism of the feeding shaft part is also controled in various ways in accordance with the position which the slide bar 84 assumes as follows:

(1) When the slide bar 84 is arranged at the neutral position as is shown in FIG. 2, the folded parts $84_1a$ and $84_1a'$ of the slide bar 84 assume the positions at which they are not in contact with either the foot $74g_1'$ or the foot $74g_2'$ of the operation plate 74' in such a manner that the operation plate 74' is kept at the neutral position by means of the strength of the spring 76'. In this state the cam follower part $74b'$ of the operation plate 74' is in contact with the cam surface $1g_1'$ of the reel clutch change over cam part $1g'$. In consequence the operation plate 74' assumes the state inclined backwards (along the direction along which the feet $74g_1'$ and $74g_2'$ of the operation plate 74' are more distant from the main body 1) around the long borings $74a_1'$ and $74a_2'$ in which the pins are respectively engaged, so that the brake part $74f'$ is translated downwards in such a manner that the brake member 69' provided on the brake part $74f'$ is pressed against the internal wall of the cylindrical part $8_2$ of the feeding shaft 8 so as to brake the rotation of the feeding shaft 8.

(2) When the slide bar 84 is arranged at the position translated to the left in FIG. 2, the folded part $84_1a'$ of the slide bar 84 urges the foot $74g_2'$ of the operation plate 74' to the left against the strength of the spring 76' working upon the operation plate 74' so as to keep the operation plate in the state rotated along the clockwise direction. When the operation plate 74' is translated along the clockwise direction by means of the slide bar 84, the cam follower part $74b'$ of the operation plate 74' slide over the cam surface $1g_1'$ of the reel clutch change over cam part $1g'$ so as to be arranged at the right end of the cam surface $1g_1'$. However the cam surface $1g_1'$ consists of an even plane so that the operation plate 74' assumes the state inclined backwards in such a manner that the brake member 69' provided on the brake part $74f'$ is pressed against the internal wall of the cylindrical part $8_2$ of the feeding shaft 8 so as to brake the rotation of the feeding shaft 8.

(3) When the slide bar 84 is arranged at the position translated to the right in FIG. 2, the folded parts $84_1a$ of the slide bar 84 urges the foot $74g_1'$ of the operation plate 74 against the strength of the spring 76' working upon the operation plate 74' so as to keep the operation plate at the state inclined along the counter clockwise direction. When the operation plate 74' is rotated along the counter clockwise direction by means of the slide bar 84, the cam follower part $74b'$ of the operation plate 74' slides over the cam surface $1g_1'$ of the reel clutch change over cam part $1g'$ so as to be arranged on the cam surface $1g_2'$. This cam surface $1g_2'$ is deeper than the cam surface $1g_1'$ so that the operation plate 74' assumes the state inclined forwards, whereby the brake part $74f'$ is translated upwards in such a manner that the engagement of the brake member 69' of the brake part $74f'$ with the cylindrical part $8_2$ of the feeding shaft 8 under pressure is released so as to allow the rotation of the feeding shaft 8.

In the same way as in case of the above mentioned winding up side reel pulley 72, the cylindrical part $81b$ formed at the center of the feeding side reel pulley 81 is rotatably adopted on the circumference of the cylindrical bearing part $1e'$ formed on the main body 1. On the side surface of the pulley 81, the borings $81a_1$, $81a_2$, $81a_3$ and $81a_4$ are provided almost at an equal distance from each other, while on the side surface facing to the operation plate 74' a cylindrical part $81c$ correcting the above mentioned cylindrical part $81b$ with the pulley part $81a$ is formed. On this cylindrical part $81c$ of the feeding side reel pulley 81, the clutch claw member 75' is provided in such a manner that the claw parts $75b_1'$, $75b_2'$ $75b_3'$ and $75b_4'$ are respectively adopted to the borings $81a_1$, $81a_2$, $81a_3$ and $81a_4$. When the pulley 81 is rotated via the driving power transmission device explained in accordance with FIG. 4, the pulley 81 simply rotates on the bearing part $1e'$ of the main body 1 together with the clutch claw member 75' when the tops of the claw parts $75b_1'$, $75b_2'$, $75b_3'$ and $75b_4'$ of the clutch claw member 75' are withdrawn beneath the side surface of the pulley in case the operation plate 74' is arranged at the neutral position or at the position translated along the clockwise direction, in such a manner that the rotation is not transmitted to the bar $8a$ whereby the feeding shaft 8 is not rotated. On the other hand, when the operation plate 74' is arranged at the position translated along the counter clockwise direction and the tops of the claw parts $75b_1'$, $75b_2'$, $75b_3'$ and $75b_4'$ of the clutch claw member 75' project largely from the side surface of the pulley 81, the tops of the claw parts $75b_1'$, $75b_2'$, $75b_3'$ and $75b_4'$ of the clutch claw member 75' are respectively engaged between the claw parts $83a_1'$, $83a_2'$, $83a_3'$ and $83a_4'$ of the clutch claw receiving member 83' in such a manner that the claw parts $75b_1'$, $75b_2'$, $75b_3'$ and $75b_4'$ of the clutch claw member 75' are respectively engaged with the claw parts $83a_1'$, $83a_2'$, $83a_3'$ and $83a_4'$ of the clutch claw receiving member 83' so as to transmit the driving power from the pulley 81 to the clutch claw receiving member 83' and to rotate the feeding shaft 8 in same way as in case of the clutch mechanism of the winding up shaft.

FIG. 10 shows the composition of the film projecting part of the cine-projecter shown in FIG. 2, partially taken apart for the sake of easy understanding in perspective view.

In FIGS. 2 and 10, 17 is the base plate fixed on the main body 1 and 18 the shutter blade fixed on the afore mentioned shutter shaft 19, whereby the shutter blade 18 consists of three blade members 18₁, 18₂ and 18₃ arranged almost at an equal interval from each other. 20 is the cam member presenting the cam surface 20a for controlling the feeding of the film feeding claw and the cam surface 20b for controlling the projection of the film feeding claw, being fixed on the shutter shaft 19. In consequence the shutter blade 18 and the cam are so designed as to rotate as one body when the rotary shaft 19 is rotated by means of the driving power from the motor 56 via the gear 21. 22 is the rotary shaft rotatably pivoted on the base plate 17. 23 is the slow motion control cam fixed on the rotary shaft 22, whereby the center of the rotation of the cam 23 is excentric. 24 is the gear fixed on the rotary shaft 22. The gear 24 is normally engaged with the gear 21 so as to reduce the rotation of the rotary shaft 19 and transmit it to the rotary shaft 22. 25 is the fixed shaft fixed on the base plate 17. 26 is the film feed claw member pivoted rotary along the circumferencial direction of the fixed shaft 25 and slidable along the axial direction of the fixed shaft 25. On a part of the film feed claw member 26, a film feed claw 26a selectively engageable into the perforation 15a of the film is provided so as to feed the film up to the position of the aperture. 27 is the film feed claw projection control member pivoted by means of the fixed shaft 25 in such a manner that it is rotatable along the circumferencial direction of the shaft 25 but not movable along the axial direction of the shaft 25. This film feed claw projection control member 27 presents the follower part 27a to be brought in contact with the film feed claw member 26, the follower part 27b to be brought in contact with the cam surface 20b of the cam member 20, the projection 27c projecting nearly at the right angle from the film feed claw projection control member 27 so as to serve to make the film feeding operation of the film feed claw member 26 impossible and the projection 27d projecting nearly at the right angle from the film feed claw projection control member 27 so as to serve to change over the mode between the slow motion projection and the normal projection.

50 is the compression spring whose one end is in contact with the base plate 17 and whose other end is in contact with the film feed claw member 26. This compression spring 50 is normally urging the film feed claw member 26 along the counter clockwise direction so as to keep the follower part 27b of the film feed claw member 26 in contact with the cam surface 20 of the cam member 20. 28 is the tension spring whose one end is engaged with the film feed claw member 26 and whose other end is engaged with the film feed claw projection control member 27, whereby the spring 28 is normally urging the film feed claw projection member 26 upwards in FIG. 10 so as to help the film feed claw member 26 move as one body with the film feed claw projection control member 27. 32 is the shaft rotatably pivoted on the base plate 17. 29 is the swing lever whose one end 29a is fixed on the shaft 32 and whose other end 29b is engaged with the pin 33 provided on the film feed claw member 26, whereby the swing lever is normally urged along the clockwise direction by means of the strength of the spring 28 via the pin 33, which spring 28 urges the film feed claw member 26 upwards. 30 is the lubrication member at a part of the swing lever 29 so as to lubricate the part at which the swing lever 29 is in contact with the cam surface 20a of the cam member 20, whereby the lubrication member 30 is impregnated with the lubrication oil. 34 is the operation lever for changing over the mode between the normal projection mode (the motion picture mode in accordance to which the film is fed at the normal speed) and the slow motion projection mode (the motion picture mode in accordance to which the film is fed at a speed lower than the normal speed). This operation lever 34 is rotatably pivoted by means of the shaft 35 provided on the main body 1, whereby at the one end a grip 5 for the manual operation from outside of the main body 1 is provided (FIG. 1) while at the other end the first swing follower 36 is rotatably pivoted by means of the pin 37. 38 is the second swing follower rotatably pivoted by means of the shaft 39 on the base plate 17, being normally urged along the clockwise direction by means of the not shown spring.

The first swing follower 36 and the second swing follower 38 serves to control the functional engagement of the slow motion control cam with the film feed claw projection control member 27, whereby when the operation lever 34 is rotated along the clockwise direction (corresponding to the grip 5 set at the mark "SL") the first swing follower 36 is arranged between the projection 27d of the film feed claw projection member 27 and the second swing follower 38 so as to urge the above mentioned second swing follower 36 along the counter clockwise direction against the clockwise strength of a not shown spring for keeping the follower part 38a of the second swing follower 38 in contact with the slow motion control cam 23, while when the operation lever 34 is rotated along the counter-clockwise direction (corresponding to the grip 5 set at the mark "N") the first swing follower 36 escapes from the position between the projection 27d of the film feed claw projection control member 27 and the second swing follower 38 so as to allow the above mentioned spring to urge the second swing follower 36 along the clockwise direction for bringing the follower part 38a of the second swing follower 38 out of contact with the slow motion control cam.

So far the film feeding mechanism for actually feeding the film itself has been explained. Below the operation of the film feeding mechanism will be explained.

First of all the case the grip 5 is set at a position corresponding to the mark "N" and the operation lever 34 is rotated along the counter clockwise direction will be explained.

When the operation lever 34 is rotated along the counter clockwise direction, the first swing follower 36 is not between the projection 27d of the film feed claw projection control member 27 and the second swing follower 38 so that the functional engagement of the slow motion control cam 23 with the film feed claw projection control member 27 has been interrupted while the film feed claw projection control cam surface 20b of the cam member 20 is normally kept engaged with the follower 27b of the film feed claw projection control member 27.

When in this state the gear 21 is rotated by means of the driving power from the motor, the shutter shaft 19, the cam member 20, the shutter blade 18, the gear 24, the rotary shaft 22 and the slow motion control cam 24 are rotated, whereby the slow motion control cam 23 is not in the functional engagement with the film feed claw projection control member 27 so that the rotation of the slow motion control cam 23 does not contribute anything to the film feeding while why the cam member 20 serves to control the film feeding. The relation between the position at which the film feed claw feed control cam surface 20a of the cam member 20 is in contact with the swing lever 29 and the position at which the film feed claw projection control cam surface 20b is in contact with the follower part 27b the film feed claw projection control member 27 is so chosen that:

(1) When the cam surface 20a gives the minimum lift amount to the swing lever 29 (when the swing lever 29 is rotated utmost along the clockwise direction), the cam surface 20b gives the minimum lift amount to the control member 27 (the control member is rotated utmost along the counter clockwise direction), (2) when the cam surface 20b gives the maximum lift amount to the swing lever 29 (when the swing lever 29 is rotated utmost along the counter clockwise direction), the cam surface gives the maximum lift amount to the control member 27 (the control member 27 is rotated utmost along the clockwise direction), and (3) the cam surface 20b gives the minimum lift amount to the control member 27 while the cam surface 20b moves from the position at which it gives the minimum lift amount to the control member 27 to the position at which it gives the maximum lift amount to the swing lever 29, while the cam surface 20a gives the maximum lift amount to the control member 27 while it moves from the position at which it gives the maximum lift amount to the swing lever 29 to the position at which it gives the minimum lift amount to the swing lever 29.

In consequence, when the cam surface 20a gives the minimum lift amount to the swing lever 29, so as to rotate the swing lever 29 utmost along the clockwise direction while the cam surface 20b gives the maximum lift amount to the control member 27 so as to rotate the control member utmost along the clockwise direction as in the above mentioned case (1), the film feed claw member 26 is rotated around the shaft 25 along the clockwise direction whereby at first the film feed claw 26a is engaged into the perforation 15a of the film 15. Then, while as in case of the above mentioned case (3), the cam surface 20a moves from the position at which it gives the minimum lift amount to the swing lever 29 to the position at which it gives the maximum lift amount to the swing lever 29 and the cam surface 20b moves from the position at which it gives the minimum lift amount to the control member 27 to the position at which it gives the maximum lift amount to the control member 27, the film feed claw member 26 is kept rotated along the clockwise direction whereby the film feed claw member 26 is moved only forwards so that the film 15 in whose perforation 15a the film feed claw 26a is engaged is fed by one picture by means of the downward movement of the film feed claw member 26. Then, when the cam surface 20a gives the maximum lift amount to the swing lever 29 while the cam surface 20b gives the maximum lift amount to the control member 27, the cam surface 20a controls the film feed control member 26 via the control member 27 in such a manner that the film feed claw member 26 is rotated along the counter clockwise direction so that the film feed claw 26a is brought out of the perforation 15a of the film 15. Then, while the cam surface 20a moves from the position at which it gives the maximum lift amount to the swing lever 2a to the position at which it gives the minimum lift amount to the swing lever 2a and the cam surface 20b moves from the position at which it gives the maximum lift amount to the control member 27 to the position at which it gives the minimum lift amount to the control member 27, the film feed claw member 26 is kept rotated along the counter clockwise direction, whereby the film feed claw member 26 is moved only upwards so that the film 15 is not fed. Through the repetition of the above mentioned state, the film is fed intermittently, whereby the trace of the movement of the film feed claw 26a is rectangular in the same way as in case of the trace of the film feed claw of the conventional cine-projector.

So far the motion picture projection is explained. Below the slow motion projection will be explained.

In case of the slow motion projection, the grip 5 is arranged at the position corresponding to the mark "S" while the operation lever 34 is rotated along the clockwise direction.

When the operation lever 34 has been rotated along the clockwise direction, the first swing follower 36 is arranged between the projection 27d of the film feed claw projection control member 27 and the second swing follower 38 while the follower part 38a of the second swing follower 38 is in contact with the slow motion control cam 23 in such a manner that the functional engagement of the slow motion control cam 23 with the film feed claw projection control member 27 is established. When the slow motion control cam 23 gives the minimum lift amount to the second swing follower 38, the first swing follower 36 and the second swing follower 38 are translated along the counter clockwise direction, whereby the control member 27 is rotated along the counter clockwise direction so as to allow the follower part 27b of the control member 27 to be brought into contact with the cam surface 20b of the cam member 20, while when the slow motion control cam 23 gives the maximum lift amount to the second swing follower 38, the first swing follower 36 and the second swing follower 38 are translated along the clockwise direction, whereby by means of the both followes 36 and 38 the projection 27d of the control member 27 is pressed so as to rotate the control member 27 along the clockwise direction against the strength of the spring 50 in such a manner that the follower part 27b of the control member 27 is brought out of the contact with the cam surface 20b of the cam member 20. Hereby the slow motion control cam 23 gives the maximum lift amount to the second swing follower 38 once while the cam member 20 rotates three times. In consequence, the feed claw 26a of the film feed claw member 26 feeds the film by one picture in case of the slow motion projection during the time during which the film is fed by three pictures in case of the normal projection.

Below the film gate mechanism will be explained. 40 is the rail member on whose one part a rail 40a for guiding the film 15 is provided. On one part of the bottom rail 40 on the rail member 40, a not shown aperture for allowing the passage of the light beam coming from the light source 16 and a not shown long boring for the feed claw 26a of the film feed claw member 26 are provided. 44 is the mount plate on which the rail member 40 is mounted by means of the fixing member 42, being fixed on the base plate 17. 43 is the press plate consisting of a thin metallic plate spring material and provided facing to the aperture, whereby also on one part of the press plate 43 are aperture for determining the frame for the projection is provided at a position corresponding to the aperture of the rail 40a and a long boring at a position corresponding to the long boring of the rail member 40, while the press plate 43 mounted on the rail member 40 by means of the mount member 55 only with the one end is normally self urged around the position, at which the press plate 43 is mounted on the mount member 55, along the direction along which the press plate 43 is more distant from the rail member 40. 44 is the press plate holding consisting of plastics so as to keep the press plate 43 together with the rail member 40. The press plate holder 44 present a pin 44a provided on the press plate 44, the long boring 44b provided at a position corresponding to the long boring of the press plate 43 and that of the rail member 40, the L-shaped member 44c and the arm member 44d. The pin 44a is slidably provided in a boring provided in the mount plate 41 so as to serve to guide the press plate holder 44 forwards and backwards. 45 is a compression spring provided on the pin 44a so as to urge the press plate holder 44 forwards (toward the rail member 40). The L-shaped member 44c of the press plate holder 44 serves to absorb the strength of the press plate holder 44 pressing the press plate 43 against the rail member 40, allowing the clockwise rotation of the press plate holder 44 around the arm member 44d extending from the press plate holder 44 when the press plate holder 44 is exercised with a strength along the direction toward the mount plate 41 from outside. 46 is the mode change over slider slidably provided on the rail memer mount plate 41 in such a manner that the pin 47 provided on the rail member mount plate 41 is engaged into the long boring 46a. On one part of the mode change over slider 46, a projection 46b to be selectively engaged with the projection 27c projecting from a part of the film feed claw projection control member 27, a projection to be selectively engaged with the notch 46c and the L-shaped member 44c of the press plate holder 44 and a control lever 46e mechanically connected with the U-shaped notch 62b of the bell cranck 62 so as to control the mode change over slider 41 from outside of the main body are provided.

Hereby the mode change over slider 46 is slidable on the rail member mount plate 41, being guided by means of the pin 47 in such a manner that when the slide bar 84 is translated to the left and the bell cranck 62 is translated along the counter clockwise direction, the pin 85 is arranged at the first position (capable of the motion picture projection) corresponding to the mark "No" in FIG. 10, when the slide bar 84 is positioned at the neutral position and the bell cranck 62 is at the neutral position (FIG. 2), the pin 85 is arranged at the second position (capable of the still motion picture projection, FIG. 10) corresponding to the mark "S" in FIG. 10 and when the slide bar 84 is translated to the right and the bell cranck 62 is translated along the clockwise direction, the pin 85 is arranged at the third position (capable of the quick film winding back) corresponding to the mark "F" in FIG. 10.

Below the operation of the film projection part shown in FIG. 2 and 10 will be explained.

(1) when the pin 85 of the change over slider 46 is arranged at the position corresponding to the mark "No" in FIG. 10, the projection 27c of the film feed claw projection control member 27 is arranged at the position of the notch 46c of the change over slider 46. In consequence the control member 27 is urged and rotated along the counter-clockwise direction of the spring 50 by the amount of the depth of the notch 46c provided on the change over slider 46 while the film feed claw member 26 in functional engagement with the control member 27 through the spring 28 is also rotated along the counter-clockwise direction in such a manner that the film feed claw 26a is arranged at the position at which the claw 26a is engageable into the perforation 15a of the film 15. Further in this state the change over slider 46 exercises no strength upon the press plate holder 44, the press plate holder 44 transmits the strength of the spring 44 directly to the press plate 43 so as to press the press plate 43 against the rail member 40 against the strength of the press plate 43 trying to be move distant from the rail member 40. In consequence the film in the rail 40a of the rail member 40 comes to be held in the rail 40a.

Namely, when in this state the shutter shaft 1a is rotated by means of the driving power from the motor 56 while as has already been explained in accordance with the film feeding mechanism the grip 5 is set at the position corresponding to the mark "N", the film feed claw member 26 feeds the film 15 on the rail member 40 at the normal speed so as to carry out the normal projection, while when the grip 5 is set at the position corresponding to the mark "SL", the film feed claw member 26 feeds the film 15 at a speed as high as one third of the normal speed so as to carry out the slow motion projection.

(2) When the pin 85 of the change over slider 46 is arranged at the position corresponding to the mark "S" in FIG. 10, the projection 27c of the film feed claw projection control means is in contact with the projection of the change over slider 46. When the projection 27c of the control member 27 runs over the projection 26b of the change over slider 46 the control member 27 is rotated along the clockwise direction against the strength of the spring 50 by the amount by which the projection 27c runs over the projection 46b. By means of the clockwise rotation of this control member 27 the film feed claw member 26 is rotated along the clockwise direction, being urged by the follower part 27a of the control member 27 in such a manner that the film feed claw 26 is arranged at a position largely distant from the film while the follower part 27b of the control member 27 is brought out of the contact with the cam surface 20b of the cam member 20. In consequence, although in this state the control member 27 is moved upwards and downwards by means of the effect of the cam surface 20a of the cam member 20 and the swing lever 29 the film 15 is not fed, because the follower part 27b of the control member 27 is not in contact with the cam surface 20b of the cam member 20 while the film feed claw 26a is largely distant from the film 15. Further the film 15 arranged in the rail 40a of the rail member 40 is kept immovable in the rail 40a, because when the pin 85 of the change over slider 46 is arranged at the position corresponding to the mark "S" the change over slider 46 exercises no strength against the press plate holder 44 and therefore the press plate holder 44 transmits the strength of the spring 44 directly to the press plate 43.

(3) When the pin 85 of the change over slider 46 is arranged at the position corresponding to the mark "F" in FIG. 10, the projection 27c of the film feed claw projection control member 27 is in contact with the projection 46b of the change over slider 46 while the L-shaped member 44c of the press plate holder 44 is in contact with the projection 46d of the change over slider 46. When the projection 27c of the control member 27 has run over the projection 46b of the change over slider 46, the control member 27 has been rotated along the control member 27 by the amount by which the projection 27c has run over the projection 46b as has been explained in case of the still projection so that the film feed claw member 26 has also been translated along the clockwise direction in such a manner that the film feed claw 26a has been arranged at a position largely distant from the film, having nothing to do with the film feeding. The L-shaped member 44c of the press plate holder 44 has run over the projection 46d of the change over slider 46 so that the press plate holder 44 is rotated around the arm member 44d along the direction along which the press plate holder 44 is more distant from the rail member 40 against the strength of the spring 45 by the amount by which the L-shaped member 44c of the press plate holder 44 has run over the projection 46d of the change over slider 46 in such a manner that the free end of the press plate 43 is separated from the rail member 40 by means of the strength of the press plate 43 itself trying to move distant from the rail member 40 so as to bring the film 15 in the rail 40a in a free state. In consequence, when in this state the feeding shaft is rotated along the reversed direction, the film is wound back on the reel 13 mounted on the feeding shaft, whereby the press plate 43 is largely distant from the rail member 40 so that the film 15 is in the free state in such a manner that the film can be wound back without any damage on the surface of the film 15 due to the friction between the press plate 43 and the rail member 40. Further, when the feeding shaft 8 is rotated along the reversed direction, the motor 56 is driven at a higher speed by means of the conventional electrical means.

So far various mechanisms of the cine-projector in accordance with the present invention shown in FIGS. 1 and 2 have been explained together with this operation, whereby as is clear from the above explanation, in case of the present embodiment of the cine-projector by setting the finger 2a of the nob 2 at the mark "A", "B", "C" and "D" of the index 1d provided on the main body the closing-opening of the main switch, the motion picture projection, the still motion picture and the quick film winding back can respectively be carried out, while by setting the finger 2a of the nob 2 at the mark "N" and "SL" of the index 1d provided on the main body the motion picture projection at the normal film feed speed (the normal projection) and the motion picture projection at a lower film feed speed (the low motion projection) can respectively be carried out.

Below the whole operation of the cine-projector will be summarized.

(a) The closed state (when the finger 2a of the nob 2 is set at the mark "A" of the index 1d):

Being controled by means of the mode change over cam 60, the swing lever 58 is arranged at the neutral position as is shown in FIG. 3(b) while being controled by means of the mode change over cam 60 the main switch 61 and the lamp switch 162 are in the opened state. In consequence, in this state the cine-projector is in the still standing state. When the swing lever 58 is arranged at the neutral position, the slide bar 84 and the bell crank are also arranged at the neutral position as is shown in FIG. 2. In this state, when the slide bar 84 is arranged at the central position, the folded parts $84_1a$, and $84_1a'$ are at the positions at which they are not in contact with the feet $74g_1'$ and $74g_2'$ of the operation plate 74' of the clutch mechanism of the feeding shaft while the folded parts $84_2a$, and $84_2a'$ are also at the positions at which they are not in contact with the feet $74g_1$ and $74g_2$ of the operation plate 74 of the clutch mechanism of the winding up shaft so that the operation plates 74 and 74' are arranged at the neutral position by means of the springs 76 and 76'.

(b) The motion picture projection state (when the finger 2a of the nob 2 is set at the mark "B" of the index 1d).

When the finger 2a is moved from the position corresponding to the mark "A" of the index 1d to the position corresponding to the mark "B", the mode change over cam 60 is rotated in functional engagement of the rotation of the grip 2 out of the state shown in FIG. 3(b) along the direction of the arrow in the drawing into the state shown in FIG. 3(c), whereby the swing lever 58 is rotated along the counter-clockwise direction around the shaft 59, while the main switch 61 and the lamp switch 162 are brought into the "closed" state so as to start the motor 56 and to light the lamp 16. The slide bar 84 is translated to the left in FIG. 2 in functional engagement with the counter-clockwise rotation of the swing lever 58 in such a manner that the folded part $84_1a'$ of the slide bar 84 is in contact with the foot $74g_2'$ of the operation plate 74' while the folded part $84_2a$ is in contact with the foot $74g_2$ of the operation plate 74, so as to rotate the operation plates 74 and 74' along the clockwise direction against the strength of the springs 76 and 76'.

In consequence, by means of the clockwise rotation of the operation plate 74' of the clutch mechanism of the feeding shaft the cam follower part 74b' of the operation plate 74' is arranged on the cam surface $1g_1'$ of the reel clutch change over cam part $1g'$ so that the claw parts $75b_1'$, $75b_2'$, $75b_3'$ and $75b_4'$ of the clutch claw member 75' are withdrawn, as is shown in FIG. 7(b), into the position at which they do not project from the side surface of the reel pulley 81, so as not to be engaged with the claw parts $83_1'$, $83_2'$, $83_3'$ and $83_4'$ of the clutch claw receiving member 83'. In consequence, although the reel pulley 81 has not been rotated as is shown in FIG. 4, the rotation of the pulley 81 is not transmitted to the feeding shaft 8. Further in this state, the brake part 74f' of the operation plate 74' has been translated downwards, the brake member 69' is pressed against the internal wall of the cylindrical wall $8_2$ of the feeding shaft 8 so as to brake the rotation of the feeding shaft 8.

Further in the clutch mechanism of the winding up shaft the cam follower part 74b of the operation plate 74 has been arranged on the cam surface $1g_2$ of the reel clutch change over cam part 1g by means of the clockwise rotation of the operation plate 74 so that the claw parts $75b_1$, $75b_2$, $75b_3$ and $75b_4$ of the clutch claw receiving member 75 project from the side surface of the reel pulley 72 as is shown in FIG. 7(c), so as to be engaged with the claw parts $83'_1$, $83'_2$, $83'_3$ and $83'_4$ of the clutch claw receiving member 83'. In consequence, when the reel pulley 72 is rotated as is shown in FIG. 4, the rotation of the pulley 72 is transmitted to the winding up shaft 9. Further the brake part 74f of the operation plate 74 has been translated upwards, the braking effect of the brake member 69 upon the internal wall of the cylindrical part $9_2$ of the winding shaft is released in such a manner that the winding up shaft 9 rotates by means of the rotating power of the pulley 72, being not braked. Further the bell crank 72 is rotated along the counter-clockwise direction in functional engagement of the translation of the slide bar 84 to the left so that the pin 84 of the change over slider 46 is arranged at the position corresponding to the mark "No" in FIG. 10 in such a manner that the film feed mechanism is in a position to feed the film 15 intermittently.

When the film wound up the feeding reel 13 mounted on the feeding shaft 8 is pulled out to be led into the main body 1 of the cine-projector through the film guide roller 10 and the film damper 86 while the finger 2a of the nob 2 is set at the position corresponding to the mark "B", the film 15 is fed intermittently by means of the film feeding mechanism arranged at the projection part, taken out of the film outlet 1b and wound up on the winding up reel 14 mounted on the winding up shaft 9 rotated by means of the rotating power of the pulley 72 so as to carry out the motion picture projection. Namely in this state the winding up shaft 9 is rotated by means of the rotating power of the pulley 72 while the feeding shaft 8 is rotated not by means of the rotating power of the pulley 81 but by means of the pull power taking place when the film 15 is fed to the side of the winding up shaft 9 by means of the film feeding mechanism, against the braking force exercised by means of the brake member 69. In consequence, at the time of the motion picture projection the feeding shaft 8 is rotated in the braked state, the film 15 wound up on the feeding side reel 13 is never fed above the film feeding capacity of the film feeding mechanism. Further the winding shaft 9 is rotated by means of the rotation power of the reel pulley 72 at a speed a little above the film feeding capacity of the above mentioned film feeding mechanism so as to wind up the film 15 on the winding up reel 14 so that an irregular looseness of the film 15 never takes place between the film feeding mechanism and the winding up reel 14. Further the film winding up capacity of the winding up reel 14 is chosen larger than the film feeding capacity of the film feeding mechanism so that there is a danger than the film feeding claw 26a of the film feeding mechanism should move the film 15 on the rail member 40 when the film feeding claw 26a is not engaged in the perforation 15a of the film. In order to avoid such an inconvenience, a means is provided in the film path between the film feeding mechanism and the winding up reel 14 in such a manner that an eventual large load on the winding up shaft 9 is absorbed by means of the clutch device consisting of a clutch claw receiving member 83 the friction member 82 and the disc member 77 so as to avoid an eventual irregular load on the film.

(c) The still projection state (when the finger 2a of the nob 2 is set at the mark "C" of the index 1d).

When the finger 2a of the nob 2 is translated from the position corresponding to the mark "B" of the index 1d to the position corresponding to the mark "C", the mode change over cam 60 is rotated out of the state shown in FIG. 3(c) along the direction of the arrow in the drawing into the state shown in FIG. 3(d) in functional engagement of the nob 2 so as to arrange the swing lever 58 at the neutral position. In this state the main switch 61 and the lamp switch 162 are in the "closed" state.

When the swing lever 58 is arranged at the neutral position, the slide bar 84 and the bell crank 62 are also arranged at the neutral position. Thus the pin 85 of the change over slider 46 is arranged at the position corresponding to the mark "S" in FIG. 10 so that as has already been explained the film feeding efficiency of the film feeding mechanism is made ineffective so that the film is not fed. When the slide bar 84 is arranged at the neutral position, the operation plate 74 of the clutch mechanism of the winding up shaft and the operation plate 74' of the clutch mechanism of the feeding shaft are arranged at the neutral position, whereby the power transmission between the reel pulley 72 and the winding up shaft 9 and that between the reel pulley 81 and the feeding shaft 8 are in the interrupted state in such a manner that although the reel pulleys 81 and 72 are rotated, their rotation is not transmitted to the feeding shaft 8 and the winding up shaft 9 so as to remain the both shafts in the still standing state.

In consequence, the finger 2a of the nob 2 is set at the mark "C", the film 15 is not fed but stands still in such a manner that the picture information then positioned at the aperture in the rail part 40a of the rail member 40 is projected while the finger 2a of the nob 2 is set at the mark "C" of the index 1d so as to carry out the still projection.

(d) The quick film winding back state (when the finger 2a of the nob 2 is set at the mark "D" of the index 1d).

When the finger 2a of the nob 2 is translated from the position corresponding to the mark "C" of the index 1d to the position corresponding to the mark "D", the mode change over cam 60 is rotated out of the state shown in FIG. 3(d) along the direction of the arrow in the drawing into the state shown in FIG. 3(e) in functional engagement with the rotation of the nob 2, whereby the swing lever 58 is rotated along the clockwise direction in such a manner that the main switch 61 is in the "closed" state while the lamp switch 162 is in the "opened" state. Hereby the motor 56 is controled by means of an electrical circuit operable in functional engagement with the mode change over cam 60, whereby the then rotation speed becomes higher than in case of the still projection. Further the bell crank 62 is rotated along the clockwise direction in such a manner that the pin 85 of the change over slider 46 is arranged at the position diametral to the mark "F" in FIG. 10. In consequence, the film feeding efficiency of the film feeding mechanism is made ineffective while the press plate 43 is largely distant from the rail member 40 so that the film is in a free state. Further by means of the translation of the slide bar 84 to the right, the folded part $84_1a$ of the slide bar 84 is in contact with the foot $74g_1'$ of the operation plate 74' while the folded part $84_2a'$ is in contact with the foot $74g_1$ of the operation plate 74 so as to rotate the operation plates 74 and 74' along the counter-clockwise direction against the strength of the springs 76 and 76'.

In consequence in the clutch mechanism of the feeding shaft, by means of the clockwise rotation of the operation plate 74' the cam follower part 74b' of the operation plate 74' is arranged on the cam surface of the reel clutch change over cam 1g' so that the claws $75b_1'$, $75b_2'$, $75b_3'$ and $75b_4'$ of the clutch claw member 75' are respectively engaged with the claws $83_1'$, $83_2'$, $83_3'$ and $83_4'$ of the clutch claw receiving member 83' projecting from the side surface of the reel pulley 81 as is shown in FIG. 7(c). In consequence, when the reel pulley 81 is rotated as is shown in FIG. 4, the rotation of the pulley 81 is transmitted to the feeding shaft 8. At this time, the brake part 74f of the operation plate 74' has been moved upwards, the braking effect of the brake member 69' pressed against the internal wall of the cylindrical part 82 of the feeding shaft 8 is released, whereby the feeding shaft 8 is rotated by means of the rotating power of the pulley, being not braked. Further in the clutch mechanism of the winding up shaft, by means of the counter-clockwise rotation of the operation plate 74 the cam follower part 74b of the operation plate 74 is arranged on the cam surface $1g_1$ of the reel clutch change over cam 1g, so that the claws $75b_1$, $75b_2$, $75b_3$ and $75b_4$ of the clutch claw member 75 are not engaged with the claws $83_1$, $83_2$, $83_3$ and $83_4$ of the clutch claw receiving member withdrawn beneath the side surface of the reel pulley 72 as is shown in FIG. 7(b). In consequence, although the pulley is rotated as is shown in FIG. 4, the rotating power of the pulley 72 is not transmitted to the feeding shaft 8. Hereby the brake part 74f of the operation plate 74 has been translated downwards, the brake member 69 is pressed against the internal wall of the cylindrical part $9_2$ of the winding up shaft 9 so as to prevent the winding up shaft from free rotation.

In consequence, when the feeding shaft 8 is rotated by means of the rotating power of the reel pulley 81, the film wound up on the reel 14 mounted on the feeding shaft 8 and hanging between the reel 13 and the reel 14 is drawn by means of the rotation of the feeding shaft 8. When this film 15 is drawn toward the feeding shaft 8 by means of the rotation of the feeding shaft 8, the winding up shaft 9 is rotated against the braking effect of the braking member 69 in such a manner that the film wound up the reel 14 is wound back on the reel 13. At this time, the rotation of the winding up shaft 9 is normally braked so that there takes place no irregular looseness of the film between the reel 13 and the reel 14. Namely the quick film winding back is carried out.

FIG. 11 shows the second embodiment of the cine-projector in accordance with the present invention in elevation, while FIG. 12 shows the embodiment without the back cover for showing the internal arrangement of the important component. The second embodiment of the cine-projector is a partial variation of the first embodiment shown in FIGS. 1 to 10, whereby the power transmission mechanism shown in FIG. 4, the clutch mechanism of the feeding shaft shown in FIG. 9 and the film projection part shown in FIG. 10 are also adopted in the second embodiment while the components with the same figures as those in FIGS. 1 to 10 are the same components so that their explanations will be omitted.

In FIG. 11, 102 is a rotary nob for controling the operation of the main switch, the motion picture projection, the still picture projection, the quick film feeding and the quick film winding back, whereby the change over of the opening and the closing of the main switch, the motion picture projection mode, the still picture projection mode, the quick film feeding and the quick film winding up is made possible by setting the finger 102a provided on the nob 102 at the marks of the index 101d provided on the main body 1.

Namely, the first embodiment of the cine-projector only has the efficiency of the motion picture projection with the normal and the slow motion projection efficiency, the still picture projection and the quick film winding back efficiency, while the second embodiment has the quick film feeding efficiency beside the above. When the finger 102a of the nob 102 is set at "quick film feeding, winding back" of the index 101d, while the quick film feeding, winding back change over nob 103 is being set at "FR" provided on the main body 1, the projection is in the quick film winding back mode, while the finger 102a of the nob 102 is set at "quick film feeding, winding back" of the index 101d while the nob 103 is being set at "FF" the projector is in the quick film feeding mode.

In FIG. 12, 184 is the first slide bar pivoted on the main body 1 by means of the slide bar holding member 185 fixed on the main body 1 and $185_1'$ (FIG. 14) and $185_2'$ (FIG. 16) so as to be slidable along the lengthwise direction, whereby the both ends $184_1$ and $184_2$ of the first slide bar 184 are shaped in form of C, being somewhat twisted and inclined against another part $184_3$ of the slide bar 184. 184' is the second slide bar pivoted on the main body 1 by means of the slide bar holding member 185, $185_1'$ and $185_2'$ so as to be slidable along the lengthwise direction in the same way as in case of the first slide bar, whereby the both ends $184_1'$ and $184_2'$ of the second slide bar 184' is shaped nearly in form of C, being somewhat twisted and inclined against another part of the slide bar 184. Further the folded part $184_1'a$ of the second slide bar 184' is normally engaged with the U-shaped notch 62a of the bell crank 62. The relation between this second slide bar 184' and the bell crank 62 is so chosen that when the second slide bar 184' is slided to the left in FIG. 12 the bell crank 62 is rotated along the clockwise direction around the pin 63 while when the second slide bar 184' is slided to the right in FIG. 12 the bell crank 62 is rotated along the clockwise direction around the pin 63 and the second slide bar 184' is at the neutral position in FIG. 12 the bell crank is also at the neutral position.

Between the folded part $184a_1$ and $184a_1'$ of the C-shaped end $184_1$ of the first slide bar 184 the feet $74g_1'$ and $74g_2'$ of the operation plate 74' in the clutch mechanism of the feeding shaft part are arranged, while between the folded parts $184a_2$ and $184a_2'$ of the C-shaped end $184_2$ the feet $74g_1$ and $74g_2$ of the operation plate 74 in the clutch mechanism of the winding up shaft part are arranged in such a manner that the control to be explained later of the clutch mechanism of the feeding shaft part and that of the winding up shaft part is carried out in accordance with the position which the first slide bar 184 assumes.

Below the mechanism for controling the horizontal translation of the first slide bar 184 and of the second slide bar 184' will be explained in accordance with FIG. 13. 102 is the nob shown in FIG. 11, being fixed on the rotary shaft 102a rotatably pivoted on the main body 1. 160 is the mode change over cam fixed on the rotary shaft 102a so as to be rotatable as one body with the nob when the nob 102 is rotated outside of the main body 1. This mode change over cam 160 consists of the first cam part 160a, the second cam part 160b, the third cam part 160c, the fourth cam part 160d, the fifth cam part 160e, the sixth cam part 160f and the seventh cam part 160g, whereby the first cam part 160a and the fourth cam part 160d are shaped nearly in the same form. 158 is the first swing lever rotatably pivoted by means of the pin 159 provided on the main body. At the one end of the first swing lever 158 the U-shaped notch 158b in which the folded part $184_1a$ of the first slide bar 184 is engaged is provided, while at the other end the follower part with the follower $158_1$ and $158_2$ presenting different heights and to be in contact with the circumference of the mode change over cam 160 is provided. 158' is the second swing lever rotatably pivoted by means of the pin 159 in the same way as in case of the first swing lever 158, whereby at the one end of the second swing lever 158' the U-shaped notch 158b' in which the folded part $184_2'$ of the second slide bar 184' is engaged is provided, while at the other end the follower part with the followers $158_1'$ and $158_2'$ presenting different heights and to be in contact with the circumference of the change over cam 160 is provided. 103a is the first swing lever operation member rotatable around the shaft 201 fixed on the main body 1, whereby at $103a_1$ of the operation member 103a the quick film feeding, winding back change over nob 103 is fixed. 205 is the pin provided at $103a_2$ of the operation member 103a, whereby the pin 205 is engaged in the long boring 158₃a of the engagement member 158₃ of the first swing lever 158. 204 is the brake operation member for controling the brake member 287 shown in FIG. 16, when the nob 103 is translated downwards as is shown in dotted line in FIG. 13(a), so as to correspond to the mark "FF" provided on the main body 1. The brake member 204 is shaped in form of L with the first lever part 204a and the second lever part 204b, being rotatably engaged with the operation member 103a by means of pin 203. In the second lever 204b of the brake operation member 204 a long boring 204b₁ in which the pin 202 fixed on the main body 1 is engaged is provided, whereby the brake operation member 204 is rotatable around the fixed pin 202. 206 is the tension spring whose one end is engaged with the main body 1 and whose other end is engaged with the part 103a₁ of the operation member 103a, serving to normally urge the operation member 103a along the clockwise direction.

Namely the quick film feeding, winding back change over mechanism shown in FIG. 13(a) is so designed that when the finger 102a of the nob 102 is set at the position "quick film feeding, winding back" while the nob 103 is being arranged at the position corresponding to the mark "FR" as is shown in a solid line in FIG. 13(a), the first swing lever 158 is arranged at the position shown in a solid line shown in FIG. 13(a), whereby the quick film feeding is carried out, while when the nob 103 is pushed downwards before the finger 102a of the nob 102 is set at the position "quick film feeding, winding back" of the index in such a manner that the nob 103 is arranged at the position corresponding to the position "FF" as is shown in a solid line in FIG. 13(a) and the finger 102a of the nob 102 is set at the position "quick film feeding, winding back" of the index 1d after the first swing lever 158 is moved out of the position shown in a solid line in FIG. 13(a) into the position shown in a dotted line, the quick film feeding is carried out.

The first cam part 160a, the second cam part 160b, the third cam part 160c, the fourth cam part 160d and the fifth cam part 160e of the mode change over cam 160 are formed as is shown taken apart in FIG. 13(e)-1 to FIG. 13(f)-1, when seen along the direction of the arrow A—A in FIG. 13(a). When the finger 102a of the nob 102 is set at the position "quick film feeding, winding back" of the index 1d while the nob 103 is arranged at the position corresponding to the mark "FR" as is shown in a solid line in FIG. 13(a) in such a manner that the projector is in the quick film winding back mode, the first swing member 158 is in slide contact with the second cam part 160b and with the fourth cam part 160d while the second swing member 158' is in slide contact with the first cam part 160a and the second cam part 160b as is shown in FIG. 13(e)-1, while when the finger 102a of the nob 102 is set at the position "quick film feeding, winding back" of the index 1d after the nob 103 is pushed downwards so as to be arranged at the position corresponding to the mark "FF" in such a manner that the projector is in the quick film feeding mode, the first swing member 158 is in slide contact with the third cam part 160c and with the fifth cam part 160e while the second swing member 158' is in slide contact with the first cam 160a and with the second cam 160b as is shown in FIG. 13(f)-1. 61 is the normally opened main switch corresponding to the switch 61 in FIG. 4(a) mechanically opened and closed under the control of the sixth cam part 160f of the mode change over cam 160, being provided inside of the rotation trace of the projection 160f₁ of the sixth cam part 160f, whereby the switch 61 is closed, when the cam 160 is rotated by means of the nob 102 and the switch 61 is pressed by means of the projection 160f₁ of the sixth cam part 160f, so as to drive the cine-projector. 162 is the normally opened lamp switch corresponding to the switch 162 shown in FIG. 4(a) mechanically opened and closed under the control of the seventh cam part 160g of the mode change over cam 160, being provided inside of the rotation trace of the projection 160g₁ of the seventh cam part 160g, whereby the switch 162 is closed, when the cam 160 is rotated by means of the nob 102 and the switch 162 is pressed by means of the projection 160g₁ of the seventh cam part 160g, so as to light the projection lamp.

The relations between the mode change over cam 160, the first swing lever 158, the second swing lever 158', the main switch 61, the lamp switch 162 and the nob 103 are shown in the following table in accordance with the position which the nob 103 assumes (position corresponding to the mark "FR" or "FF" on the main body 1 as well as the position which the finger 102a provided on the nob 102 assumes (position corresponding to the mark A (the opening and the closing of the main switch), B (the motion picture projection mode), C (the still picture projection mode), or D (the quick film feeding, winding back mode).

Table 2

| Position of index 101d pointed by finger 102a of nob 102 | I | | | | II | | | | | | Corresponding drawing |
|---|---|---|---|---|---|---|---|---|---|---|---|
| | III | IV | V | VI | VII | VIII | IX | X | XI | XII | |
| OFF [A] | a | a | a | a | c | a | a | c | OPEN | OPEN | FIG. 13(b) |
| Motion picture projection | a | a | b | a | d | b | a | d | CLOSE | CLOSE | FIG.13(c) |
| Still picture projection | a | a | a | a | c | a | a | c | CLOSE | CLOSE | FIG.13(d) |
| Quick film feeding, winding back (nob 103 corresponding to mark "FR") | b | a | a | a | e | a | b | e | CLOSE | OPEN | FIG.13(e) and FIG.13(e)-1 |
| (nob 103 corresponding to mark "FF") | a | b | a | b | d | a | b | d | CLOSE | OPEN | FIG.13(f) and FIG.13(f)-1 |
| OFF [A] | a | a | a | a | c | a | a | c | OPEN | OPEN | FIG.13 |

Hereby the figures I-XII in the table 2 mean as follows:

I: The relation between the second cam part 160b, the third cam part 160c, the fourth cam part 160d and the fifth cam part 160e of the mode change over cam 160 and the first swing lever 158.

II: The relation between the first cam part 160a and the second cam part 160b of the mode change over cam 160 and the second swing lever 158'.

III: The relation between the first swing lever 158 and the projection 160b₁ of the second cam part 160b.

IV: The relation between the first swing lever 158 and the projection 160$c_1$ of the third cam part 160c.

V: The relation between the first swing lever 158 and the projection 160$d_1$ of the fourth cam part 160d.

VI: The relation between the first swing lever 158 and the projection 160$e_1$ of the fifth cam part 160e.

VII: The position which the first swing lever 158 assumes.

VIII: The relation between the second swing lever 158' and the projection 160$a_1$ of the first cam part 160a.

IX: The relation between the second swing lever 158' and the projection 160$b_1$ of the second cam part 160b.

X: The position which the second swing lever 158' assumes.

XI: The state of the main switch.

XII: The state of the lamp switch.

a: Out of contact b: In contact c: Neutral position d: Position translated along counter-clockwise direction e: Position translated along clockwise direction Namely, the second embodiment of the cine-projector in accordance with the present invention is so designed that when the finger 102a of the nob 102 is set at the position of the mark "A" (OFF) of the index 101d of the main body 1, the projection 160$a_1$ of the first cam part 160a of the mode change over cam 160, the projection 160$b_1$ of the second cam part 160b, the projection 160$c_1$ of the third cam part 160c, the projection 160$d_1$ of the fourth cam part 160d and the projection 160$e_1$ of the fifth cam part 160e are arranged at the positions at which they are not in contact with the follower surface 158$_1a_1$, 158$_2a_1$, 158$_1a'$ and 158$_2a'$ of the first swing lever 158 and the second swing lever 158' in such a manner that the first swing lever 158 and the second swing lever 158' are arranged at the neutral position as is shown in FIG. 13(b). Further in this state the main switch 61 under the control of the sixth cam part 160f and the lamp switch 162 under the control of the seventh cam 160g are in the "opened" state whereby the first slide bar 184 is arranged at the neutral position by means of the first swing lever 158 while the second slide bar 154' is arranged at the neutral position by means of the second swing lever 158' as is shown in FIG. 12.

Then, when the finger 102a of the nob 102 is set at the position of the mark "B" (the motion picture projection) on the main body 1, the projection 160$a_1$ of the first cam part 160a of the mode changed over cam 160 is in contact with the follower surface 158$_1a'$ of the right follower 158$_1'$ of the second swing lever 158' while the projection 160$d_1$ of the fourth cam part 160d is in contact with the follower surface 158$_1a$ of the right follower 158$_1$ of the first swing lever 158, whereby the projection 160$b_1$ of the second cam part 160b, the projection 160$c_1$ of the third cam part 160c and the projection 160$e_1$ of the fifth cam part 160e are arranged at the position at which they are not in contact with the follower surfaces 158$_1a$, 158$_2a$, 158$_1a'$ and 158$_2a'$ of the first swing lever 158 and of the second swing lever 158' in such a manner that the first swing lever 158 is arranged at a position translated along the counter-clockwise direction by means of the fourth cam part 160d while the second swing lever 158' is arranged at a position translated along the counter-clockwise direction by means of the first cam part 160a as is shown in FIG. 13(c). Further in this state the main switch 61 and the lamp switch 162 are brought in the "closed" state by means of the sixth cam part 160f and of the seventh cam part 160g while the first slide bar 184 and the second slide bar 184' are arranged at the positions translated to the left under the control of the first swing lever 158 and the second swing lever 158'.

Then, when the finger 102a of the nob 102 is set at the position of the mark "C" (the still picture projection) on the main body 1, the projection 160$a_1$ of the first cam part 160a of the mode change over cam 160, the projection 160$b_1$ of the second cam part 160b, the projection 160$c_1$ of the third cam part 160c, the projection 160$d_1$ of the fourth cam part 160d and the projection 160$e_1$ of the fifth cam part 160e are arranged at the positions at which they are not in contact with the follower surfaces 158$_1a$, 158$_1a'$, 158$_2a$ and 158$_2a'$ of the first swing lever 158 and of the second swing lever 158' in such a manner that the first swing lever 158 and the second swing lever 158' are arranged at the neutral positions as is shown in FIG. 13(d). Further in this state, the main switch 61 under the control of the sixth cam part 160f and the lamp switch 162 under the control of the seventh cam 160g are in the "closed" state, while the first slide bar 184 and the second slide bar 184' are arranged at the neutral position as is shown in FIG. 12 under the control of the first swing lever 158 and the second swing lever 158'.

Then, when the nob 102 is set at the position of the mark "D" (quick film feeding, winding back) on the main body 1 while the nob 103 is set at the position of the mark "FR" (quick film winding back) on the main body 1 as is shown in FIG. 13(a), the right follower 158$_1$ of the first swing lever 158 is at the position at which it corresponds to the fourth cam part 160d of the mode change over cam 160 while the left follower 158$_2$ is at the position at which it corresponds to the second cam part 160b. Further the projection 160$b_1$ of the second cam part 160 of the mode change over cam 160 is in contact with the follower surface 158$_2'a$ of the left follower 158$_2'$ of the second swing lever 158' and with the follower surface 158$_2a$ of the left follower 158$_2$ of the first swing lever 158, while the respective projections 160$a_1$, 160$c_1$, 160$d_1$ and 160$e_1$ of the first cam part 160c, the fourth cam part 160d and the fifth cam part 160e are arranged at the positions at which they are not in contact with the respective follower surfaces 158$_1a$, 158$_2a'$, 158$_1a'$ and 158$_2a'$ of the first and the second swing lever 158 and 158' in such a manner that the first swing lever 158 and the second swing lever 158' are arranged at the positions translated along the clockwise direction as is shown in FIG. 13(e) and FIG. 13(e)-1 under the control of the second cam part 160b. Further in this state the main switch 61 is brought in the "closed" state by means of the sixth cam part 160f and the lamp switch 162 is brought into the "opened" state by means of the seventh cam part 160g while the first slide bar 184 and the second slide bar 184' are also arranged at the positions translated to the right under the control of the first and the second swing levers 158 and 158'.

Then, when the nob 102 is set at the position of the mark "D" (quick film feeding, winding back) on the main body 1 while the nob 103 is set at the position of the mark "FF" (quick film feeding) on the main body 1, the first swing lever 158 is kept as is shown in a dotted line in FIG. 13(a) in such a manner that the right follower 158$_1$ of the first swing lever 158 corresponds to the fifth cam part 160e of the mode change over cam 160 while the left follower 158$_2$ corresponds to the third cam part $160c$. Hereby the projection $160c_1$ of the third cam part $160c$ of the mode change over cam 160 is arranged at the position at which it is in contact with the follower surface $158_1a$ of the right follower $158_1$ of the first swing lever 158, while the projection $160e_1$ of the fifth cam part $160e$ is arranged at the position at which it is in contact with the follower surface $158_2a$ of the left follower $158_2$ of the first swing lever $158_1$, whereby the projection $160b_1$ of the second cam part $160b$ is arranged at the position at which it is in contact with the follower surface $158_2a'$ of the left follower $158_2'$ of the second swing lever 158' in such a manner that the respective projections $160a_1$ and $160d_1$ of the first cam part $160a$ and the fourth cam part $160d$ are arranged at the positions at which they are not in contact with the follower surfaces $158_1a$, $158_2a$ and $158_2a'$ of the first and the second swing lever 158 and 158'. Thus, as is shown in FIG. 13(f) and FIG. 13(f)-1, the first swing lever 158 is arranged at the position translated along the counter-clockwise direction by means of the third cam part $160c$ and the fifth cam part $160e$, while the second swing lever 158' is arranged at the position translated along the clockwise direction by means of the second cam part $160b$. Further in this state the main switch is brought into the "closed" state by means of the sixth cam part $160f$ and the lamp switch 162 is brought into the "opened" state by means of the seventh cam part $160g$ while the first slide bar 184 assumes the position translated to the left by means of the first swing lever 158 and the second slide bar 184' assumes the position translated to the right by means of the second swing lever 158'.

FIG. 14 shows the clutch mechanism of the feed reel shaft part. The clutch mechanism itself is composed quite in the same way as in case of the clutch mechanism for the first embodiment of the cine-projector in accordance with the present invention shown in FIG. 9. The feet $74g_1'$ and $74g_2'$ of the operation plate 74' in the clutch mechanism are arranged between the folded parts $184_1a_1$ and $184_1a'$ of the C-shaped end $184_1$ of the first slide bar 184.

FIGS. 15 and 16 show the clutch mechanism of the winding up shaft for interrupting the power transmission from the motor 56 to the winding up shaft 9 of the cine-projector 9 and its surrounding members shown in FIGS. 11 and 12, whereby FIG. 15 shows the section along the line XV—XV while FIG. 16 shows the members taken apart shown in FIG. 15 together with the surrounding members in perspective view.

The members shown in FIGS. 15 and 16 presenting the same figures as those of the clutch mechanism of the first embodiment of the cine-projector in accordance with the present invention shown in FIGS. 5 and 6 are the same members with the same efficiencies.

The winding up side reel pulley 72' corresponds to the winding up side reel pulley 72 shown in FIG. 1 to FIG. 10, whereby the cylindrical part $72'b$ formed at the center of the reel pulley 72' is adapted on the circumference of the cylindrical bearing part $1e$ formed on the main body 1, being rotatably born by means of the bearing part $1e$. On the side surface of the pulley 72' the penetrating notches $72'e_1$ and $72'e_2$ as well as the borings $72'a_1$, $72'a_2$, $72'a_3$ and $72'a_4$ are formed almost at an equal distance from each other, whereby these borings $72'a_1$, $72'a_2$, $72'a_3$ and $72'a_4$ further present the wide parts $72'a_{1-1}$, $72'a_{2-1}$, $72'a_{3-1}$ and $72'a_{4-1}$ and the narrow parts $72'a_{1-2}$, $72'a_{2-2}$, $72'a_{3-2}$ and $72'a_{4-2}$. Further on the side surface of the pulley 72' facing to the operation plate 74, the cylindrical part $72'c$ connecting the cylindrical part $72b$ with the pulley part $72'a$ is formed. 277 is the first drug cup shaped clutch claw member arranged in the slidable state on the circumference of the reel pulley 72', whereby on the one end (cup bottom) of the first clutch claw member 277 facing to the operation plate 74 the flange part $277f$ is so formed as to project from the circumference $277e$ of the first clutch claw member 277 while on the other end facing to the pulley 72' the slip out prevention parts $277b_1$, $277b_2$ and $277b_3$ are formed almost at an equal distance from each other so as to project the circumference $277e$ while on the circumference $277e$ between the flange part $277f$ and the slip out prevention part $277b$ the position control part $277d$ and the claws $277c_1$ and $277d$ projecting from the cup bottom toward the reel pulley 72' are formed almost at an equal distance from each other. Further the first clutch claw member 277 is arranged in such a manner that the claws $277_1$ and $277_2$ are respectively adapted in the penetrating notches $72'e_1$ and $72'e_2$ of the reel pulley 72', while as is shown in detail in FIG. 15, the clutch claw member holding part $74c$ of the operation plate 74 is engaged with the flange part $277f$. 275 is the ring shaped clutch claw member provided rotatably and slidably on the circumference $277e$ of the first clutch claw member 277 and between the slip out prevention part $277b$ and the position control part $277d$, whereby on the one end of the second clutch claw member 275 facing to the first clutch claw member 277 the flange part $275a$ projecting from the second clutch claw member 275 and the projecting wall $275c$ projecting toward the inside of the cylinder are provided, while on the other end facing to the pulley 72' the step claw parts $275b_1$, $275b_2$, $275b_3$ and $275b_4$ are provided at a distance from each other corresponding to the distance between the borings $72'a_1$, $72'a_2$, $72'a_3$ and $72'a_4$ formed on the side surface of the pulley 72', projecting toward the pulley 72'. The step claws $275b_1$, $275b_2$, $275b_3$ and $275b_4$ of the second clutch claw member 275 respectively consist of the first step claws $275b_{11}$, $275b_{21}$, $275b_{31}$ and $275b_{41}$ and the second claws $275b_{12}$, $275b_{22}$, $275b_{32}$ and $275b_{42}$. Hereby the second clutch claw member 275 is arranged in such a manner that the step claws $275b_1$, $275b_2$, $275b_3$ and $275b_4$ can be adapted in the boring $72'a_1$, $72'a_2$, $72'a_3$ and $72'a_4$ of the pulley 72', while the slip out prevention part $277b$ of the first clutch claw member 277 can be engaged with the projection wall $275c$. 276 is the spring whose one end is engaged with the pulley part $72'a$ of the pulley 72' and whose other end is engaged with the flange $275a$ of the second clutch claw member 275, serving to normally urging the second clutch claw member 275 toward the pulley 72'. 287 is the brake member to be pressed against the flange part $275a$ of the second clutch claw member 275 in functional engagement with the movement of the brake operation member 204 when the knob 103 is set at the position corresponding to "FF" as is shown in FIG. 13(a) and to serve to delay the rotation of the second clutch claw member 275 against the pulley 72' when the pulley 72' is rotated by means of the driving system shown in FIG. 4(a), whereby at the end of the brake member 287 the friction material $287a$ with large friction coefficient is provided. When the operation plate 74 is arranged at the neutral position as is shown in FIG. 18(a) or at the position translated along the counter-clockwise direction in such a manner that the cam follower $74b$ of the operation plate 74 is in contact with the cam surface $1g_1$ of the reel clutch change over cam $1g$ as is shown in FIG. 18(c) so as to rotate the operation plate 74 backwards, the first clutch claw member is slided to the right in FIG. 15 whereby the second clutch claw member 275 is translated by means of the slip prevention part 277b of the first clutch claw member 277 along the direction along which the clutch claw member 275 is more distant from the pulley 72' while only the first step claws $275b_{11}$, $275b_{21}$, $275b_{31}$ and $275b_{41}$ of the step claw parts $275b_1$, $275b_2$, $275b_3$ and $275b_4$ of the second clutch claw member 275 are respectively adapted into the borings $72'a_1$, $72'a_2$, $72'a_3$ and $72'a_4$. When the second claw member 275 is translated so as to be more distant from the pulley 72' in this way, as is shown in FIG. 17(a) the first step claws $275b_{11}$, $275b_{21}$, $275b_{31}$ and $275b_{41}$ of the second clutch claw member 275 are brought into contact with the one end wall respectively of the borings $72'a_1$, $72'a_2$, $72'a_3$ and $72'a_4$ because the second clutch claw member 275 is urged by means of the spring 276 toward the pulley. Although in this state as is shown in FIG. 18(b) the operation plate 74 is translated along the clockwise direction into the position at which the cam follower 74b of the operation plate 74 is in contact with the cam surface $1g_2$ of the reel clutch change over cam 1g in such a manner that the operation plate 74 is rotated forwards so that the first clutch claw member 277 is pressed toward the pulley 72' in such a manner that the claw 277c of the first clutch claw member 277 projects through the brings $72e_1$ and $72e_2$ of the pulley 72' largely from the other surface of the one facing to the first clutch claw member 277 of the pulley 72' whereby the second clutch claw member 275 is pressed toward the pulley 72' by means of the position control part 277d, the second clutch claw member 275 does not move while only the first clutch claw member 277 is translated because the second claws $275b_{12}$, $275b_{22}$, $275b_{32}$ and $275b_{42}$ of the second clutch claw member 275 are in contact with the side surface of the cup pulley 72' so that the second clutch claw member 275 is prevented from translating further toward the pulley 72'. Further, when the nob 103 is set at the position corresponding to the mark "FF" so that the brake member 287 is brought into contact with the flange part 275a of the second clutch claw member 275, the second clutch claw member 275 rotates at the lower speed than that of the pulley 72' due to the friction with the brake member 287 in such a manner that against the force of the spring 276 the claws $275b_1$, $275b_2$, $275b_3$ and $275b_4$ of the second clutch claw member 275 are brought into contact with the other end wall of the boring $72'a_1$, $72'a_2$, $72'a_3$ and $72'a_4$ against the direction of the rotation. In this state the operation plate 74 is, as is shown in FIG. 18(a) arranged at the position translated along the clockwise direction at which the follower 74b of the rotation plate 74 is in contact with the cam surface $1g_2$ of the reel clutch change over cam 1g, whereby the operation plate 77 is rotated forwards so as to press the first clutch claw member 277 toward the reel pulley 72 in such a manner that the claws 277c of the first clutch claw member 277 projects through the boring $72e_1$ and $72e_2$ largely from the other surface of the one facing to the first clutch claw member 277, whereby when along with the translation of the first clutch claw member 277 toward the reel pulley 72' the second clutch claw member 275 is pressed toward the pulley 72' by means of the position control parts 277d of the first clutch claw member 277 the claws $275b_1$, $275b_2$, $275b_3$ and $275b_4$ of the second clutch claw member 275 are translated toward the reel pulley 72' in such a manner that the first claws $275b_{11}$, $275b_{12}$, $275b_{13}$ and $275b_{14}$ project largely from the other surface of the one facing to the second clutch claw member 275 of the pulley because as is shown in FIG. 18(a), the second claws $275b_{12}$, $275b_{22}$, $275b_{32}$ and $275b_{42}$ of the second clutch claw member 275 are arranged at the positions corresponding to the borings $72'a_1$, $72'a_2$, $72'a_3$ and $72'a_4$ of the pulley 72'.

286 is the first ring shaped clutch claw receiving member rotatably provided on the bar 9a, whereby on the part of the clutch claw receiving member 286 facing to the reel pulley 72' the producing clutch receiving parts $286a_1$ and $286a_2$ provided at the distance corresponding to that of the claws $277c_1$ and $277c_2$ of the first clutch claw members 277 and the hole 286b are provided. Hereby the first clutch claw receiving member 286 is so designed that when the claws $277c_1$ and $277c_2$ of the first clutch claw member 277 project largely from the side surface of the pulley 72' toward the first clutch claw receiving member 286, the claws $277c_1$ and $277c_2$ of the first clutch claw member 277 are respectively engaged with the claws $286a_1$ and $286a_2$ so as to receive the rotating power from the pulley 72', while when the claws $277c_1$ and $277c_2$ of the first clutch claw member 277 do not project from the side surface of the pulley 72' toward the first clutch claw receiving member 286 the claws $277c_1$ and $277c_2$ of the first clutch claw member 277 are not engaged with the claws $286a_1$ and $286a_2$ not so as to receive the rotating power of the pulley 72'. 284 is the ring shaped disc member rotatably provided on the bar 9a, whereby on a part of the disc member 284 a small hole 284a is provided. 283 is the ring shaped friction disc provided on the bar 9a and between the second clutch claw receiving member 83 and the disc member 284, consisting of a material such as rubber or cork with large friction coefficient. 285 is a compression coil spring provided on the bar 9a and between the first clutch claw member 286 and the disc member 284, whereby the one end of the spring 285 is engaged in the small hole 286b of the first clutch claw member 286 while the other end is engaged in the small hole 284a of the disc member 284, serving to bring normally the friction disc 283 with the second clutch claw receiving member 83.

The clutch mechanism of the winding up shaft part of the second embodiment of the cine-projector in accordance with the present invention is so designed that when the nob 103 is set at the position corresponding to the mark "FR" as is mentioned in FIG. 18(a) while the cam follower 74b of the operation plate 74 is set at the neutral position as is shown FIG. 19(a) or at the position translated along the counter-clockwise direction as is shown in FIG. 19(c) in such a manner that the follower 74b is in contact with the cam surface $1g_1$ of the reel clutch change over cam 1g while the tops of the claws $277c_1$ and $277c_2$ of the first clutch claw member 277 and the tops of the claws $275b_1$, $275b_2$, $275b_3$ and $275b_4$ of the second clutch claw member 275 are withdrawn beneath the side surface of the pulley 72' as is shown in FIG. 18(c) whereby the pulley 72' is rotated by means of the driving power transmission device explained in accordance with FIG. 4, the rotation of the pulley 72' is not transmitted to the bar 9a, so that the winding up shaft does not rotate because the claws $277c_1$ and $277c_2$ of the first clutch claw member 277 are not engaged with the claws $286a_1$ and $286a_2$ of the first clutch claw receiving member 286 while the claws $275b_1$, $275b_2$, $275b_3$ and $275b_4$ of the second clutch claw member 275 are not engaged with the claws $83a_1$, $83a_2$, $83a_3$ and $83a_4$ of the second clutch claw receiving member 83.

Then, when the nob 103 is arranged at the position corresponding to the mark "FR", while the operation plate 74 is rotated along the clockwise direction out of the position at which the follower 74b is in contact with the cam surface $1g_1$ of the reel clutch change over cam 1g into the position at which it is in contact with the cam surface $1g_1$ as is shown in FIG. 19(b), the second clutch claw member 275 is urged by means of the spring 276 toward the pulley 72' so that the first step claws $275b_{11}$, $275b_{21}$, $275b_{31}$ and $275b_{41}$ are in contact with the one end wall of the borings $72'a_1$, $72'a_2$, $72'a_3$ and $72'a_4$ of the pulley 72' along the direction of the rotation while the tops of the first claws $275b_{11}$, $275b_{21}$, $275b_{31}$ and $275b_{41}$ of the second clutch claw member 275 are respectively prevented from projecting from the side surface of the pulley 72' by means of the second claws $275b_{12}$, $275b_{22}$, $275b_{32}$ and $275b_{42}$. In consequence, when the operation plate 74 is rotated along the clockwise direction so as to push the first clutch claw member 277 and the second clutch claw member 275 toward the pulley 72' under the forward translation effect of the operation plate 74, only the tops of the claws $277c_1$ and $277c_2$ of the first clutch claw member 277 project from the side surface of the pulley 72' while the claws $277c_1$ and $277c_2$ of the first clutch claw member 277 are respectively engaged with the claws $286a_1$ and $286a_2$ of the first clutch claw member 286 as is shown in FIG. 18(d). In consequence, in this state the rotation of the pulley 72' is transmitted to the first clutch claw receiving member 286, the spring 285, the disc member 284, the friction member 283 and the second clutch claw member 83 so as to rotate the winding up shaft 9. Namely, in case the rotation of the pulley 72' is transmitted to the winding up shaft 9 in the driving power transmission system in case of the motion picture projection, the rotating power of the pulley 72' is at first absorbed by the spring 285 provided between the first clutch claw receiving member 286 and the disc member 284, the reason for which is to avoid a large influence of the overload upon the film exercised when the rotating power of the reel pulley 72' is transmitted to the winding up shaft abruptly. After then the rotating power of the pulley 72' is transmitted to the winding up shaft 9 through the friction device consisting of the disc member 284, the friction member 283 and the second clutch claw receiving member 83 and the friction device consisting of the second clutch claw member 83, the friction member 82 and the disc member 77. When the film feeding is interrupted due to some reasons while the film is fed for the motion picture projection, the winding up reel 14 mounted on the winding up shaft 9 pulls the film 15 compulsorily. The above mentioned friction devices serve to make the film slip in the above mentioned case.

Then, when the nob 103 is set at the position corresponding to the mark "FF" while the operation plate 74 is rotated along the clockwise direction out of the position at which the cam follower 74b of the operation plate 74 is in contact with the cam surface $1g_1$ of the reel clutch change over cam 1g into the position at which the cam follower 74b is in contact with the cam surface $1g_2$, the brake member 287 is in contact with the second clutch claw member 275 so that the second clutch claw member 275 rotates at the lower speed than that of the pulley 72' by means of the friction with the brake member 287 while the claws $275b_1$, $275b_2$, $275b_3$ and $275b_4$ of the second clutch claw member 275 are in contact with the other end wall of the borings $72'a_1$, $72'a_2$, $72'a_3$ and $72'a_4$ against the direction of the rotation. In consequence, when the operation plate 74 is rotated along the clockwise direction while the first clutch claw member 277 and the second clutch claw member 275 is pushed toward the pulley 72' under the forward translation effect of the operation plate 74, the tops of the claws $277c_1$ and $277c_2$ of the first clutch claw member 277 and the tops of the claws $275b_1$, $275b_2$, $275b_3$ and $275b_4$ of the second clutch claw member 275 project from the side surface of the pulley 72' in such a manner that the claws $277c_1$ and $277c_2$ of the first clutch claw member 277 are engaged with the claws $286a_1$ and $286a_2$ of the first clutch claw receiving member 286 while the claws $275b_1$, $275b_2$, $275b_3$ and $275b_4$ of the second clutch claw member 275 are respectively engaged with the claws $83a_1$, $83a_2$, $83a_3$ and $83a_4$ of the second clutch claw receiving member 83. In this state the rotation of the pulley 72' is transmitted mainly through the second clutch claw receiving member 83. Namely the above is the power transmission system for quickly feeding the film 15, whereby a little different from the power transmission system for the motion picture projection the rotating power is directly transmitted to the winding up shaft 9 by means of the friction device consisting of the second clutch claw receiving member 83, the friction member 82 and the disc member 77 instead of the absorption effect of the spring 285 and the friction device consisting of the disc member 284, the friction member 283 and the second clutch member 831. In case the film 15 is feel quickly, the frequency modulator 207 is controled by means of the nob 102 in such a manner that the motor 56 is rotated quickly whereby the pulley 72 is also rotated quickly. In consequence, if there are too many friction devices inserted between the pulley 72' and the winding up shaft 9 there takes place slip between those friction devices so that the driving power transmission with high efficiency can not be carried out so that a power transmission system for the quick film feeding is provided separately in order to transmit the rotation of the pulley 72' with high efficiency.

So far various mechanisms of the cine-projector in accordance with the present invention shown in FIGS. 11 and 12 have been explained together with their efficiencies, whereby as is clear from the above explanation by means of selectively setting the nob 103 at the mark "FR" or "FF" provided on the main body 1 and at the same time by means of setting the finger 102a of the nob 102 at the mark "A", "B", "C" or "D" of the finger 101d provided on the main body 1 the opening-closing of the main switch, the motion picture projection, the still picture projection, the quick film winding back or the quick film feeding can be carried out while by means of setting the nob 5 at the mark "N" or "SL" provided on the main body 1 the normal projection or the slow motion projection can be carried out. The synthetic operation of the cine-projector will be explained below in a summarized way.

(a) The opened state (when the finger 102a of the nob 102 is set at the mark "A" of the index 101d).

Under the control of the mode change over cam 160, the first swing lever 158 and the second swing lever 158' are arranged at the neutral position as is shown in FIG. 18(a) while the main switch 61 and the lamp switch 162 are in the "opened" state under the control of the mode change over cam 160. In consequence, in this state the cine-projector is in the still standing state. Because the above mentioned first swing lever 158 is arranged at the neutral position, the first slide bar 184 is also arranged at the neutral position as is shown in FIG. 12 and in FIG. 18(a), whereby the folded parts $184_1a$ and $184_1a'$ are not in contact with the feet $74g_1'$ and $74g_2'$ of the operation plate 74' while the folded part $184_2a$ and $184_2a'$ are not in contact with the feet $74g_1$ and $74g_2$ of the operation plate 74 in the clutch mechanism of the winding up shaft. In this state the operation plates 74 and 74' are arranged at the neutral positions by means of the springs 76 and 76'. Further, because the second swing lever 158' is arranged at the neutral position, the second slide bar 184' is also arranged at the neutral position as is shown in FIG. 18(a) in such a manner that the bell crank 62 holds the change over slider 46 at the position at which the pin 85 of the change over slider 46 corresponds to the mark "S".

(b) The motion picture projection state (when the finger 102a of the nob 102 is set at the mark "B" of the index 101d).

When the finger 102a of the nob 102 is translated out of the position corresponding to the mark "A" into the position corresponding to the mark "B", the mode change over cam 160 is rotated out of the state shown in FIG. 13(b) along the direction of the arrow in the drawing into the state shown in FIG. 13(c) in functional engagement with the rotation of the nob 102 in such a manner that the first swing lever 158 and the second swing lever 158' are arranged at the position rotated along the clockwise direction around the shaft 159. At the same time the main switch 61 and the lamp switch 162 are brought into the "closed" state so that the motor 56 starts to rotate while the lamp 16 lights up. When the first swing lever 158 and the second swing lever 158' are arranged at the positions translated along the counter-clockwise direction, the first slide bar 184 and the second slide bar 184' are arranged at the position translated to the left as is shown in FIG. 18(b). When the first swing bar 184 and the second slide bar 184' are translated to the left, the first slide bar 184 pushes the foot $74g_2'$ of the operation plate 74' in the clutch mechanism of the feeding shaft part to the left with the folded part $184_1a'$ and the foot $74g_2$ of the operation plate 74 in the clutch mechanism (FIG. 9) of the winding up shaft part also to the left with the folded part $184_2a$ whereby the operation plates 74 and 74' are rotated along the clockwise direction while the second slide bar 184' arranges the bell crank 62 at the position rotated along the counter-clockwise direction so as to hold the pin 85 of the change over slide 46 at the position corresponding to the mark "No". When the operation plate 74' in the clutch mechanism of the feeding shaft part in this way, the cam follower 74b' of the operation plate 74' is arranged on the cam surface $1g_1'$ of the reel clutch change over cam $1g'$ so that the claws $75b_1'$, $75b_2'$, $75b_3'$ and $75b_4'$ of the clutch claw member 75' are withdrawn beneath the side surface of the pulley as is shown in FIG. 7(b), being not engaged with the clutch claw receiving members $83'_1$, $83'_2$, $83'_3$ and $84'_4$ in such a manner that the rotation of the reel pulley 81 is not transmitted to the feeding shaft 8. In this state the brake part 74f' of the operation plate 74' has been translated downwards, the brake member 69' is pressed against the internal wall of the cylindrical part $8_2$ of the feeding shaft 8 so as to brake the rotation of the feeding shaft 8. On the other hand in the clutch mechanism (FIG. 15 and FIG. 16) of the winding up shaft part the projection of the tops of the first claws $275b_{11}$, $275b_{21}$, $275b_{31}$ and $275b_{41}$ of the second clutch claw member 275 from the side surface of the pulley 72' is prevented by means of the second claws $275b_{12}$, $275b_{22}$, $275b_{32}$ and $275b_{42}$ as is shown in FIG. 17(a) while the finger 102a of the nob 102 is set at the mark "A" of the index 101d, whereby when in this state the operation plate 74 is translated along the clockwise direction the cam follower 74b of the operation plate 74 is arranged on the cam surface $1g_2$ of the reel clutch change over cam $1g$ so that the first clutch member 277 and the second clutch member 275 are pressed against the pulley 72' by means of the operation plate 74, while only the tops of the claws $277c_1$ and $277c_2$ of the first claw member 277 project from the side surface of the pulley 72' in such a manner that the claws $277c_1$ and $277c_2$ of the first clutch claw member 277 are engaged with the clows $286a_1$ and $286a_2$ of the first clutch claw receiving member 286 so as to transmit the rotation of the pulley 72' to the winding up shaft. In this state the brake part 74f of the operation plate 74 has been translated upwards and the brake member 69 is distant from the internal wall of the cylindrical part $9_2$ of the winding up shaft 9 so that the winding up shaft 9 rotates by means of the rotation of the pulley 72' free from the load of the brake member 69.

In consequence, when in this state the feeding shaft 8 and the feeding reel 13 are rotated against the load put on the feeding shaft 8 and the film 15 wound up on the feeding reel 13 is pulled out so as to be fed to the projection part (FIG. 10), the film 15 is intermittently fed to the winding up reel 14 by means of th film feeding mechanism of the projection part because the pin 85 of the change over slider 46 is at the position corresponding to the mark "No", so that the film 15 is wound up on the winding up reel 14 mounted on the winding up shaft 9 rotating by means of the rotation of the pulley 72'. In this mode, the feeding shaft 8 is rotated by means of the film 15 pulled by the film feeding mechanism while the winding up shaft 9 is rotated by means of the rotation of the pulley 72'. Hereby the part of the film 15 successively fed to the projection part is projected intermittently so as to carry out the motion picture projection, whereby the normal projection is carried out when the nob 5 is at the position corresponding to the mark "N", while the slow motion projection is carried out in the same way as explained in accordance with the first embodiment when the nob 5 is at the position corresponding to the mark "SL".

(c) The still projection state (when the finger 102a of the nob 102 is set at the mark "C" of the index).

When the finger 102a of the nob 102 is translated out of the position corresponding to the mark "B" of the index 101d into the position corresponding to the mark "C", the mode change over cam 160 is rotated out of the state shown in FIG. 13(c) along the direction of the arrow in the drawing into the state shown in FIG. 13(d) in functional engagement with the rotation of the nob, whereby the first swing lever 158 and the second swing lever 158' are arranged at the neutral position while the main switch 61 and the lamp switch 162 are kept in the "closed" state. Along with the translation of the first swing lever 158 and the second swing lever 158', the first slide bar 184, the second slide bar 184', the operation plates 74 and 74' and the bell crank are all arranged at the neutral position as is shown in FIG. 18(a). When the bell crank 62 is arranged at the neutral position, the pin 85 of the change over slider 46 is arranged at the position corresponding to the mark "S" so that the film feeding efficiency of the film feeding mechanism is made ineffective as has been explained in accordance with FIG. 10, whereby the film is not fed. Further, when the operation plate 74 of the clutch mechanism of the winding up shaft part and the operation plate 74' of the clutch mechanism of the feeding shaft part are arranged at the neutral position, the follower 74b of the operation plate 74 is arranged at the position at which it is in contact with the cam surface $1g_1$ of the reel clutch change over cam $1g$ while the follower 74b' of the operation plate 74' is arranged at the position at which it is in contact with the cam surface $1g_1'$ of the reel clutch change over cam $1g'$ so that the rotation of the pulleys 81 and 72' are not transmitted to the feeding shaft 8 and the winding up shaft.

(d) The quick film winding back state (when the nob 103 is at the position corresponding to the mark "FR" while the finger 102a of the nob 102 is set at the mark "D" of the index 101d).

When the finger 102a of the nob 102 is translated out of the position corresponding to the mark "C" of the index 101d into the position corresponding to the mark "D" while the nob 103 is at the position corresponding to the mark "FR" (quick film winding back) and the first swing lever 158 is arranged at the position shown in a solid line in FIG. 13(a), the mode change over cam 160 is rotated out of the state shown in FIG. 13(d) along the direction of the arrow in the drawing into the state shown in FIG. 13(e) in functional engagement with the rotation of the nob 102 in such a manner that the first swing lever 158 and the second swing lever 158' are rotated along the clockwise direction around the shaft 159. At the same time the main switch 61 is kept in the "closed state" while the lamp switch 162 is brought into the "opened" state whereby the lamp 16 is put out while the frequency modulator 207 is controled by means of the nob 102 in such a manner that the motor 56 rotates at the higher speed than the one at which the motor 56 rotates when the finger 102a of the nob 102 is set at the mark "B" or "C". Along with the clockwise translation of the first swing lever 158 and the second swing lever 158', the first slide bar 184 and the second slide bar 184' are arranged at the position translated to the right shown in FIG. 18(c). When the first slide bar 184 and the second slide bar 184' are translated to the right, the first slide bar 184 pushes the foot $74g_1'$ of the operation plate 74' in the clutch mechanism of the feeding shaft part to the right with the folded part $184_1a$ while the slide bar 184 pushes the foot $74g_1$ of the operation plate 74 in the clutch mechanism of the winding up shaft part to the right with the folded part $184_2a'$, so as to rotate the operation plates 74 and 74' along the counter-clockwise direction, whereby the second slide bar 184' rotates the bell crank 62 along the clockwise direction in wuch a manner that the pin 85 of the change over slider 46 is kept at the position corresponding to the mark "F". When the operation plate 74' in the clutch mechanism of the feeding shaft part is rotated along the counter-clockwise direction in this way the follower 74b' of the operation plate 74' is arranged on the cam surface $1g_2'$ of the reel clutch change over cam $1g'$ so that the claws $75b_1'$, $75b_2'$, $75b_3'$ and $75b_4'$ of the clutch claw member 75' project largely from the side surface of the pulley 81, as is shown in FIG. 7(c), so as to be engaged with the clutch claw receiving members $83_1'$, $83_2'$, $83_3'$ and $83_4'$ in such a manner that the rotation of the pulley 81 is transmitted to the feeding shaft 8. Further in this state the brake part $74f'$ of the operation plate 74' is translated upwards and the brake member 69' is distant from the internal wall of the cylindrical part $8_2$ of the feeding shaft 8 so that the feeding shaft 8 is rotated by means of the rotation of the pulley 81, free from the load of the brake member 69'. On the other hand, when the operation plate 74 in the clutch mechanism of the winding up shaft is rotated along the counter-clockwise direction, the cam follower 74b of the operation plate 74 is arranged on the cam surface $1g_1$ of the reel clutch change over cam $1g$ so that the tops of the claws $277c_1$ and $277c_2$ of the first claw member 277 and the tops of the claws $275b_1$, $275b_2$, $275b_3$ and $275b_4$ of the second clutch claw member 275 are withdrawn beneath the side surface of the pulley 72' as is shown in FIG. 17(e), whereby the claws $277c_1$ and $277c_2$ of the first clutch claw member 277 is not engaged with the claws $286a_1$ and $286a_2$ of the first clutch claw receiving member 286 and the claws $275b_1$, $275b_2$, $275b_3$ and $275b_4$ of the second clutch claw member 275 are not engaged with the claws $83a_1$, $83a_2$, $83a_3$ and $83a_4$ of the second clutch claw member 83 so that the rotation of the pulley 72' is not transmitted to the winding up shaft 9. Further in this state the brake part $74f$ of the operation plate 74 has been translated downwards so that the brake member 69 is pressed against the internal wall of the cylindrical part $9_2$ of the winding up shaft 9 so as to brake the rotation of the winding up shaft 9 in rotation. Further the bell crank 62 has been rotated along the clockwise direction while the pin 58 of the change over slider 46 has been translated to the position corresponding to the mark "F" so that in this state the projection 27c of the film feeding claw projection control member 27 is in contact with the projection 46b of the change over slider 46 while the L-shaped part 44c of the press plate holder 44 is also in contact with the projection 46d of the change over slider 46. In consequence in the projection part, the film feeding claw 26a of the film feeding mechanism is arranged at the position largely distant from the film 15 in such a manner that the film feeding mechanism is made ineffective while the press plate 43 is distant from the rail member 40 in such a manner that the film 15 is in free state in the rail 40 of the rail member 40. In consequence, when the feeding shaft 8 is rotated by means of the rotation of the pulley 81 in this state, the film 15 wound up in the winding up reel 14 mounted on the winding up shaft 9 is returned into the feeding reel 13 mounted on the feeding shaft 81 by means of the rotation of the feeding shaft 8 at a high speed. Namely, when the film 15 is pulled toward the feeding shaft 8, the winding up shaft 9 is rotated together with the pulley 81 against the load exercised on the winding up shaft 9.

(e) The quick film feeding state (when the nob 103 is at the position corresponding to the mark "FF" while the finger 102a of the nob 102 is set at the mark "D" of the index 101d).

When the finger 102a of the nob 102 is translated out of the position corresponding to the mark "C" of the index 101d into the position corresponding to the mark "D" while the nob 103 is at the position corresponding to the mark "FF" (quick film feeding) and the first swing lever 158 is arranged at the position shown in a dotted line shown in FIG. 13, the mode change over cam 160 is brought out of the state shown in FIG. 13(d) into the state shown in FIG. 13(f) in functional engagement of the nob 102 in such a manner that the first swing lever 158 is rotated along the counter-clockwise direction around the shaft 159 while the second swing lever 158' is rotated along the clockwise direction around the shaft 159. At the same time the main switch 61 is kept in the "closed" state while the lamp switch 162 is brought in the "opened" state whereby the lamp 16 is put out while the frequency modulate 207 is controled by means of the nob 102 in such a manner that the motor 56 is rotated at a higher speed than that at which the motor 56 is rotated when the finger 102a of the nob 102 is set at the mark "B" or "C". When then the first swing lever 158 is arranged at the position translated along the counter clockwise direction, the first slide bar 184 is arranged at the position translated to the left, while when the second swing lever 158' is arranged at the position translated along the clockwise direction the second slide bar 184' is translated to the right. When this first slide bar 184 is translated to the left, the first slide bar 184 pushes the foot $74g_2'$ of the operation plate 74' in the feeding shaft to the left with the folded part $184_1a'$ and the foot $74g_2$ of the operation plate 74 in the winding up shaft to the left with the folded part $184_2a$ so as to rotate the operation plates 74 and 74' along the clockwise direction. Further when the second slide bar 184' is translated to the right, the second slide bar 184' rotates the bell crank 62 along the clockwise direction in such a manner that the pin 85 of the change over slider 46 is kept at the position corresponding to the mark "F".

Because the follower 74b' of the operation plate 74' has been arranged on the cam surface $1g_1'$ of the reel clutch change over cam 1g', when the operation plate 74' in the clutch mechanism of the feeding shaft part is rotated along the clockwise direction in this way, the claws $75b_1'$, $75b_2'$, $75b_3'$ and $75b_4'$ of the clutch claw member 75' are withdrawn beneath the side surface of the pulley 81 as is shown in FIG. 7(b), so as not to be engaged with the clutch claw receiving members $83_1'$, $83_2'$, $83_3'$ and $83_4'$ in such a manner that the rotation of the reel pulley 82 is not transmitted to the feeding shaft 8. Further in this state the brake part 74f' of the operation plate 74' has been translated downwards so that the brake member 69' is pressed against the internal wall of the cylindrical part $8_2$ of the feeding shaft 8, whereby the rotation of the feeding shaft 8 is braked, when the shaft 8 is rotated. On the other hand, when in the clutch mechanism of the winding up shaft the nob 103 is arranged at the position corresponding to the mark "FF", the brake member 287 is in contact with the second clutch claw member 275 so that the second clutch claw member 275 is rotated at the lower speed than that of the pulley 72', under the load due to the friction with the brake member 287 and therefore the claws $275b_1$, $275b_2$, $275b_3$ and $275b_4$ of the second clutch claw member 275 are in contact with the other end wall of the borings $72'a_1$, $72'a_2$, $72'a_3$ and $72'a_4$ of the pulley 72' against the direction of the rotation, whereby when the operation plate 74 is rotated along the counter-clockwise direction in this state and the follower 74b of the operation plate 74 is arranged on the cam surface $1g_2$ of the reel clutch change over cam 1g, the operation plate 74 is rotated forwards whereby along with the forward rotation of the operation plate 74 the first clutch claw member 277 and the second clutch claw member 275 are pressed against the pulley 72'. In consequence the tops of the claws $277c_1$ and $277c_2$ of the first clutch claw member 277 and the claws $275b_1$, $275b_2$, $275b_3$ and $275b_4$ of the second clutch claw member 275 project from the side surface of the pulley 72', whereby as is shown in FIG. 18(e) the claws $277c_1$ and $277c_2$ of the first clutch claw member 277 are engaged with the claws $286a_1$ and $286a_2$ of the first clutch claw receiving member 286 while the claws $275b_1$, $275b_2$, $275b_3$ and $275b_4$ of the second clutch claw member 275 are engaged with the claws $83a_1$, $83a_2$, $83a_3$ and $83a_4$ of the second clutch claw receiving member 83 in such a manner that the rotation of the pulley 72' is transmitted to the winding up shaft 9 so as to rotate the shaft 9.

Namely, in this state the film feeding function of the film feeding mechanism is made ineffective while the press plate 43 is distant from the rail member 40 so that the film 15 is in a free state in the rail 40a of the rail member 40. Further, the feeding shaft 8 mounted on the feed reel 13 is not rotated by means of the rotation of the pulley 81, while the winding up shaft 9 mounted on the winding up reel 14 is rotated by means of the rotation of the pulley 72' so that the film 15 wound up on the feeding reel is pulled toward the winding up reel 14 by means of the rotation of the winding up shaft 9, while when the film 15 is pulled toward the windung up reel 14 the feeding shaft 8 is rotated together with the feeding reel 13, against the frictional load excercised on the feeding shaft 8 by means of the brake member 287'. In this way the quick film feeding is carried out.

What is claimed is:

1. A drive control mechanism for selectively actuating reel spindle means of a motion picture projector, comprising:
   shiftable means manually shiftable between a plurality of positions and having a U-shaped portion;
   pulley means rotatably supported by said reel spindle means;
   drive means for rotating said pulley means including a motor operatively coupled with said pulley means; and
   clutch means including connecting means provided on said reel spindle means capable of selectively operatively coupling said pulley means with said reel spindle means to make them rotatable together, and control means for controlling said connecting means to be in a first state in which said pulley means is coupled with said reel spindle means and to be in a second state in which the pulley means and said reel spindle means are not coupled with each other, said control means having
   cam means forming a first cam face and a second cam face, and
   a control part consisting of cam follower means engaged with said cam means and control lever means operatively coupled with said shiftable means at the U-shaped portion thereof, the cam follower means and the control lever means being arranged in one unified body;
   said control means being arranged to rotate in response to shifting of the shiftable means between said positions, and being operatively connected to said connecting means to hold said connecting means in said second state when said cam follower of the control means is in a position corresponding to said first cam face and to hold it in said first state when said cam follower is in a position corresponding to said second cam face.

2. A drive control mechanism according to claim 1, wherein said control means is provided with brake means which comes into pressed contact with a part of said reel spindle means to brake the free rotation of said reel spindle means when said control means holds said connecting means in said second state and which releases said reel spindle means from contact when said control means holds said connecting means in said first state.

3. A drive control mechanism according to claim 1, wherein said first and second cam faces of said cam means are arranged to be directly continuous, said control means being provided with urging means which urges said cam follower means toward said cam means to cause the cam follower means to constantly follow said cam faces.

4. A drive control mechanism according to claim 1:
wherein said connecting means is composed of a first connecting means and a second connecting means disposed to confront respectively the disc face of said pulley means, which is interposed in between the first and second connecting means;
wherein said pulley means has at least one hole extending through said disc face;
wherein said first connecting means is disposed at said reel spindle means and operatively secured to the reel spindle means with at least one claw receiving part formed at a portion thereof; and
wherein said second connecting means is rotatably operatively coupled with said control means and is disposed on said reel spindle means to be slidable thereon, said second connecting means being provided with at least one claw means which is arranged to be out of engagement with said claw receiving part of said first connecting means when said cam follower means of said control means is in a position to correspond to said first cam face of said cam means and to engage with the claw receiving part of the first connecting means through said hole of said pulley means when the cam follower means is in a position to correspond to the second cam face of the cam means.

5. A drive control mechanism according to claim 1, wherein said shiftable means is shiftable between a neutral position and first and second positions defined across the neutral position in approximate symmetry, wherein said control means is left free within said U-shaped portion of the shiftable means when the shiftable means is in said neutral position, wherein the control means is caused to rotate in one direction by one end of the U-shaped portion of the shiftable means when the shiftable means is in the first position, and wherein the control means is caused by the other end of the U-shaped portion to rotate in another direction.

6. A drive control mechanism according to claim 5, wherein said control means is provided with urging means which constantly urges the control means to cause said shiftable means to come back to said neutral position.

7. A drive control mechanism for selectively actuating reel spindle means of a motion picture projector, comprising:
a reel spindle in said reel spindle means having a cylindrical portion one end of which is open and a spindle portion which extends from a closed end of the cylindrical portion along a concentric shaft of the cylindrical portion to operatively and rigidly support a reel, and a shaft extending along said concentric shaft of the reel spindle to be rigidly coupled with said reel spindle at the open end of the reel spindle;
base plate means rotatably supporting said shaft and being provided with a hole therethrough for braking purposes;
a rod supported by said base plate means to be shiftable along the face of the base plate, said rod having at least one U-shaped portion formed into a U-shape deviating from the axis of the rod;
disc shaped pulley means which confronts said reel spindle disposed outside of said base plate means and which is supported by said shaft to be freely rotatable on the shaft within said base plate, said pulley means having at least one hole through its disc;
drive means for rotating said pulley means, said drive means including a motor operatively coupled with said pulley means; and
clutch means including a first connecting means operatively secured onto said shaft to confront the disc face of said pulley means on the side not confronting said base plate means, said first connecting means having at least one claw receiving part formed at a part thereof, a cylindrical second connecting means disposed on said shaft to be rotatable and slidable thereon between said base plate means and said pulley means, said second connecting means being provided with at least one claw which is capable of coming into engagement with said claw receiving part of said first connecting means through said piercing hole of said pulley means to operatively and fixedly couple said pulley means with said shaft, cam means having a first cam face and a second cam face continuously arranged thereon, the first cam face contributing to engagement between said claw of the second connecting means and said claw receiving part of the first connecting means and the second cam face preventing the claw from engaging with the claw receiving part of the first connecting means, and control means disposed in between said base plate means and said second connecting means, said control means being rotatably supported by said base plate means and operatively coupled with said second connecting means, the control means including
cam follower means engaging with said cam means,
first urging means constantly urging said cam follower means to be in contact with said cam means,
control lever means operatively coupled with said rod at said U-shaped portion of the rod,
second urging means constantly urging said control means to be in a neutral position, and
brake means extending to the inner circumferential face of the cylindrical portion of said reel spindle through the hole extending through said base plate means for braking, said brake means being arranged to be capable of applying braking force to the free rotation of said reel spindle means by coming into pressed contact with said inner circumferential face of the reel spindle in response to the rotation of said control means;
the claw of said second connecting means being kept in a state of engagement with the claw receiving part of said first connecting means and said brake means being kept out of pressed contact with the inner circumferential face of the cylindrical portion of said reel spindle when displacement of said rod causes said control means to shift into a state in which said cam follower means corresponds to the first cam face of said cam means;

the claw of the second connecting means being kept out of engagement with the claw receiving part of the first connecting means and said brake means being kept in pressed contact with the inner circumferential face of the reel spindle when the control means is shifted into another state in which the cam follower means corresponds to the second cam face of the cam means.

8. In a motion picture projector having means for projecting a motion picture film at a projection station and means for transporting the film from a supply means through the projection station to a take-up means, the projector including control means adjustable to a plurality of positions for conditioning the operation of the projector to a plurality of operational modes, the improvement in the control means comprising:
  shiftable means manually shiftable between a plurality of positions, said shiftable means having first and second U-shaped portions;
  drive means for actuating said supply means and said take-up means;
  first pulley means rotatably supported by said supply means;
  second pulley means rotatably supported by said take-up means;
  driving power transmission means for constantly transmitting the driving power of said drive means to said first and second pulley means to cause the first and second pulley means to rotate in opposite directions; and
  clutch means composed of first and second clutch means;
  said first clutch means including first connecting means for selectively coupling said first pulley means with said supply means to cause said first pulley means and said supply means to rotate together, said first connecting means being rotatably and slidably supported by said supply means, and first control means for controlling said first connecting means between a first state in which said first pulley means and said supply means are coupled with each other and a second state in which they are left free from each other, said first control means having
    a first cam having a first cam face and a second cam face, and
    a first controller having in a unified manner cam follower means coupled with said first cam and control lever means operatively coupled with said shiftable means at the first U-shaped portion of the shiftable means, the first controller being arranged to rotate and move in response to shifting of said shiftable means and being arranged to operatively engage with said first connecting means to keep the first connecting means in said second state when said cam follower means corresponds to said first cam face and to keep the first connecting means in said first state when the cam follower means corresponds to said second cam face;
  said second clutch means including second connecting means capable of selectively coupling said second pulley means with said take-up means to cause them to rotate together, said second connecting means being rotatably and slidably supported by said take-up means, and second control means for controlling said second connecting means between a first state in which said second pulley means is coupled with said supply means and a second state in which they are left free from each other, said second control means having
    a second cam having first and second cam faces, and
    a second controller having in a unified manner cam follower means coupled with said second cam and control lever means operatively coupled with said shiftable means at the second U-shaped portion of the shiftable means;
  the second controller being arranged to rotate and move in response to shifting of position of said shiftable means and being operatively coupled with said second connecting means to keep the second connecting means in said second state when the cam follower of the second controller corresponds to the first cam face of said second cam and to keep the second connecting means in said first state when the cam follower corresponds to said second cam face of the second cam;
  the first and second cam faces of said first cam being formed in a position exactly opposite to the position of the first and second cam faces of said second cam;
  said second connecting means thus being in said second state when said first connecting means is in said first state and the second connecting means being in said first state when the first connecting means is in said second state.

9. The improvement in control means for a motion picture projector according to claim 8, wherein, with the exception of said first cam of said first clutch means and said second cam of said second clutch means, the structural arrangement of each component of said first clutch means and that of a corresponding component of said second clutch means are approximately identical with each other.

10. The improvement according to claim 8, including:
  a third pulley operatively coupled with said drive means;
  idler pulley means having fourth, fifth and sixth pulleys which rotate together on concentric shafts; and
  an endless belt spanning from said third pulley through the fourth pulley, the second pulley means, the fifth pulley, the first pulley means and the sixth pulley one after another before it comes back to the third pulley.

11. The improvement according to claim 10, wherein said fourth, fifth and sixth pulleys of said idler pulley means are formed into one unified body.

12. The improvement according to claim 11, wherein the diameter of said fifth pulley is smaller than the diameters of said fourth and sixth pulleys.

13. A motion picture projector capable of selectively adopting a normal motion picture projecting mode, a still picture projecting mode, a quick film feeding mode or a quick film returning mode, comprising:
  means for projecting a motion picture film at a projection station;
  film feed means engageable with the film at said projection station for transporting the film from a supply means through the projection station to a take-up means;
  driving means for actuating said film feed means, said supply means and said take-up means, the driving means including a motor operatively coupled with said film feed means;

first pulley means rotatably supported by said supply means;

second pulley means rotatably supported by said take-up means;

driving power transmission means for transmitting driving power from the motor to the first and second pulley means in such a manner that the first and second pulley means are rotated in different directions;

first friction means disposed between said first pulley means and said supply means to cause them to rotate together;

second friction means disposed between said second pulley means and said take-up means to cause the second pulley means to rotate together with said take-up means;

shiftable means having first and second shiftable rods which extend approximately in parallel and arranged side by side to be respectively shiftable to first, second and third positions, the first shiftable rod having a first U-shaped portion and a second U-shaped portion, one end of said second shiftable rod being operatively coupled with said film feed means;

clutch means composed of first and second clutch means;

the first clutch means including first connecting means capable of selectively and firmly coupling said first pulley means with said supply means besides the operative coupling effected by said first friction means, the first connecting means being rotatably and slidably supported by said supply means, and first control means for controlling said first connecting means between a first state in which said first pulley means is coupled with said supply means and a second state in which they are released from being coupled with each other, the first control means having a first cam having first and second cam faces, and first actuating means operatively coupled with said first connecting means, the first actuating means having first control lever means operatively coupled with said first rod at said first U-shaped portion of said first rod, first brake means for applying braking force to said supply means by coming into pressed contact with the supply means to overcome the force of said first friction means which transmits the rotation of said first pulley means to said supply means, and first cam follower means operatively coupled with said first cam to slide over the first and second cam faces of the first cam;

said second clutch means including second connecting means capable of selectively and firmly coupling said second pulley means with said take-up means besides the operative coupling effected by said second clutch means, the second connecting means being rotatably and slidably supported by said take-up means, and second control means for controlling said second connecting means between a first state in which said second pulley means is coupled with said take-up means and a second state in which they are released from being coupled with each other, the second control means having a second cam having first and second cam faces, and second actuating means operatively coupled with said second connecting means, the second control means having second control lever means operatively coupled with said first rod at said second U-shaped portion of said first rod, and second brake means for applying braking force to said take-up means by coming into pressed contact with the take-up means to overcome the force of said second friction means which transmits the rotation of said second pulley means to the take-up means; and manually operable mode selecting means operatively coupled with said shiftable means, the mode selecting means including still picture projecting mode cam means for bringing said first shiftable rod and said second shiftable rod into said first position, normal motion picture projecting mode cam means for bringing said first and second shiftable rods into said second position, quick film returning mode cam means for bringing said first and second shiftable rods into said third position, and quick film feeding mode cam means for bringing said first shiftable rod into said second position and said second shiftable rod into said third position respectively, (1) when said first shiftable rod is in said first position, the first cam follower means of said first clutch means coming to a position corresponding to the first cam face of said first cam and the second cam follower means of said second clutch means coming to a position corresponding to the first cam face of said second cam, (2) when the first shiftable rod is in said second position, the first cam follower means of the first clutch means coming to a position corresponding to the first cam face of the first cam and the second cam follower means of the second clutch means coming to a position corresponding to the second cam face of the second cam, (3) with the first shiftable rod in said third position, the first cam follower means of the first clutch means coming to a position corresponding to the second cam face of the first cam and the second cam follower means coming to a position corresponding to the first cam face of the second cam and, when the shiftable rod is in the first or third position, said film feed means being disengaged from said film in response to displacement of the second shiftable rod.

14. A motion picture projector according to claim 13, wherein said driving power transmission means includes:

a third pulley operatively coupled with the output shaft of said motor; idler pulley means having fourth, fifth and sixth pulleys rotating together on concentric shafts; and an endless belt spanning from said third pulley through the fourth pulley, the second pulley means, the fifth pulley, the first pulley means and the sixth pulley one after another before it comes back to the third pulley.

15. A motion picture projector according to claim 14, wherein said fourth, fifth and sixth pulleys of said idler pulley means are formed into one unified body.

16. A motion picture projector according to claim 15, wherein the diameter of said fifth pulley is smaller than the diameters of said fourth and sixth pulleys.

17. A motion picture projector according to claim 13, wherein, with the exception of the first cam of said first clutch means and the second cam of said second clutch means, the structural arrangement of each component of said first clutch means and that of a corresponding component of said second clutch means are approximately identical with each other.

* * * * *